(12) United States Patent
Kato et al.

(10) Patent No.: US 8,849,538 B2
(45) Date of Patent: Sep. 30, 2014

(54) TORQUE DISTRIBUTION APPARATUS, TORQUE DISTRIBUTION METHOD, TORQUE DISTRIBUTION VALUE GENERATION METHOD, AND PROGRAM

(75) Inventors: Masahiro Kato, Tokorozawa (JP); Eiji Muramatsu, Kawasaki (JP); Kazutoshi Kitano, Kamakura (JP); Chihiro Kawabata, Kawasaki (JP); Kazunobu Hashimoto, Saitama (JP); Yoshikazu Takeuchi, Sakado (JP)

(73) Assignee: Pioneer Corporation, Kanagawa (JP)

( * ) Notice: Subject to any disclaimer, the term of this patent is extended or adjusted under 35 U.S.C. 154(b) by 0 days.

(21) Appl. No.: 14/113,140

(22) PCT Filed: Apr. 21, 2011

(86) PCT No.: PCT/JP2011/059875
§ 371 (c)(1),
(2), (4) Date: Oct. 28, 2013

(87) PCT Pub. No.: WO2012/144058
PCT Pub. Date: Oct. 26, 2012

(65) Prior Publication Data
US 2014/0046568 A1    Feb. 13, 2014

(51) Int. Cl.
| | | |
|---|---|---|
| *B60T 7/12* | (2006.01) | |
| *B60W 10/08* | (2006.01) | |
| *B60L 11/12* | (2006.01) | |
| *B60W 30/18* | (2012.01) | |
| *B60W 10/00* | (2006.01) | |
| *B60L 15/20* | (2006.01) | |
| *B60K 28/16* | (2006.01) | |
| *B60L 3/10* | (2006.01) | |
| *B60L 7/14* | (2006.01) | |
| *B60L 9/18* | (2006.01) | |
| *B60K 7/00* | (2006.01) | |

(52) U.S. Cl.
CPC .......... *B60K 28/16* (2013.01); *B60L 2240/421* (2013.01); *B60L 2220/44* (2013.01); *B60W 10/08* (2013.01); *B60L 2260/28* (2013.01); *B60L 2260/30* (2013.01); *B60L 2240/12* (2013.01); *B60L 2250/26* (2013.01); *B60L 2240/16* (2013.01); *B60L 11/126* (2013.01); *B60W 30/18172* (2013.01); *B60W 10/00* (2013.01); *B60L 15/2036* (2013.01); *B60K 7/0007* (2013.01); *B60L 3/104* (2013.01); *B60L 2240/461* (2013.01); *B60L 7/14* (2013.01); *Y02T 10/642* (2013.01); *B60W 2720/30* (2013.01); *B60W 2520/10* (2013.01); *B60L 2240/20* (2013.01); *B60L 3/108* (2013.01); *B60L 2240/622* (2013.01); *B60L 15/2009* (2013.01); *B60W 30/18127* (2013.01); *B60L 15/20* (2013.01); *B60L 9/18* (2013.01); *B60L 2240/423* (2013.01); *B60L 2240/465* (2013.01); *B60W 2520/26* (2013.01)
USPC .......................................................... 701/84

(58) Field of Classification Search
None
See application file for complete search history.

(56) References Cited

U.S. PATENT DOCUMENTS

| 7,957,881 B2 * | 6/2011 | Itoh ................................. 701/90 |
| 2007/0075659 A1 * | 4/2007 | Uenodai et al. ............... 318/139 |
| 2009/0088914 A1 | 4/2009 | Mizutani et al. |
| 2009/0101428 A1 * | 4/2009 | Itoh ............................... 180/197 |
| 2010/0004090 A1 | 1/2010 | Mizutani et al. |
| 2013/0179055 A1 * | 7/2013 | Kato et al. .................... 701/113 |

FOREIGN PATENT DOCUMENTS

| JP | 2001-028804 | 1/2001 |
| JP | 2006-180657 | 7/2006 |
| JP | 2006-213130 | 8/2006 |
| JP | 2006-345677 | 12/2006 |
| JP | 2007-037217 | 2/2007 |
| JP | 2007-313982 | 12/2007 |

| JP | 2009-159682 | 7/2009 |
| JP | 2012-228163 | 11/2012 |
| WO | WO 2007/064025 | 6/2007 |

OTHER PUBLICATIONS

International Search Report, PCT/JP2011/059875, May 31, 2011.

* cited by examiner

*Primary Examiner* — Thomas Tarcza
*Assistant Examiner* — Adam Alharbi
(74) *Attorney, Agent, or Firm* — Young & Thompson

(57) ABSTRACT

A torque distribution apparatus includes an instructed torque acquiring unit that acquires input instructed torque, a determining unit that determines whether to perform power running control or regenerative braking, an efficiency map acquiring unit that based on a determination result, acquires a motor efficiency map, a vehicular speed detecting unit, a drive wheel rotational speed detecting, a slip rate calculating unit that calculates slip rate at drive wheels, a calculating unit that based on the slip rate, creates an efficiency variation expression that indicates efficiency values on a performance curve that indicates relations between drive wheel rotational speed and torque, a distributing unit that calculates based on the slip rate, the instructed torque, and the torque optimizing efficiency, torque distribution values such that overall efficiency during power running and during regeneration are maximized, and a control unit that controls torque distribution to the motors.

7 Claims, 42 Drawing Sheets

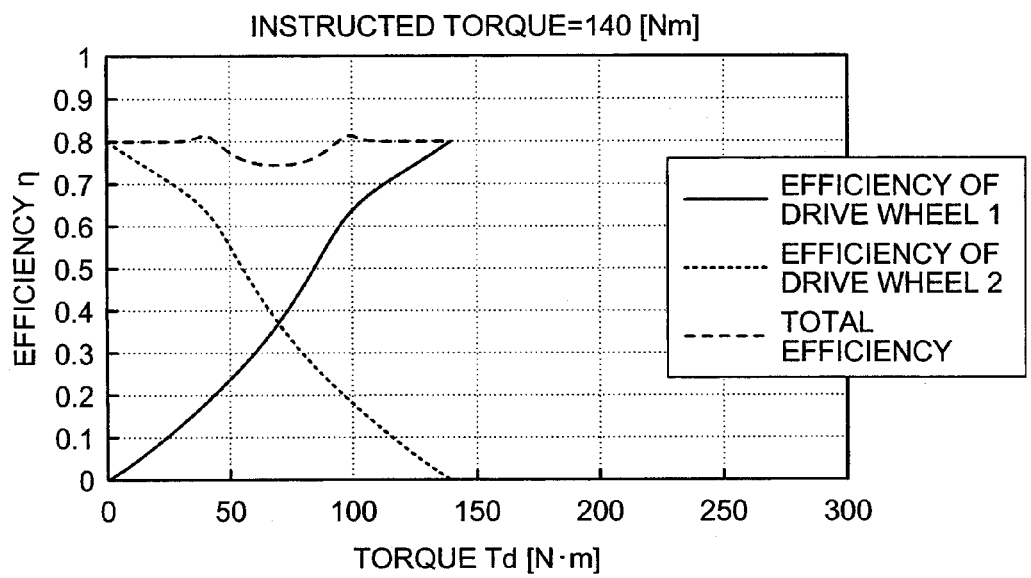
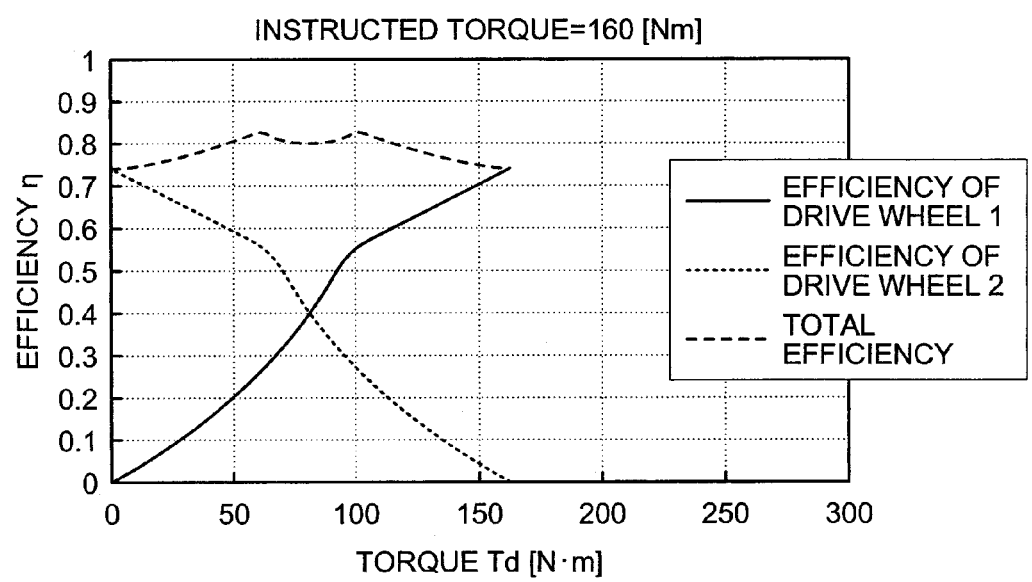

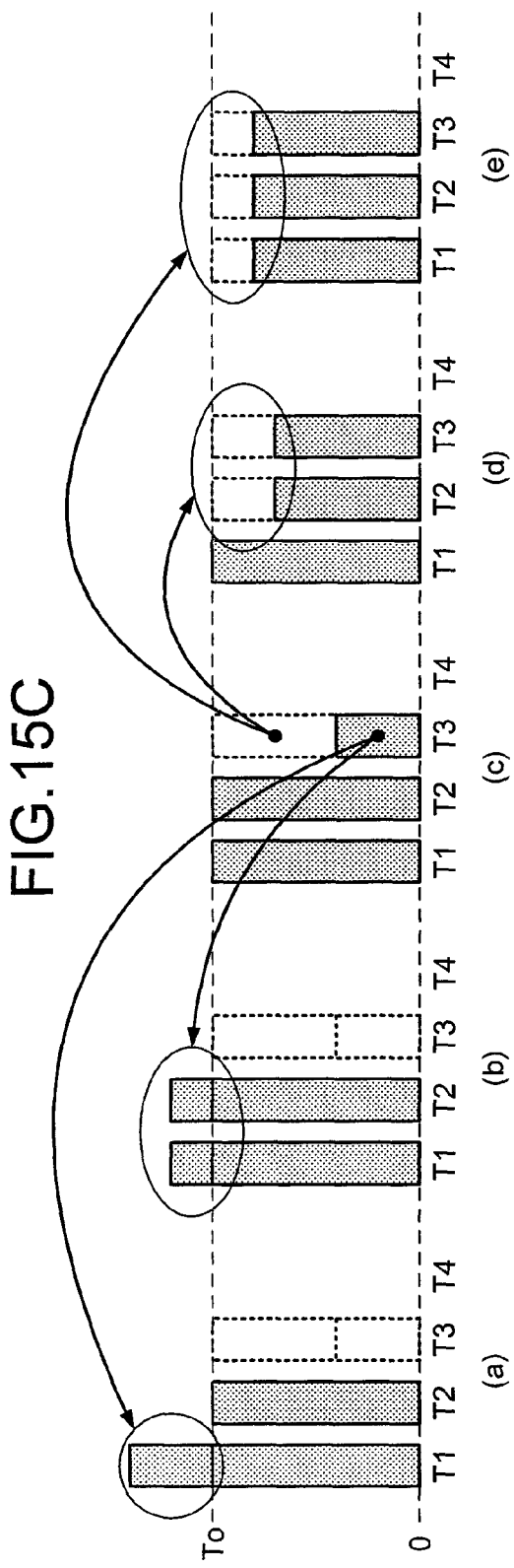

FIG.24A
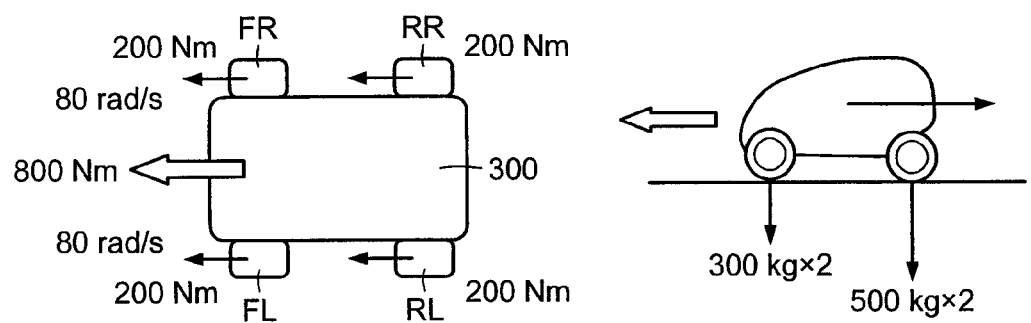
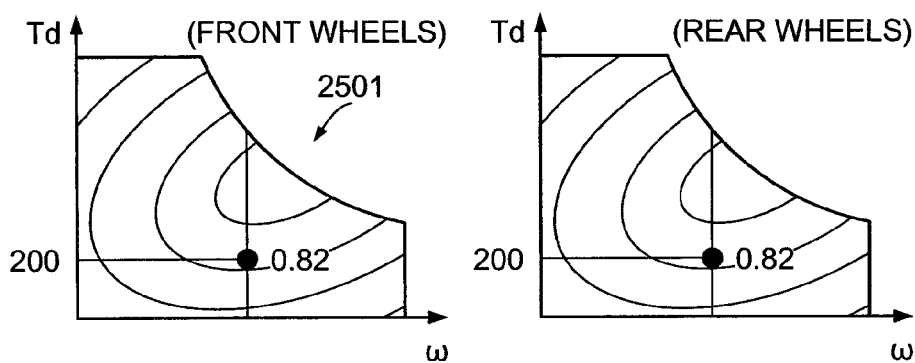
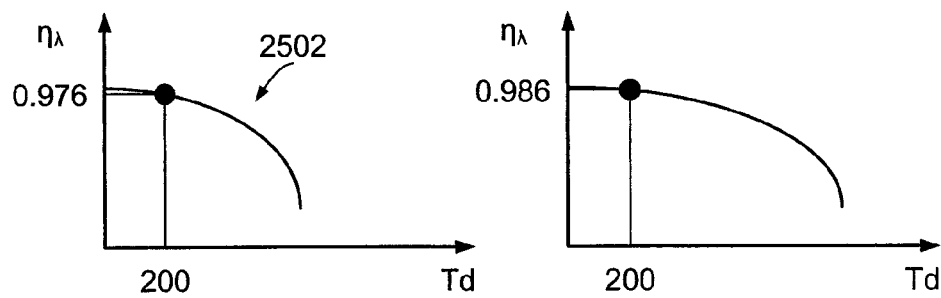
$\eta_{total}$ = (200/800×0.82×0.976)×2 + (200/800×0.82×0.986)×2
= 0.80442

FIG.24B
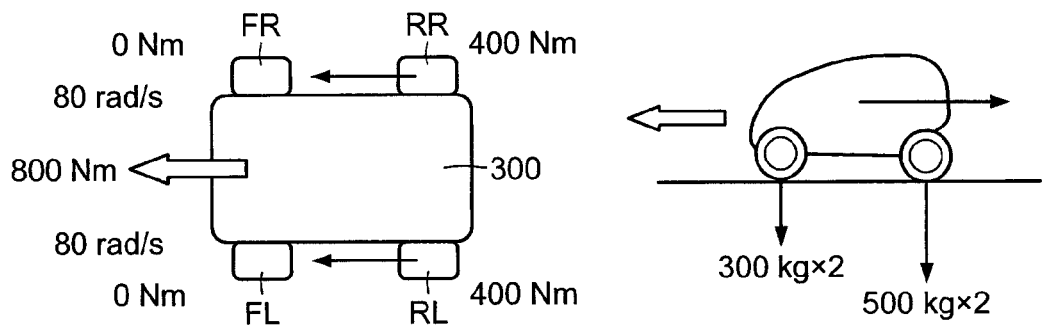
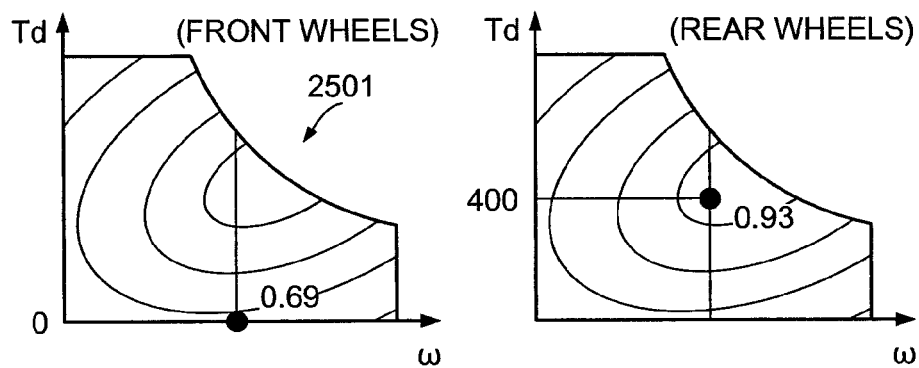
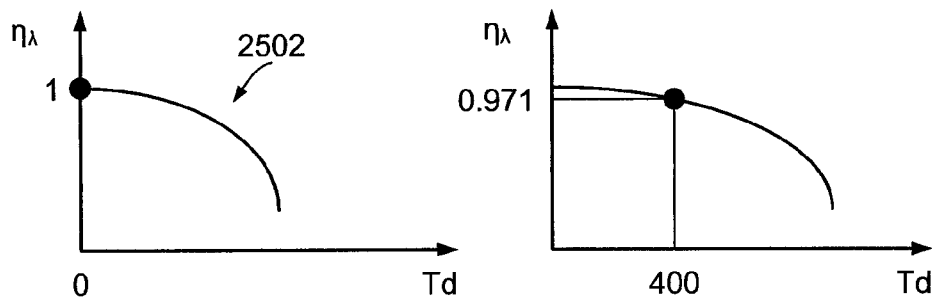
$\eta_{total}$ = $(0/800 \times 0.69 \times 1) \times 2$ + $(400/800 \times 0.93 \times 0.971) \times 2$
= 0.90303

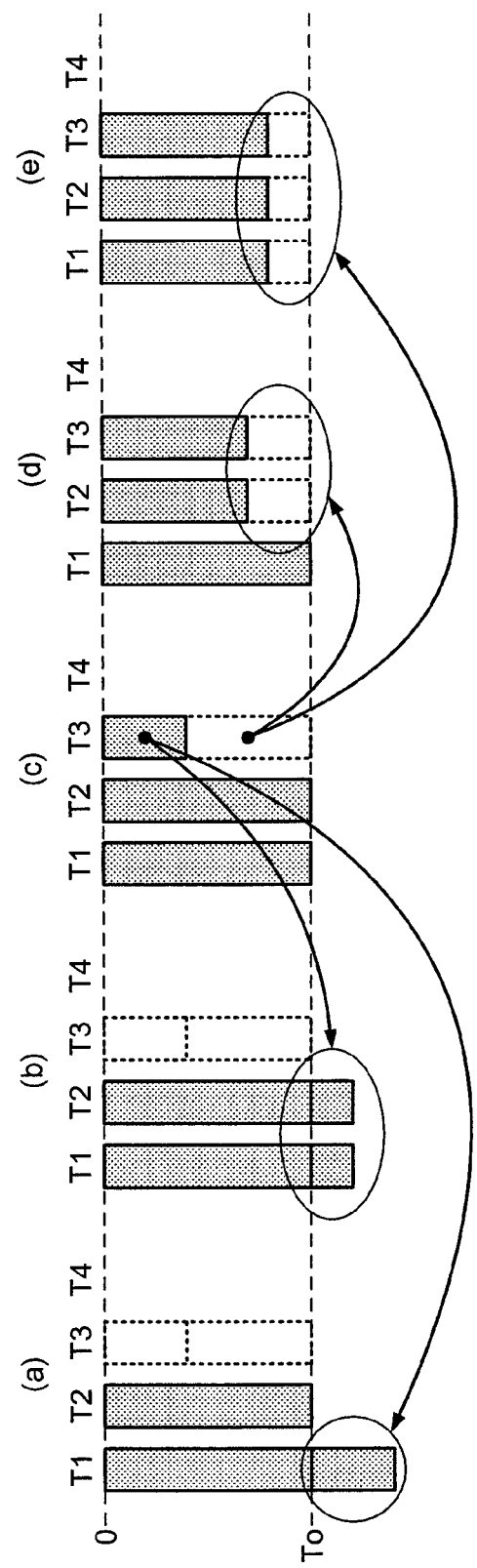

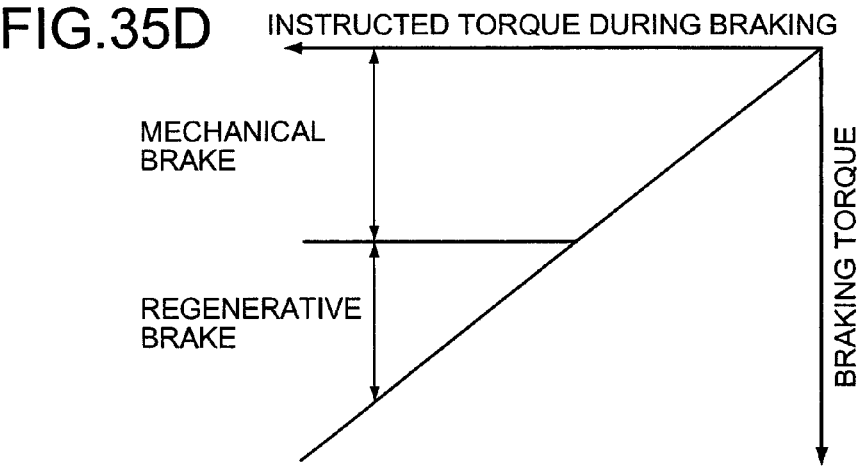
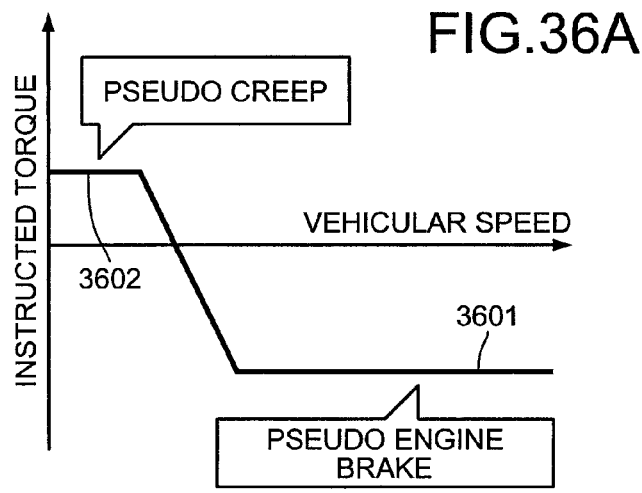
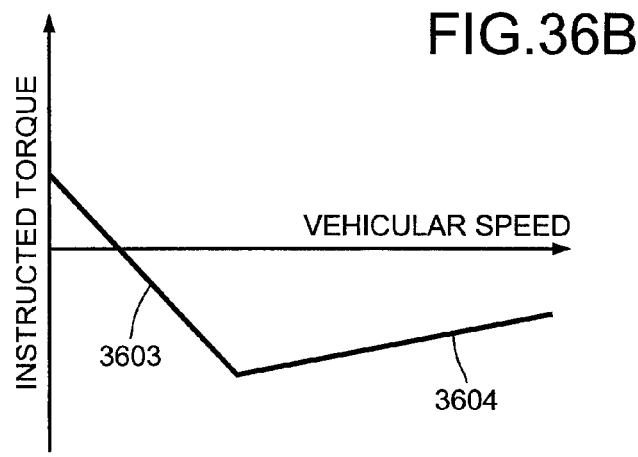

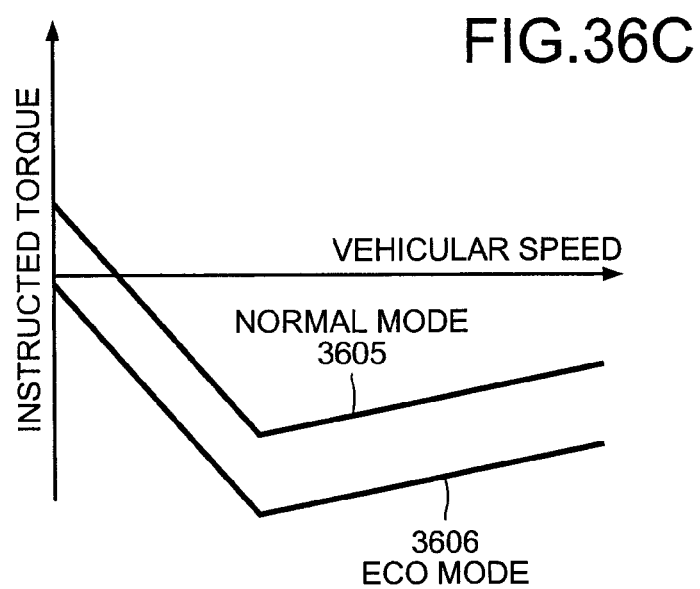

TORQUE DISTRIBUTION APPARATUS, TORQUE DISTRIBUTION METHOD, TORQUE DISTRIBUTION VALUE GENERATION METHOD, AND PROGRAM

TECHNICAL FIELD

The present invention relates to a torque distribution apparatus, a torque distribution method, a torque distribution value generation method, and a program that distribute torque when multiple drive wheels of a vehicle are driven. Nonetheless, use of the present invention is not limited to the torque distribution apparatus, the torque distribution method, the torque distribution value generation method, and the program.

BACKGROUND ART

Conventionally, electric vehicles (EV), which are mobile objects, are equipped with multiple motors, and as a means of distributing torque that drives the drive wheels (wheels), the following technologies have been disclosed.

A first technology distributes torque by calculating power consumption with respect to combinations of motor torque and by obtaining a graph that plots driving force distribution along the horizontal axis. In this configuration, magnitude relations of the power Pout [kW] that can be output and the smallest value of power consumption (hereinafter, lowest power consumption) when a motor torque combination realizing a transient, required driving force that is within a torque restriction is realized are compared. If the power Pout [kW] that can be output is judged to be greater than or equal to the lowest power consumption, the motor torque of the front-rear wheels that minimizes the power consumption is regarded to be the instructed torque as is (see, for example, Patent Document 1).

A second technology distributes total torque to multiple motors such that torque is distributed equally to the 2 front drive wheels and torque is distributed equally to the 2 rear drive wheels, by generating and using a system efficiency map indicating the torque distribution ratio that maximizes system efficiency (see, for example, Patent Document 2).

A third technology retrieves based on the required driving power and vehicle speed, a map indicating relations among fuel consumption, discharged and charged power of the electrical storage device, and front-rear wheel driving force distribution. From the extracted map, the driving force distribution that minimizes fuel consumption with respect to the discharged and charged power of the electrical storage device is extracted, whereby driving force distribution maps before and after improved fuel efficiency are obtained (see, for example, Patent Document 3).

In a fourth technology, based on vehicle speed and the required motor driving torque that corresponds to the required motor driving force and further based on the torque of each motor generator and efficiency characteristics corresponding to vehicle speed, a driving force distribution determining unit determines the distribution of driving torque among the motor generators. The driving torque distribution in a low output area and the driving torque distribution in a high output area are controlled using different patterns, and that which maximizes the efficiency of the motor generators overall is adopted (see, for example, Patent Document 4).

A fifth technology determines based on the total driving torque required of the left and the right front wheels and the rotational speed of the motor generators, the driving torque distribution between the left-front wheel and the right-front wheel such that the driving efficiency of the motor generators overall is maximized. The fifth technology further determines the driving torque distribution between the right-front wheel and left-front wheel such that only one of the motor generators is driven, according to the turning direction (see, for example, Patent Document 5).

A sixth technology enables selection between wheel torque distribution control that is based on energy efficiency (control of energy efficiency) and wheel torque distribution control that is based on the distribution of load at each wheel (control of load distribution) (see, for example, Patent Document 6).

Such control that uses the required torque and energy efficiency as parameters to make the energy efficiency relatively high when driving the front and the rear wheels of 4-wheel drive vehicles by an electric motor, is a known technique, as disclosed in, for example, Patent Document 2. Further, distribution ratios of load at the front wheels and at the rear wheels, for example, are obtained from the height of the center of mass of the 4-wheel drive vehicle, the distance from the center of mass to the front wheel, the distance between the front wheel axel and the rear wheel axel (wheel base), the width of the left and right tires (tread), the angular acceleration (horizontal acceleration) of the vehicle, acceleration of the vehicle in forward and backward directions, etc. and distribution ratios of load at the front wheels and at the rear wheels are caused to coincide with the distribution of load between the front wheels and the rear wheel, whereby the distribution of torque at the front wheels and the rear wheels is determined. Control that uses these parameters to obtain load distribution ratios for the front wheels and the rear wheels and that determines torque distribution ratios according to the load distribution ratios is a known technology as exemplified by, for example, Patent Document 7.

Patent Document 1: Japanese Laid-Open Patent Publication No. 2006-180657
Patent Document 2: Japanese Laid-Open Patent Publication No. 2006-345677
Patent Document 3: Japanese Laid-Open Patent Publication No. 2007-37217
Patent Document 4: Japanese Laid-Open Patent Publication No. 2007-313982
Patent Document 5: Published Japanese-Translation of PCT Application, Publication No. 2007/064025
Patent Document 6: Japanese Laid-Open Patent Publication No. 2009-159682
Patent Document 7: Japanese Laid-Open Patent Publication No. 2006-213130

DISCLOSURE OF INVENTION

Problem to be Solved by the Invention

Nonetheless, the technologies described in Patent Documents 1 to 7 are of a technological thought of distributing motor torque with an aim to increase motor efficiency and do not make use a motor efficiency map and distribute torque based on a torque value that is on the motor efficiency map and optimizes efficiency.

Further, with the technologies described in Patent Documents 1 to 3, each performs distribution with respect to the drive wheels in pairs, i.e., the 2 front wheels and the 2 rear wheels, and do not consider independent control of each drive wheel. The technology described in Patent Document 4 is applied to a hybrid vehicle and is applicable to only the in-wheel motors of the left and right rear wheel, which are independent. The technology does not consider independent control of each drive wheel. With such technologies, for example, independent control of 4 drive wheels is not possible and optical torque distribution with respect to multiple drive wheels cannot be performed.

Moreover, none of the technologies described in Patent Documents 1 to 7 give consideration to drive wheel (wheel) slippage and consequently, provide insufficient torque distribution that cannot achieve high efficiency. The state of slippage of drive wheels with respect to the road surface varies consequent to factors such as vehicular speed and more specifically to the rotational speed of the drive wheels, etc. Thus, without taking the state of drive wheel slippage into consideration, the efficiency obtained by distributing torque to each of the drive wheels cannot be improved and optimal torque distribution cannot be performed when the drive wheels are actually driven. Consequently, the efficiency of the drive system overall cannot be optimized to the fullest extent.

Further, none of the technologies described in Patent Documents 1 to 7 perform torque distribution that optimizes total efficiency. The vehicle travels by driving motors by a power source supplied by a battery. The motors sustain loss consequent to the state of slippage described above. The efficiency from the supply of power until motor output is the efficiency of the drive system. A vehicle that travels by the driving force of the motor, in actuality, has a propulsion system that propels the vehicle by receiving the output from the motor and the driving rotation of the tires. Loss occurs in the propulsion system as well. The efficiency from the output of the motor until output as propulsion power is the efficiency of the propulsion system. The overall efficiency of the vehicle is indicated by the efficiency of drive system×the efficiency of the propulsion system. Therefore, by considering the efficiency of the propulsion system, although total efficiency can be optimized and optimal torque distribution can be performed, since none of the Patent Documents 1 to 7 above, consider efficiency of the propulsion system, torque distribution that optimizes total efficiency cannot be performed and propulsion efficiency cannot be improved.

Overall efficiency in an electric vehicle requires improved efficiency during power running and during regeneration of the motor and optimal torque distribution during power running and during regeneration is obtained.

Means for Solving Problem

To solve the problems above and achieve an object a torque distribution apparatus according to the present invention distributes input instructed torque to motors connected to drive wheels and includes a determining unit that determines whether to perform any one among power running control and regenerative braking with respect to the drive wheels; an instructed torque acquiring unit that acquires the instructed torque input; an efficiency map acquiring unit that based on a determination result of the determining unit, acquires a motor efficiency map that corresponds to the motors; a vehicular speed detecting unit that detects vehicular speed of a vehicle on which the motors are equipped; a drive wheel rotational speed detecting unit that detects drive wheel rotational speed of the drive wheels; a slip rate calculating unit that based on the vehicular speed and the drive wheel rotational speed, calculates slip rate at the drive wheels; a calculating unit that based on the slip rate, creates an efficiency variation expression that indicates efficiency values on a performance curve that indicates relations between the drive wheel rotational speed and torque, and calculates from the efficiency variation expression on the performance curve, a torque that optimizes efficiency; a distributing unit that among combinations of torque distribution for the motors and when a determination result by the determining unit is for the power running control, calculates torque distribution values for the motors, respectively, such that overall efficiency $\eta$ total=$\Sigma((Tn/T)\times\eta_d n\times\eta\lambda n)$ (where, T: the instructed torque, Tn: torque distribution value of each motor, $\eta_d n$: drive system efficiency of each of the motors, $\eta\lambda n$: propulsion system efficiency of the drive wheels) is maximized, and when the determination result by the determining unit is for the regenerative braking, calculates the torque distribution values for the motors, respectively such that the overall efficiency $\eta$ total=$\Sigma((Tn/T)\times\eta_b n\times\eta_r n)$ (where, T: the instructed torque, Tn: the torque distribution values of the motors, $\eta_r n$: regeneration efficiency of the motors, and $\eta_b n$: the propulsion system efficiency of the motors) is maximized, the torque distribution values being calculated based on the slip rate, the instructed torque and the torque that optimizes efficiency; and a control unit that controls torque distribution to the motors, based on the calculated the torque distribution values.

A torque distribution according to the present invention is a method of distributing, by a torque distribution apparatus, input instructed torque to motors connected to drive wheels. The torque distribution method includes determining whether to perform any one among power running control and regenerative braking with respect to the drive wheels; acquiring the input instructed torque; acquiring based on a determination result at the deterring, a motor efficiency map corresponding to the motors; detecting vehicular speed of a vehicle on which the motors are equipped; detecting drive wheel rotational speed at the drive wheels; calculating slip rate based on the vehicular speed and the drive wheel rotational speed; creating based on the slip rate, an efficiency variation expression that indicates efficiency values on a performance curve that indicates relations between the drive wheel rotational speed and torque, and calculating from the efficiency variation expression on the performance curve, a torque that optimizes efficiency; calculating among combinations of torque distribution for the motors and when a determination result at the determining is for the power running control, torque distribution values for the motors, respectively, such that overall efficiency $\eta$ total=$\Sigma((Tn/T)\times\eta_d n\times\eta\lambda n)$ (where, T: the instructed torque, Tn: torque distribution value of each motor, $\eta_d n$: drive system efficiency of each of the motors, $\eta\lambda n$: propulsion system efficiency of the drive wheels) is maximized, and when the determination result at the determining is for the regenerative braking, calculating the torque distribution values for the motors, respectively such that the overall efficiency $\eta$ total=$\Sigma((Tn/T)\times\eta_b n\times\eta_r n)$ (where, T: the instructed torque, Tn: the torque distribution values of the motors, $\eta_r n$: regeneration efficiency of the motors, and $\eta_b n$: the propulsion system efficiency of the motors) is maximized, the torque distribution values being calculated based on the slip rate, the instructed torque and the torque that optimizes efficiency; and controlling based on the calculated torque distribution values, torque distribution to the motors.

A torque distribution value generation method according to the present invention is a method of generating for each motor connected to a drive wheel and by a torque distribution value generating apparatus, a torque distribution value for distributing an input instructed torque. The torque distribution value generation method includes determining whether to perform any one among power running control and regenerative braking with respect to the drive wheels; acquiring the input instructed torque; acquiring based on a determination result at the determining, a motor efficiency map that corresponds to the motors; detecting vehicular speed of a vehicle equipped with the motors; detecting drive wheel rotational speed at the drive wheels; calculating based on the vehicular speed and the drive wheel rotational speed, slip rate at the drive wheels;

creating based on the slip rate, an efficiency variation expression that indicates efficiency values on a performance curve that indicates relations between the drive wheel rotational speed and torque on the motor efficiency map, and calculating from the efficiency variation expression on the performance curve, a torque that optimizes efficiency; and calculating among combinations of torque distribution for the motors and when a determination result at the determining is for the power running control, torque distribution values for the motors, respectively, such that overall efficiency η total=Σ ((Tn/T)×η$_d$n×ηλn) (where, T: the instructed torque, Tn: torque distribution value of each motor, η$_d$n: drive system efficiency of each of the motors, ηλn: propulsion system efficiency of the drive wheels) is maximized, and when the determination result at the determining is for the regenerative braking, calculating the torque distribution values for the motors, respectively such that the overall efficiency η total=Σ ((Tn/T)×η$_b$n×η$_r$n) (where, T: the instructed torque, Tn: the torque distribution values of the motors, η$_r$n: regeneration efficiency of the motors, and η$_b$n: the propulsion system efficiency of the motors) is maximized, the torque distribution values being calculated based on the slip rate, the instructed torque and the torque that optimizes efficiency.

Further according to the invention, a program causes a computer to execute any one among the disclosed methods.

BRIEF DESCRIPTION OF DRAWINGS

FIG. 13C is a diagram depicting characteristics of a wheel, among the torque-efficiency characteristics of the Δ-type (part 3);

FIG. 13D is a diagram depicting characteristics of a wheel, among the torque-efficiency characteristics of the Δ-type (part 4);

FIG. 15C is a diagram for describing torque distribution in the case of 4 drive wheels (part 3);

FIG. 24A is a diagram depicting a calculation example of overall efficiency (part 1);

FIG. 24B is a diagram depicting a calculation example of overall efficiency (part 2);

FIG. 34C is a diagram for describing torque distribution when there are 4 drive wheels (part 3);

FIG. 35D is a diagram depicting various braking methods of blended brakes (part 4);

FIG. 36A is a diagram depicting schemes of pseudo engine braking (part 1);

FIG. 36B is a diagram depicting schemes of pseudo engine braking (part 2); and

FIG. 36C is a diagram depicting schemes of pseudo engine braking (part 3).

BEST MODE(S) FOR CARRYING OUT THE INVENTION

Preferred embodiments of a torque distribution apparatus, a torque distribution method, a torque distribution value generation method, and a program according to the present invention will be described in detail with reference to the accompanying drawings. Hereinafter, description will be given using "rotational speed" as the "rotational speed of a drive wheel".

Embodiment

Configuration of Torque Distribution Apparatus

Figure 1:
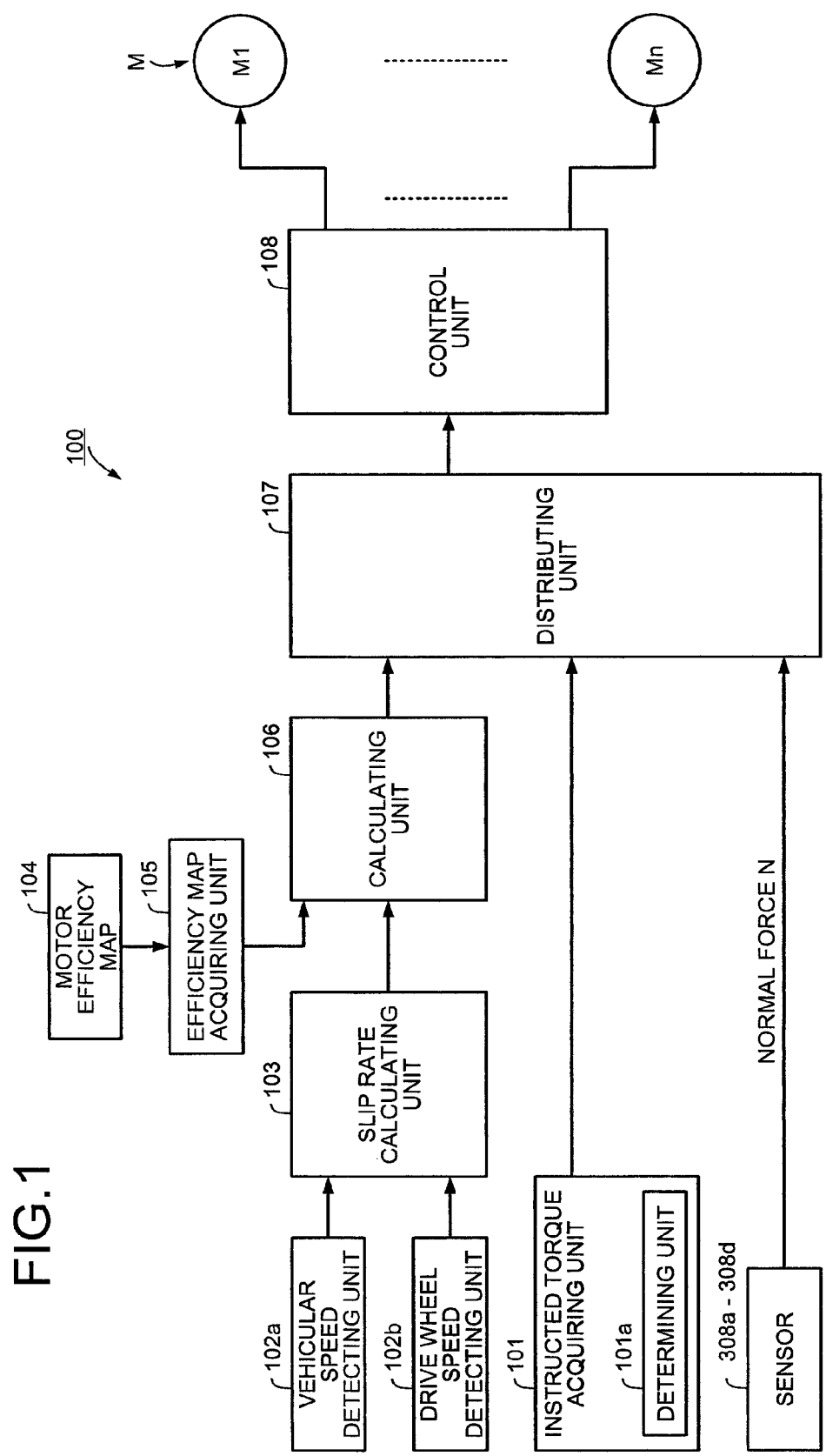
FIG. 1 is a block diagram of a functional configuration of a torque distribution apparatus according to an embodiment.

FIG. 1 is a block diagram of a functional configuration of the torque distribution apparatus according to the embodiment. A torque distribution apparatus 100 according to the embodiment uses a motor efficiency map and on the motor efficiency map, the torque that optimizes efficiency is used to control torque distribution among multiple drive wheels. Although details will be described hereinafter, during power running and regeneration, different motor efficiency maps are used to distribute torque.

The torque distribution apparatus 100 includes an instructed torque acquiring unit 101, a vehicular speed detecting unit 102a, a drive wheel speed detecting unit 102b, a slip rate calculating unit 103, a motor efficiency map 104, an efficiency map acquiring unit 105, a calculating unit 106, a distributing unit 107, and a control unit 108.

The distributing unit 107 receives input of the respective normal forces Nfl, Nfr, Nrl, and Nrr of the drive wheels FL, FR, RL, and RR from sensors 308a to 308d (refer to FIG. 3) and based on the normal force of each of the drive wheels, the distributing unit 107 increases the torque distribution ratio for drive wheels having a larger normal force N (load) and decreases the torque distribution ratio for drive wheels having a smaller normal force N (load).

The instructed torque acquiring unit 101 acquires an instructed torque for driving a vehicle. In other words, the instructed torque acquiring unit 101 acquires the instructed torque input for driving n motors M (M1, M2, . . . Mn) respectively disposed in each drive wheel. In the present embodiment, description is given assuming that the same type of motor is used for each of the motors M.

The instructed torque acquiring unit 101 includes a determining unit 101a. The determining unit 101a determines whether power running control or regenerative braking is being performed with respect to the drive wheels, and outputs the result of determination to the distributing unit 107. The determining unit 101a determines the state to be the power running state when the motor is driven such as when the accelerator pedal is pressed; and determines the state to be a regeneration state when the motor generates electrical power such as when the brake pedal is pressed and when the accelerator pedal is released during travel at a moderate speed or greater.

The vehicular speed detecting unit 102a detects the speed of the vehicle. The drive wheel speed detecting unit 102b detects the speed of the drive wheels equipped on the vehicle. The drive wheel speed $v_w$ is calculated by the tire radius r×the drive wheel rotational speed ω ($v_w$=r×ω).

Figure 5:
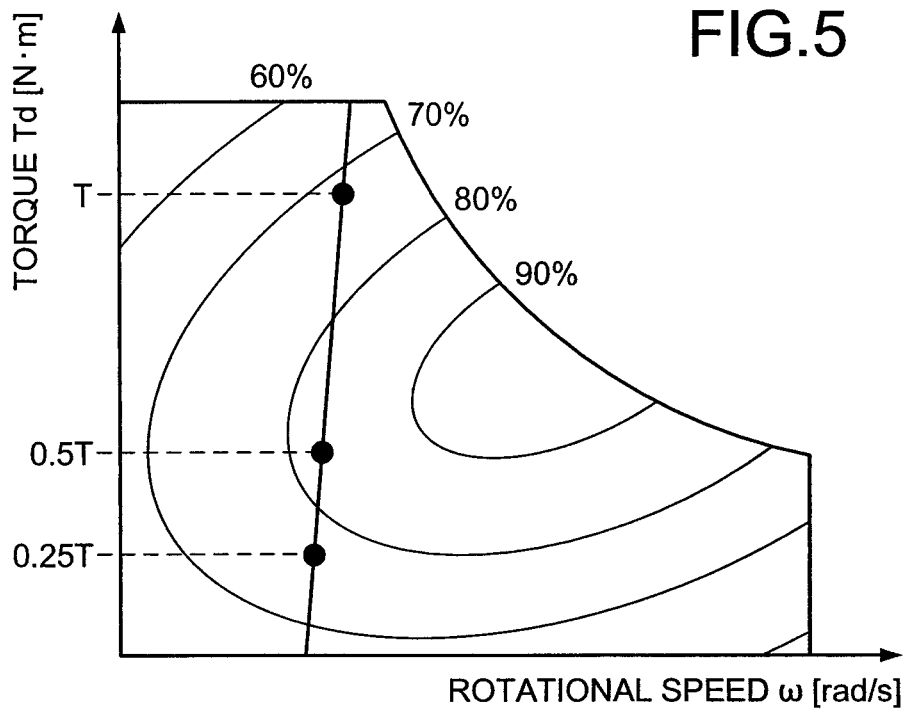
FIG. 5 is a diagram of an example of a motor efficiency map.

The slip rate calculating unit 103, as described hereinafter, calculates the slip rate at each drive wheel, based on the vehicle speed detected by the vehicular speed detecting unit 102a and the drive wheel speed (the drive wheel rotational speed and the tire diameter) detected by the drive wheel speed detecting unit 102b. The motor efficiency map 104, as described hereinafter with reference to FIG. 5, is a map depicting relations between speed and torque for each motor M; and on this map, based on torque and speed, a substantially linear performance curve can be drawn. The efficiency map acquiring unit 105 acquires the motor efficiency map 104 that corresponds to the motor M. Here, based on the determination result of the determining unit 101a, efficiency map acquiring unit 105 acquires a motor efficiency map for power running during power running and acquires a motor efficiency map for regeneration during regeneration.

As a means of acquiring the motor efficiency maps, 1. motor efficiency maps prepared in advance by the manufacturer of the motor or of the vehicle are retained in memory; 2. motor efficiency maps are created during travel of the vehicle, etc. may be considered.

The calculating unit 106 creates based on the slip rate calculated by the slip rate calculating unit 103, an efficiency variation expression that indicates an efficiency value on a performance curve indicating relations between rotational speed and torque; and calculates a torque that optimizes efficiency in the efficiency variation expression on the performance curve.

The distributing unit 107, as described hereinafter, calculates torque distribution value for each motor M, based on the instructed torque acquired by the instructed torque acquiring unit 101 and the torque that optimizes efficiency calculated by the calculating unit 106. The control unit 108 controls the torque distributed to each of the motors M based on the torque distribution values calculated by the distributing unit 107.

(Torque Distribution Process)

Figure 2:
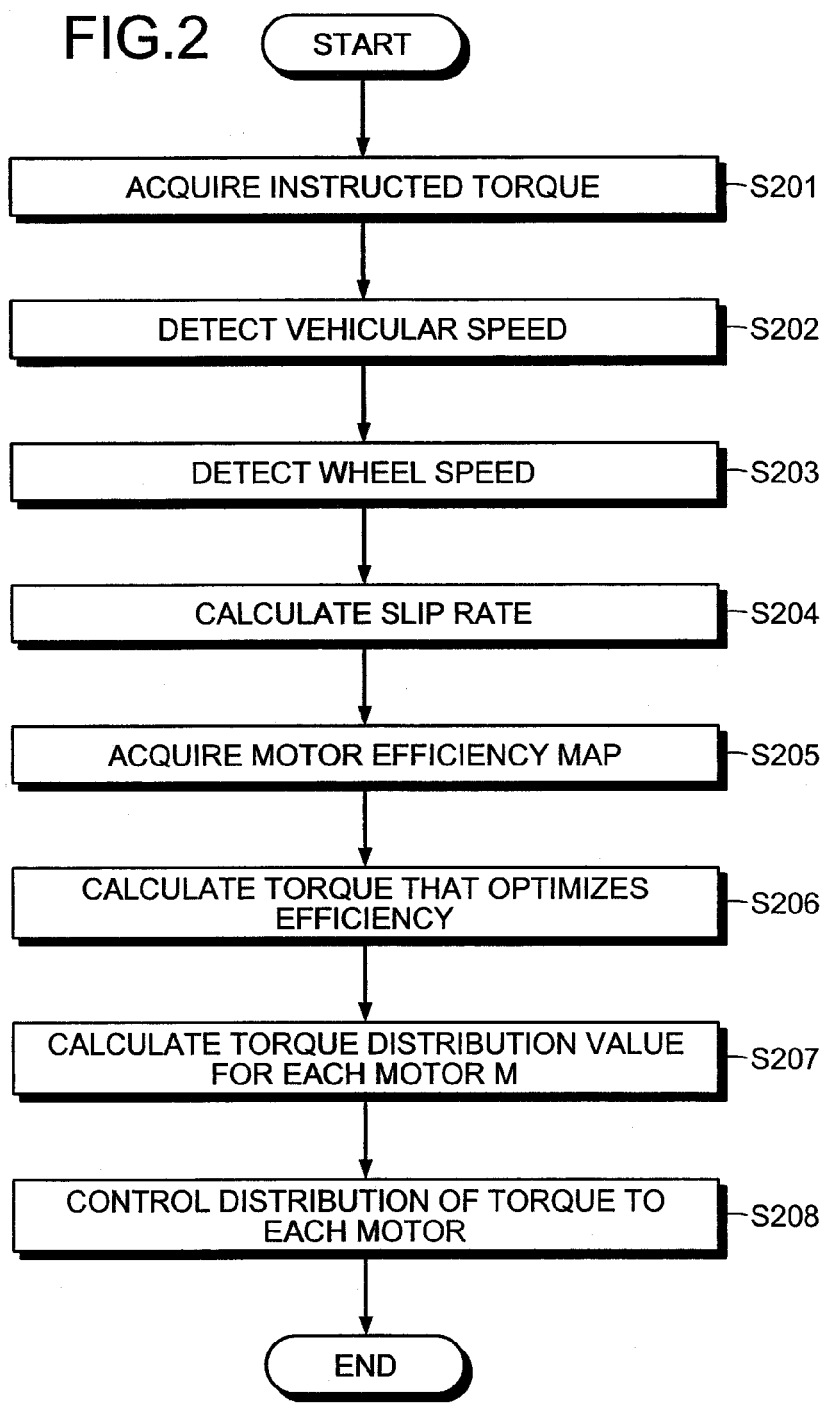
FIG. 2 is a flowchart of a procedure of a torque distribution process performed by the torque distribution apparatus.

FIG. 2 is a flowchart of a procedure of a torque distribution process performed by the torque distribution apparatus. The instructed torque acquiring unit 101 acquires an instructed torque T that is input from the accelerator pedal and are for driving each of the motors M (M1, M2, . . . Mn) disposed in the drive wheels (step S201). The vehicular speed detecting unit 102a detects the vehicular speed of the vehicle (step S202), and the drive wheel speed detecting unit 102b detects the wheel speed at the drive wheels (step S203). The slip rate calculating unit 103 calculates the slip rate at each drive wheel, using the vehicular speed and the drive wheel speed (drive wheel rotational speed and tire diameter) (step S204).

The efficiency map acquiring unit 105 acquires the motor efficiency map 104 corresponding to the motor M (step S205). The calculating unit 106 creates based on the wheel speed detected by the drive wheel speed detecting unit 102b and the slip rate calculated by the slip rate calculating unit 103, an efficiency variation expression that indicates an efficiency value on a performance curve indicating relations between the rotational speed and torque; and calculates a torque that optimizes efficiency To in the efficiency variation expression on the performance curve (step S206). The distributing unit 107 calculates a torque distribution value for each motor M, based on the instructed torque T acquired by the instructed torque acquiring unit 101 and the torque that optimizes efficiency To calculated by the calculating unit 106 (step S207). The control unit 108 controls the distribution of torque to each of the motors M, based on the torque distribution values calculated by the distributing unit 107 (step S208).

Although in general, the performance curve on the motor efficiency map is linear, in actuality, if torque distribution changes, drive wheel torque varies and according to the drive wheel torque variation, the rotational speed of the drive wheel varies. Therefore, under the condition that the vehicular speed remains constant, the performance curve on the motor efficiency map is not a straight line, but rather a slope (strictly speaking, a curve) as described hereinafter with reference to FIG. 5. Efficiency values for the torque values on the performance curve can be represented as torque-efficiency characteristics. Since the torque-efficiency characteristics are curves as described hereinafter with reference to FIG. 10, the torque by which the efficiency is maximized appears. This torque is called the torque that optimizes efficiency To. Taking the torque that optimizes efficiency To as a standard, all of the instructed torque T is distributed to the n motors M by a given torque distribution.

An example of the distribution of torque to the n motors M by the distributing unit 107 will be described. The distributing unit 107 distributes all of the torque that optimizes efficiency To to only a portion of the motors M among the n motors, or to all of the motors M, or equally distributes the instructed torque T such that the torque distribution values of a portion of the motors M maximally approach the torque that optimizes efficiency To.

Here, the efficiency variation expression indicating efficiency values on the performance curve that indicates relations between wheel speed and slip rate as well as between rotational speed and torque is obtained by the following procedure.

1. Detect current vehicular speed
2. Detect current drive wheel speed
3. Calculate slip rate
4. Detect current torque from motor driving current
5. Calculate performance curve expression (using expression (8) described hereinafter)
6. Draw performance curve on efficiency map, along performance curve, acquire multiple points of combinations of torque value and efficiency value
7. Create efficiency variation expression from multiple points of torque value and efficiency value Here, the greater the number of points, the greater the accuracy of the approximation expression of the efficiency variation expression is.

A torque Td is $\mu \cdot N \cdot r$ ($\mu$: friction coefficient of road surface and tier; N: normal force; r: tire radius) (expression (5) described hereinafter) and therefore, if the torque Td changes, the friction coefficient $\mu$ varies. If the friction coefficient $\mu$ varies, a slip rate $\lambda$ varies (depicted in FIG. 6). If acceleration and deceleration are not great, variation of a rotational speed v is small and therefore, if the slip rate $\lambda$ varies, the rotational speed $\omega$ varies. In other words, according to the torque value given to a drive wheel, the rotational speed of the drive wheel varies. This relation is described hereinafter with reference to expression (8) and FIG. 7. To use expression (8), the relation between slip rate and friction coefficient (described hereinafter with reference to expression (6)) is used. Concerning this relation, expression (6) for the traveled road surface is acquired from a server that is outside the vehicle, or is created by the vehicle.

Equation (6) for the relation between slip rate and friction coefficient is created by the vehicle according to the following procedure.

1. Detect current vehicular speed and drive wheel rotational speed, and obtain slip rate $\lambda$
2. Obtain torque value from current motor driving current, and calculate $\mu$ value from $Td=\mu \cdot N \cdot r$
3. Obtain multiple points for $\lambda$ and $\mu$ values during travel, create $\mu$–$\lambda$ characteristics of FIG. 6, and generate expression (6).

The torque value is obtained by multiplying a preliminarily known torque constant by the driving current. Further, in this case, since travel normally occurs without idle rotation of the tires, a $\lambda$ value and a $\mu$ value (in FIG. 6, $\lambda$ is 0.2 or less) that are within a range that does not exceed a peak portion of $\mu$ can be detected. Although a point in a range that does not exceed the peak portion of $\mu$ (in FIG. 6, $\lambda$ is 0.2 or greater) cannot be detected, in the present invention, a required area is a range that does not exceed the peak portion of $\mu$ and therefore, if $\mu$–$\lambda$ characteristics of the area are created and expression (6) is generated, no problem arises.

The torque distribution apparatus 100 having the configuration described above takes into consideration the calculated slip rate when calculating the torque that optimizes efficiency To on the motor efficiency map 104. Although the state of drive wheel slippage with respect to the road surface varies consequent to factors such as vehicular speed and more specifically to the rotational speed of drive wheels, etc., by taking the state of slippage of the drive wheels into consideration, the efficiency obtained by distributing torque to each of the drive wheels can be improved; optimal torque distribution can be performed when the drive wheels are actually driven; and since the motors can be driven in an area where the motor efficiency is high, the efficiency of the drive system overall can be optimized to the fullest extent. This drive system points to a configuration related to vehicle driving by a motor and inverter.

EXAMPLE

First Example

Configuration for Improving Driving Efficiency

In a first example of the present invention a configuration for improving driving efficiency will be described. In the first example, an example of application of the torque distribution apparatus in a vehicle equipped with in-wheel motors that are built into 4 drive wheels respectively and independently drive the drive wheels. In this case, the number of motors M used is 4, M1 to M4. A 3-phase alternating current motor or a DC motor can be used for the motors M. In the example hereinafter, the same motor is used in each of the 4 drive wheels. As described hereinafter, the drive wheels are not limited to 4 and the present invention is applicable to 2, 3, 5 or more drive wheels (Configuration of Vehicle)

Figure 3:
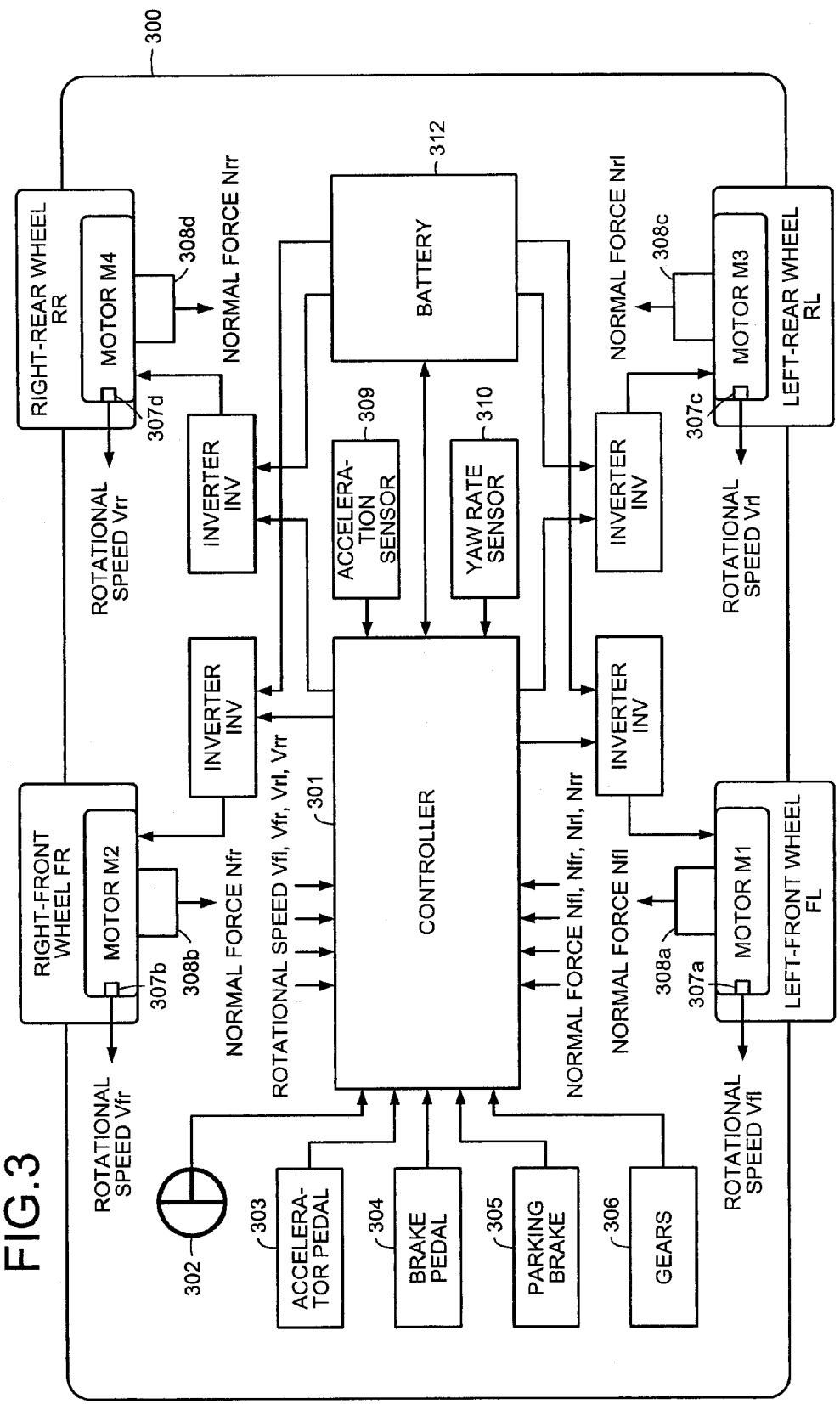
FIG. 3 is a diagram depicting a configuration of a vehicle.

FIG. 3 is a diagram depicting a configuration of the vehicle. A vehicle 300 is a 4-wheel drive vehicle having left and right front drive wheels FL, FR and left and right rear drive wheels RL, RR. These 4 drive wheels FL, FR, RL, and RR are equipped with the in-wheel motors M1 to M4, respectively and are independently driven.

The motors M1 to M4 are each equipped with an inverter INV for driving the motors. The inverters INV drive the motors M1 to M4, under the control of a controller (ECU) 301. The controller 301 receives input of various types of information and consequent to the distribution of torque, drives the motors M1 to M4.

Input to the controller 301 includes the following. The steering angle is input from a steering wheel 302. The instructed torque is input from an accelerator pedal 303. The braking amount is input from a brake pedal 304. The parking brake amount is input from a parking brake 305. The gear position such as reverse, neutral and drive is input by gears 306.

Further, the drive wheels FL, FR, RL, and RR are each equipped with a sensor 307a to 307d that detects a rotational speed V. The rotational speeds Vfl, Vfr, Vrl, and Vrr of the drive wheels FL, FR, RL, and RR are input to the controller 301. The drive wheels FL, FR, RL, and RR are each equipped with a sensor 308a to 308d that detects the normal force N subjected to the tires from the ground. The normal force Nfl, Nfr, Nrl, and Nrr of each of the drive wheels FL, FR, RL, RR is input to the controller 301.

The vehicle 300 is equipped with an acceleration sensor 309 and the detected acceleration is input to the controller 301. The vehicle 300 is further equipped with a yaw rate sensor 310 and the detected yaw rate is input to the controller 301.

The controller 301 drives the drive wheels FL, FR, RL, and RR, based on the above input. A control signal for driving, is supplied to the motors M1 to M4, via the inverter INV, and suitably distributes torque to each of the drive wheels FL, FR, RL, and RR.

A battery 312 supplies power to the entire vehicle 300. In particular, the battery 312 is a drive source for driving the motors M1 to M4 of the drive wheels FL, FR, RL, RR, via the inverter INV. A secondary cell such as a nickel metal hydride and a lithium ion secondary cell, or a fuel cell can be adopted as the battery 312.

During regeneration at the vehicle 300, the inverter INV converts the alternating voltage generated by the motors M1 to M4 into direct voltage and can supply the resulting direct voltage to the battery 312. Regeneration is the generation of electric power when the driver of the vehicle 300 manipulates the brake pedal 304, and the generation of electric power by an easing of the force applied to the accelerator pedal 303 during travel.

Driving efficiency is expressed by driving efficiency $\eta$=motor M output/power supplied by battery 312=$(T \times \omega)/(V \times I)$.

(Hardware Configuration of Torque Distribution Apparatus)

Figure 4:
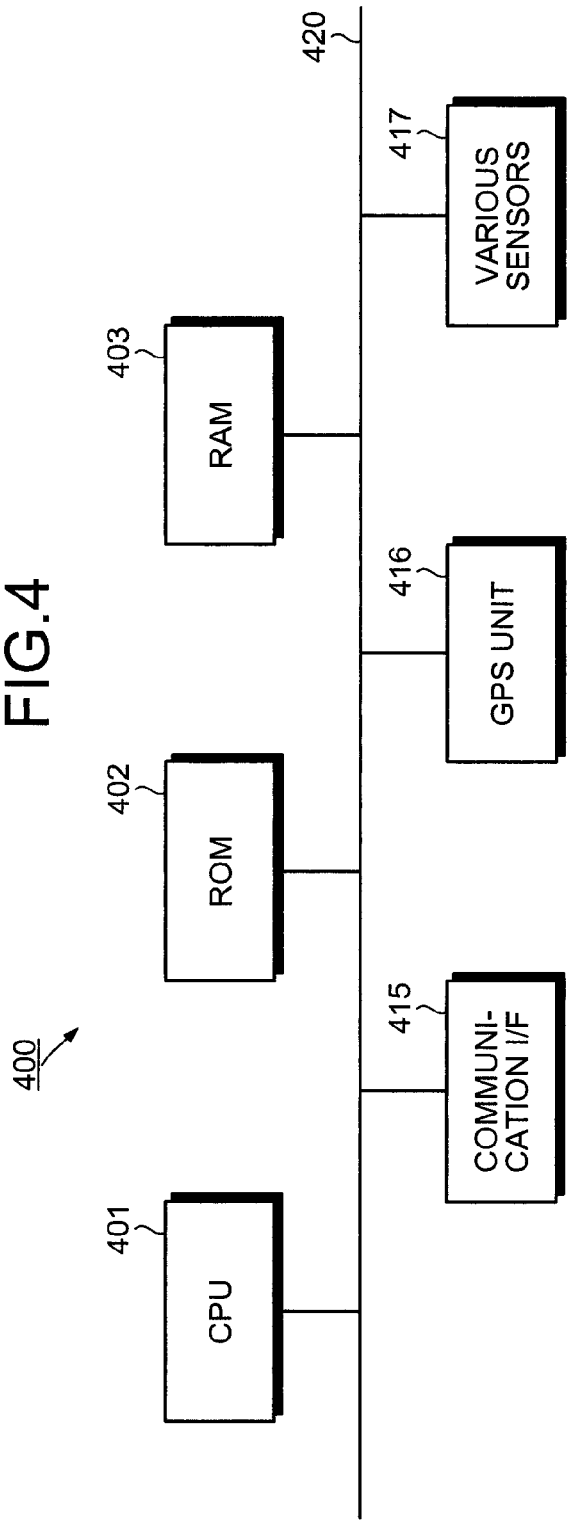
FIG. 4 is a block diagram of a hardware configuration of the torque distribution apparatus.

A hardware configuration of a torque distribution apparatus 400 will be described. FIG. 4 is a block diagram of a hardware configuration of the torque distribution apparatus. In FIG. 4, the torque distribution apparatus 400 includes a CPU 401, ROM 402, RAM 403, a communication I/F 415, a GPS unit 416, and various sensors 417, respectively connected by a bus 420.

The CPU 401 governs overall control of the torque distribution apparatus 400. The ROM 402 stores programs such as a boot program and the torque distribution program and can further store the motor efficiency maps. The RAM 403 is used as a work area of the CPU 401. In other words, the CPU 401 uses the RAM 403 as a work area and executes programs stored on the ROM 402 to thereby govern overall control of the torque distribution apparatus 400.

The communication I/F 415 is wirelessly connected to a network and functions as an interface of the torque distribution apparatus 400 and the CPU 401. Among communication networks functioning as the network are public line and mobile telephone networks, as well as dedicated short range communication (DSRC), LANs, and WANs. The communication I/F 415 is, for example, a module for connecting to public lines, an ETC unit, an FM tuner, a vehicle information and communication system (VICS)/beacon receiver and the like.

The GPS unit 416 receives signals from GPS satellites, and outputs information indicating the current position of the vehicle. Information output by the GPS unit 416 is used in conjunction with values output by the various sensors 417 described hereinafter when the current position of the vehicle is calculated by the CPU 401. Information indicating the current position is, for example, information that identifies 1 point on map data such as longitude/latitude, altitude, and the like.

Here, in a case where the slip rate and friction coefficient ($\mu$-$\lambda$) characteristic of the travelled road surface is acquired from a server outside the vehicle, the communication I/F 415 and the GPS unit 416 are used. The various sensors 417 are used in the detection of vehicular speed and the normal force. The vehicular speed, for example, is detected by the following methods.

1. Integration of acceleration sensor output
2. Calculated from rotational speed of non-driving wheels
3. Calculated from travelled distance per unit time obtained by GPS and/or other positioning sensors To detect the normal force, load sensors disposed at each tire are used or the following methods are used.

1. Obtain displacement of center of mass position from output of accelerator sensor and calculate load balance of front wheels and rear wheels
2. Obtain displacement of center of mass position from output of yaw rate sensor and calculate load balance of front wheels and rear wheels
3. Obtain displacement of center of mass position from output of inclination sensor (gyro) and calculate load balance of front wheels and rear wheels, as well as right wheels and left wheels Functions of the calculating unit 106, the distributing unit 107, and the control unit 108 of the torque distribution apparatus 100 depicted in FIG. 1 are implemented by controlling each of the components in the torque distribution apparatus 400 by executing on the CPU 401, a given program by using the programs and data stored in the ROM 402 and the RAM 403 of the torque distribution apparatus 400.

(Torque Distribution Control by Torque Distribution Apparatus: During Power Running)

The torque distribution apparatus 400 of the present example performs optimization such that the efficiency of the drive system is maximized. The torque provided to the drive wheels is indicated as T1, T2, T3, T4 respectively for the drive wheels; the efficiency is indicated as η1, η2, η3, η4; and the overall efficiency η of the 4 wheels is express by expression (1).

$$\eta = (T1 \cdot \eta 1 + T2 \cdot \eta 2 + T3 \cdot \eta 3 + T4 \cdot \eta 4)/T \quad (1)$$

(total driving torque T=T1+T2+T3+T4)

FIG. 5 is a diagram of an example of the motor efficiency map. The horizontal axis represents rotational speed and the vertical axis represents torque. The following may be considered when in FIG. 5, efficiency that is obtained from a performance curve C that is linear when the vehicle is traveling at a constant speed, is used for drive wheel selection.

(1) torque driving by 4 wheels
(2) torque driving by 2 wheels
(3) torque driving by only 1 wheel
(1) In the case of torque driving by 4 wheels (distribute ¼ (0.25) of torque to each of the 4 wheels)
η1=0.25·0.77+0.25·0.77+0.25·0.77+0.25·0.77=0.77
(2) In the case of torque driving by 2 wheels (distribute ½ (0.5) of torque to each of the 2 wheels)
η2=0.5·0.83+0.5·0.83+0+0=0.83
(3) In the case of torque driving by only 1 wheel (distribute all (1) of torque to only 1 wheel)
η3=1·0.72+0+0+0=0.72

According to the description above, it can be seen that torque efficiency improves by performing torque distribution that has a lot of torque in an area where efficiency is high.

Here, relations between torque and rotational speed will be described.

A motion expression of the drive wheels and the driving force of a drive wheel are represented as expressions (2), (3), (4).

$$J_w \frac{d\omega}{dt} = T_m - T_d \quad (2)$$

$$F_d = \mu \times N \quad (3)$$

$$T_d = F_d \times r \quad (4)$$

(Tm: instructed torque for motor; Td: driving torque of drive wheel; Fd: driving force; Jw: moment of inertia of drive wheel; μ: friction coefficient of road surface, tire; N: normal force; r: tire radius)

Here, the driving torque of the drive wheel means the torque of the motor equipped in the drive wheel.

If abrupt acceleration or deceleration are not performed, variations in speed are gradual and therefore, variation of the rotational speed is low and expression (5) below is obtained.

$$d\omega/dt \approx 0 \quad (5)$$

That is, an instructed torque Tm for the motor and the driving torque Td of the drive wheel are approximately equal, $$\therefore Tm \approx Td = Fd \cdot r = \mu \cdot N \cdot r$$

Hereinafter, description will be continued assuming that variation of the vehicular speed is gradual, and the instructed torque Tm of the motor and the driving torque Td of the drive wheel are approximately equal.

Figure 6:
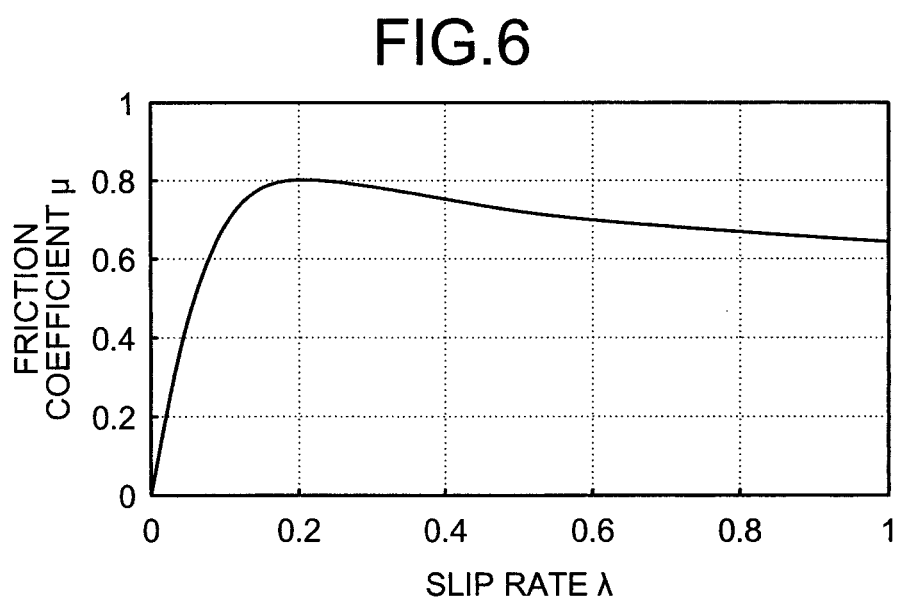
FIG. 6 is a diagram depicting relations between slip rate and friction coefficients.

FIG. 6 is a diagram depicting relations between slip rate and friction coefficients. The horizontal axis represents the slip rate λ. The vertical axis represents the friction coefficient μ. The slip rate λ and the friction coefficient μ have the relation depicted in FIG. 6 and can be approximated by expression (6) below. In the characteristics diagram depicted in FIG. 6, the friction coefficient μ is greatest when the slip rate λ is 0.2. A slip rate λ of 1 corresponds to idle rotation of the drive wheel. By performing control to suppress the slip rate λ to be within a range of 0 to 0.2, propulsion is enabled without idle rotation of the drive wheel. Further, concerning the characteristics depicted in FIG. 6, the maximum value of μ and the value of λ that maximizes μ, vary consequent to the state of the tire and/or road surface. Even in this case, by changing the values of the parameters B, C, D, E in expression (6) approximation can be performed. However, in general, since sudden changes in the surface of the tires and asphalt roads are rare, changes in the μ–λ characteristics during travel are gradual.

$$\mu = D \times \sin\left(C \times \tan^{-1}(B \times (1-E) \times \lambda) + \frac{E}{B} \times \tan^{-1}(B \times \lambda)\right) \quad (6)$$

$$(B = 10, C = 1.5, D = 0.8, E = 0.2)$$

Further, $$\lambda = (r \cdot \omega - v)/(r \cdot \omega) = 1 - v/(r \cdot \omega) \quad (7)$$

Therefore, Td is expressed by expression (8).

$$Td = Fd \cdot r = \mu \cdot N \cdot r \quad (8)$$

If abrupt acceleration or deceleration is not performed, variations in the speed are gradual and therefore, a vehicular speed v may be assumed to be substantially constant and the relation between Td and ω can be obtained by expression (8).

Figure 7:
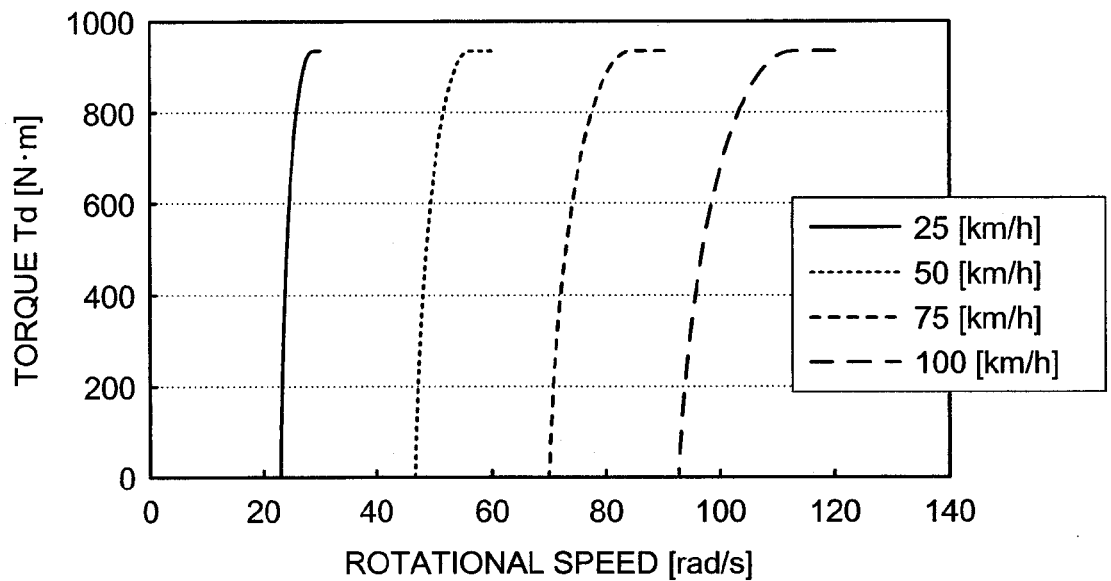
FIG. 7 is a diagram depicting relations between rotational speed and torque, taking the slip rate into consideration.

FIG. 7 is a diagram depicting relations between the rotational speed and torque, taking the slip rate into consideration. The torque and rotational speed calculated based on the expression above are depicted. Here, the normal force N: 400 [kg]×9.8 [m/s$^2$]; tire radius r: 0.3 [m]; the vehicular speed v=25, 50, 75, 100 [km/h] are assumed.

Therefore, if the torque of the drive wheel varies consequent to a changing of the torque distribution, the rotational speed correspondingly varies. The curves according to vehicular speed depicted in FIG. 7 are not straight lines but rather gradually slope as torque increases and are change curves that become saturated at the maximum torque.

Figure 8:
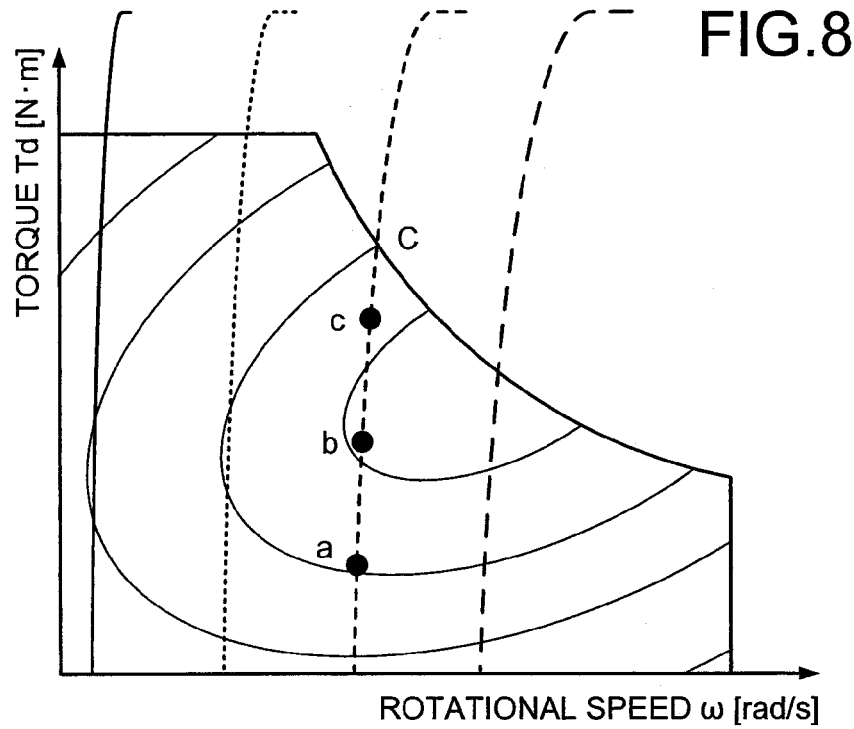
FIG. 8 is a diagram depicting a change curve depicted in FIG. 7 superimposed on a motor efficiency map.

FIG. 8 is a diagram depicting the change curve depicted in FIG. 7 superimposed on a motor efficiency map. The horizontal axis represents the rotational speed ω and the vertical axis represents the torque Td. In the present example, the motor efficiency map includes not only the characteristics of the motor M, but also depicts characteristics that include the characteristics (efficiency) of the inverter INV included in the drive system.

As depicted in FIG. 8, in the performance curve C of a given speed (e.g., 75 [km/h]), when the torque of 1 drive wheel is at a point_a and the torque of the drive wheel varies greatly consequent to changing the torque distribution, other points such as point_b and point_c on the performance curve C move. In this case, since the performance curve C is sloped, the value of the rotational speed ω also increases. Therefore, if torque distribution is performed without taking variation of the rotational speed ω into consideration, proper operating points are not known and consequently, margins of error arise in the efficiency values. Therefore, as depicted in FIG. 8, by drawing performance curves for each vehicular speed on motor efficiency map, and obtaining torque-efficiency relations, even when the torque distribution varies, the efficiency can be properly calculated.

Figure 9A:
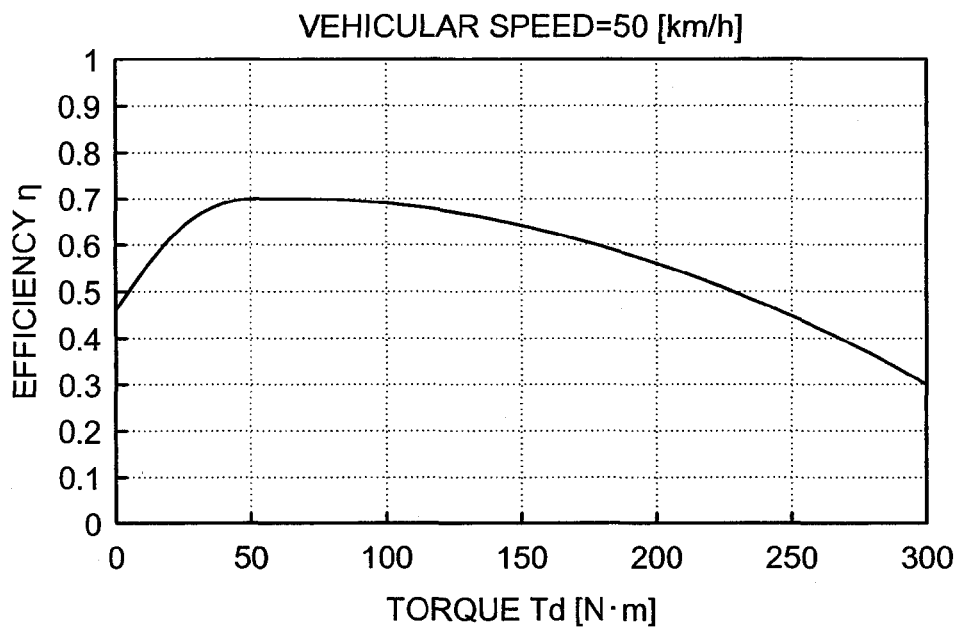
FIG. 9A is a diagram depicting relations between torque and efficiency that change according to vehicular speed (part 1)
Figure 9B:
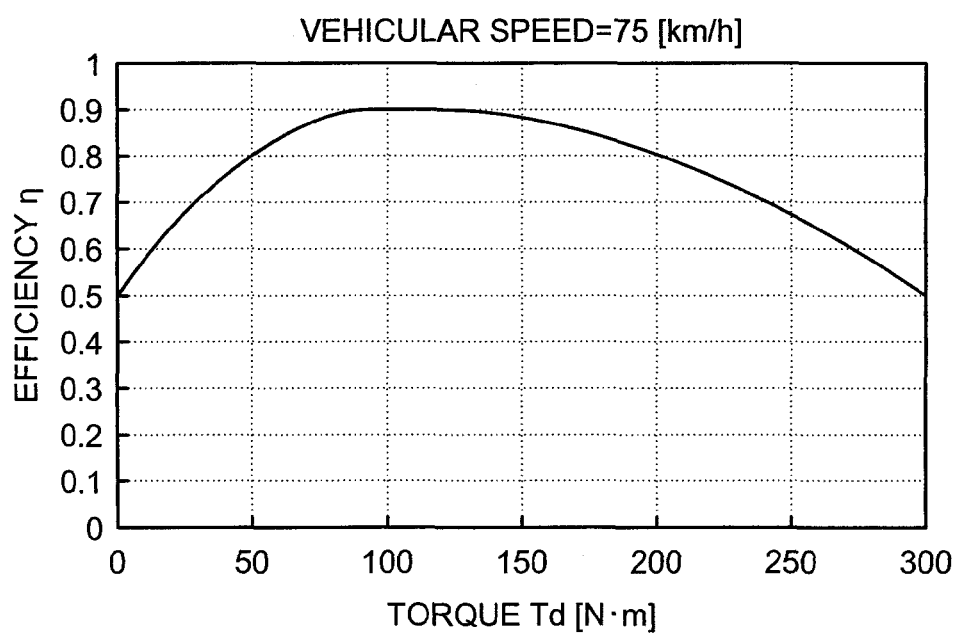
FIG. 9B is a diagram depicting relations between torque and efficiency that change according to vehicular speed (part 2)

FIGS. 9A and 9B are diagrams depicting relations between torque and efficiency that change according to vehicular speed. FIG. 9A depicts torque-efficiency characteristics on a performance curve when the vehicular speed is 50 [km/h]. FIG. 9B depicts torque-efficiency characteristics on a performance curve when the vehicular speed is 75 [km/h].

Further, the efficiency η obtained by a sixth order approximation of the performance curve corresponding to FIG. 9A is:

$$\eta = -1.7088E\text{-}14Td^6 + 1.8521E\text{-}11Td^5 - 7.9786E\text{-}09Td^4 + 1.7336E\text{-}06Td^3 - 2.0447E\text{-}04Td^2 + 1.1782E\text{-}02Td + 4.4673E\text{-}01 \quad (9)$$

Further, the efficiency η obtained by a sixth order approximation of the performance curve corresponding to FIG. 9B is:

$$\eta = 1.1253E\text{-}14Td^6 - 1.0197E\text{-}11Td^5 + 3.2448E\text{-}09Td^4 - 3.5952E\text{-}07Td^3 - 2.6286E\text{-}05Td^2 + 7.8911E\text{-}03Td + 4.9954E\text{-}01 \quad (10)$$

By substituting a value for the torque Td in the approximation expression above, the efficiency η can be obtained. According to expression (1), in the case of 4-wheel drive, the greatest $T1\cdot\eta1 + T2\cdot\eta2 + T3\cdot\eta3 + T4\cdot\eta4$ within a conditional range of $T1+T2+T3+T4=T$ (instructed torque), is the optimal efficiency.

A calculation method of the slip rate will be described. The slip rate λ is defined by expression (11) below.

$$\lambda = \frac{v_w - v}{v_w} = \frac{r \times \omega - v}{r \times \omega} \quad (11)$$

Here, (v: vehicular speed; $v_w$: drive wheel speed; ω: drive wheel rotational speed; r: tire radius); and since the greater among v and $v_w$ is the denominator, during acceleration, the denominator is $v_w$ as above and during deceleration, the denominator is v. Supplemental description will be given concerning differences between the vehicular speed, the drive wheel speed, and the drive wheel rotational speed. By multiplying the rotational speed of the tire by the tire radius, traveling speed of the tire is obtained. When the motors are driven and the vehicle is traveling, the speed of the tires is slower than the speed of the vehicle. Meanwhile, when braking of the motors occurs while the vehicle is traveling, the speed of the tires is slower than the speed of the vehicle. The slip rate indicates the relation between tire speed and vehicular speed and is expressed by expression (12).

slip rate=(wheel speed−vehicular speed)/the greater among vehicular speed and wheel speed $$\lambda = (v_w - v)/\text{Max}(v_w, v) \quad (12)$$

For the wheel of a motor that is neither driven nor braked, the slip rate is approximately zero and therefore, the speed of this wheel is approximately equal to the vehicular speed ($v_w \approx v$).

The rotational speed of the drive wheel can be calculated using a pulsed output signal of the resolver of the motor M, an encoder, a Hall element, and the like. To obtain the vehicular speed, 1. since the slip rate of a non-driving wheels is approximately zero, the speed of a non-driving wheel can be detected as the vehicular speed; 2. the output of the acceleration sensor is integrated and the vehicular speed is obtained; and 3. the vehicular position is detected by a sensor and the speed at which a distance is traveled per unit time is obtained, can be considered.

(Example of Torque Distribution)

Figure 10:
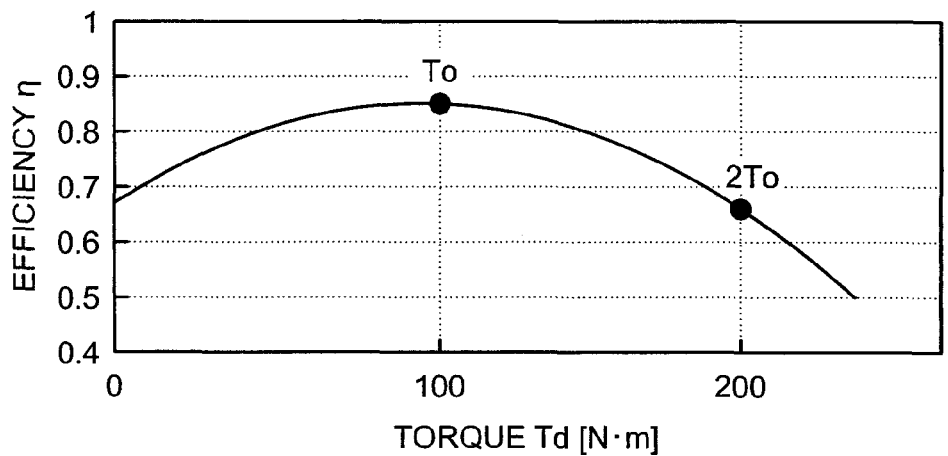
FIG. 10 is a diagram of relations between torque and efficiency.

FIG. 10 is a diagram of relations between torque and efficiency. Similar to FIGS. 9A and 9B, the horizontal axis represents torque and the vertical axis represents efficiency. As depicted in FIG. 10, the point on the performance curve where the efficiency η is greatest is regarded as the torque that optimizes efficiency To. Further, on the performance curve, the efficiency that corresponds to the torque that is twice the torque that optimizes efficiency To is indicated as 2To.

(Characteristics of Performance Curve on Motor Efficiency Map)

Figure 11A:
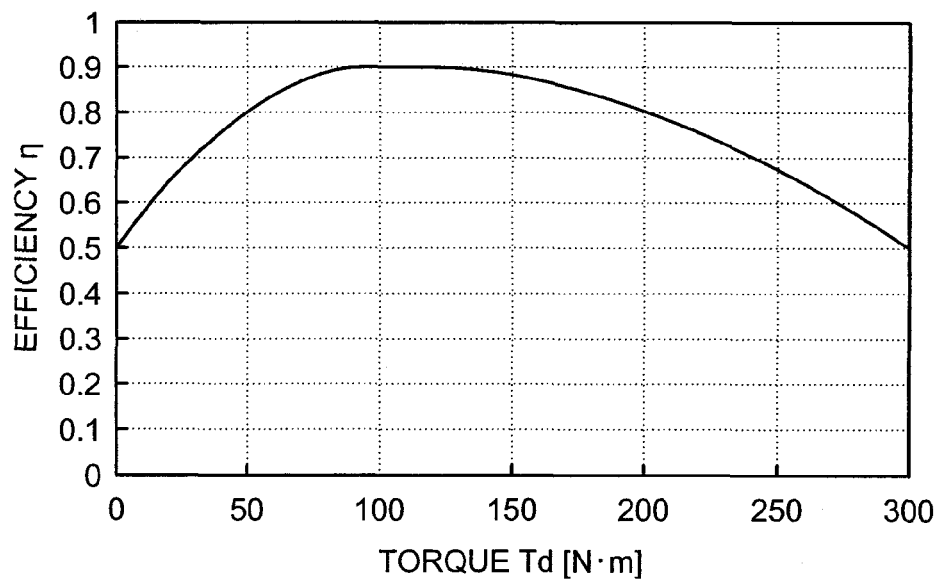
FIG. 11A is a diagram depicting torque-efficiency characteristics specific to a motor (part 1)
Figure 11B:
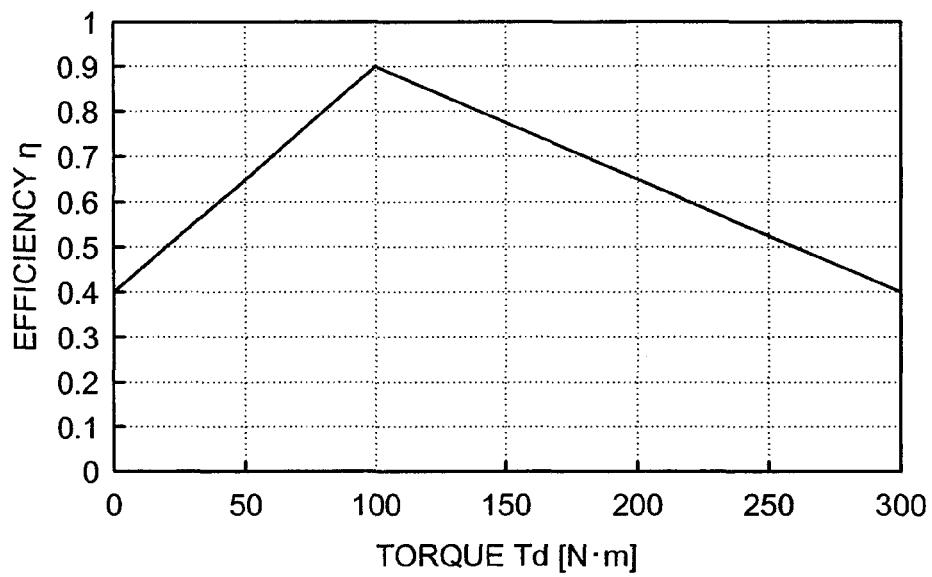
FIG. 11B is a diagram depicting torque-efficiency characteristics specific to a motor (part 2)
Figure 11C:
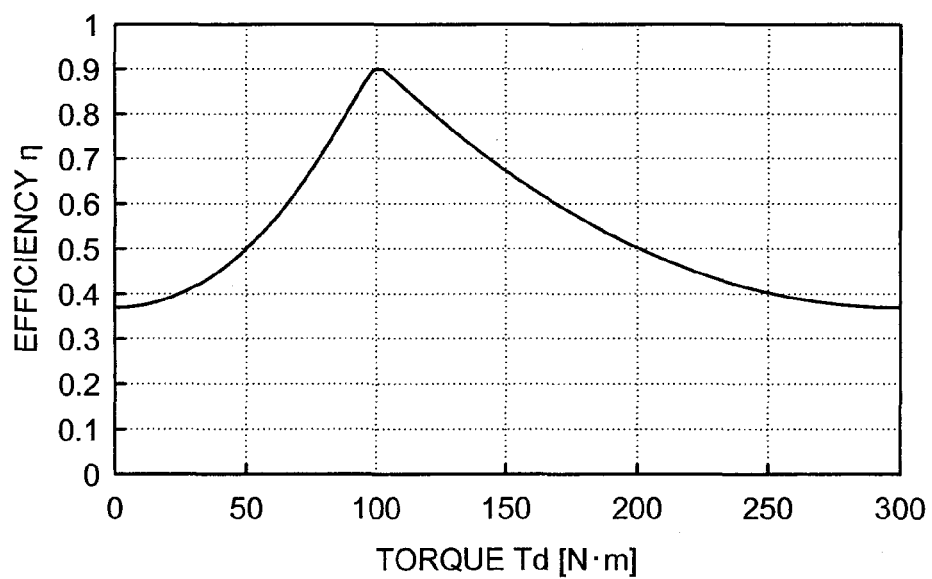
FIG. 11C is a diagram depicting torque-efficiency characteristics specific to a motor (part 3)

Here, torque distribution for torque-efficiency characteristics specific to each motor will be described. As with the torque-efficiency characteristics above in FIGS. 9A and 9B, each has a curve specific to each motor M. FIGS. 11A to 11C are diagrams depicting torque-efficiency characteristics specific to each motor. FIG. 11A is abbreviated as an inversed U-type; FIG. 11B is abbreviated as a Δ-type; and FIG. 11C is abbreviated as a peak-type. For simplification, torque distribution in the case of 2 drive wheels is considered. Based on expression (1), the efficiency η when all the instructed torque T is distributed among 2 wheels is:

$$\eta = (T1\cdot\eta1 + T2\cdot\eta2)/T \quad (13)$$

(torque of drive wheel 1: T1; corresponding efficiency: η1; torque of drive wheel 2: T2, corresponding efficiency: η2)

For example, if the instructed torque T is 160 [Nm], (T1, T2)=(100,60), (80,80), and the like, although there are many combinations, by substituting the torque value of each into expression (13) above, the efficiency can be calculated. Thus, the combination of torque values that maximizes efficiency merely has to be selected. An example will be described below.

Figure 12A:
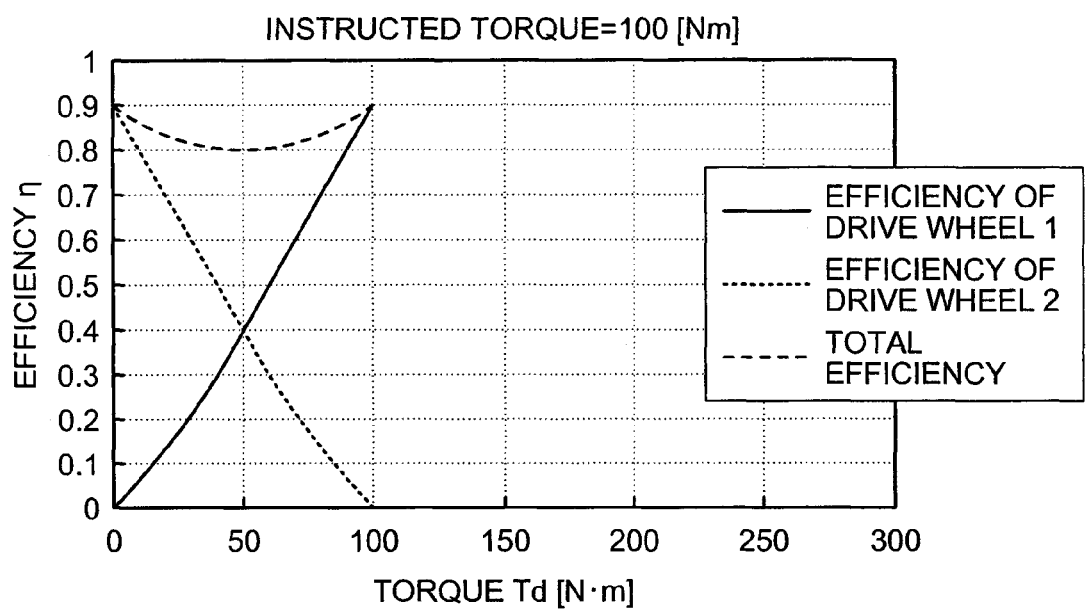
FIG. 12A is a diagram depicting characteristics of a wheel, among torque-efficiency characteristics of an inversed U-type (part 1)
Figure 12B:
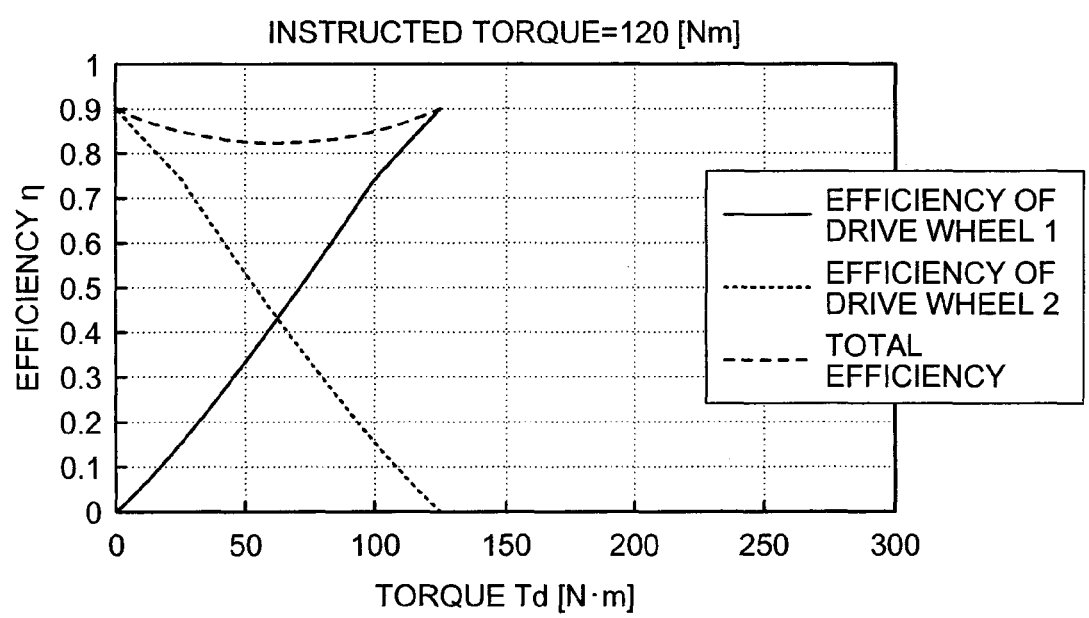
FIG. 12B is a diagram depicting characteristics of a wheel, among torque-efficiency characteristics of the inversed U-type (part 2)
Figure 12C:
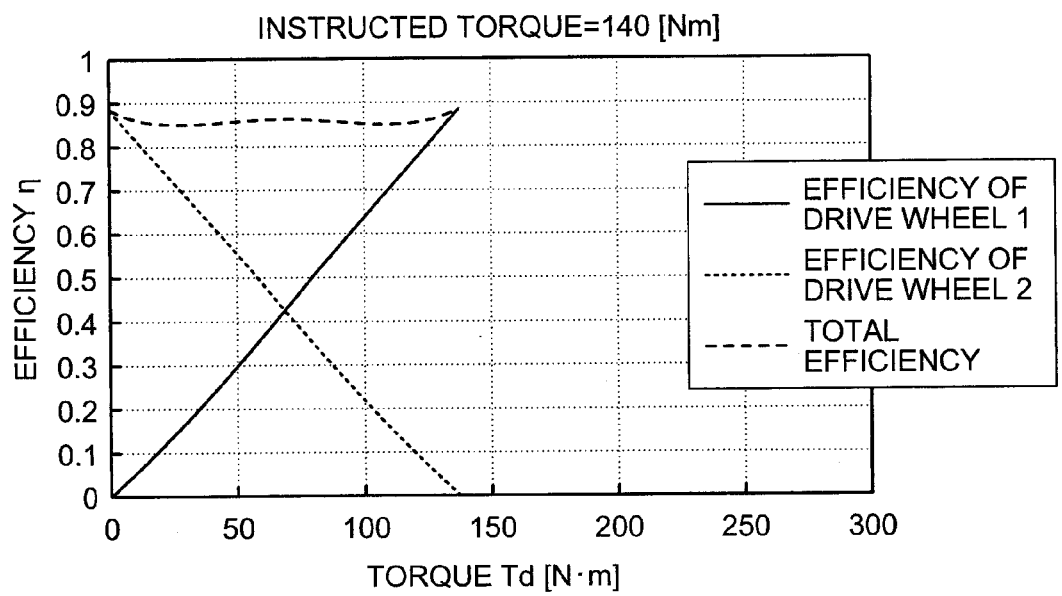
FIG. 12C is a diagram depicting characteristics of a wheel, among torque-efficiency characteristics of the inversed U-type (part 3)
Figure 12D:
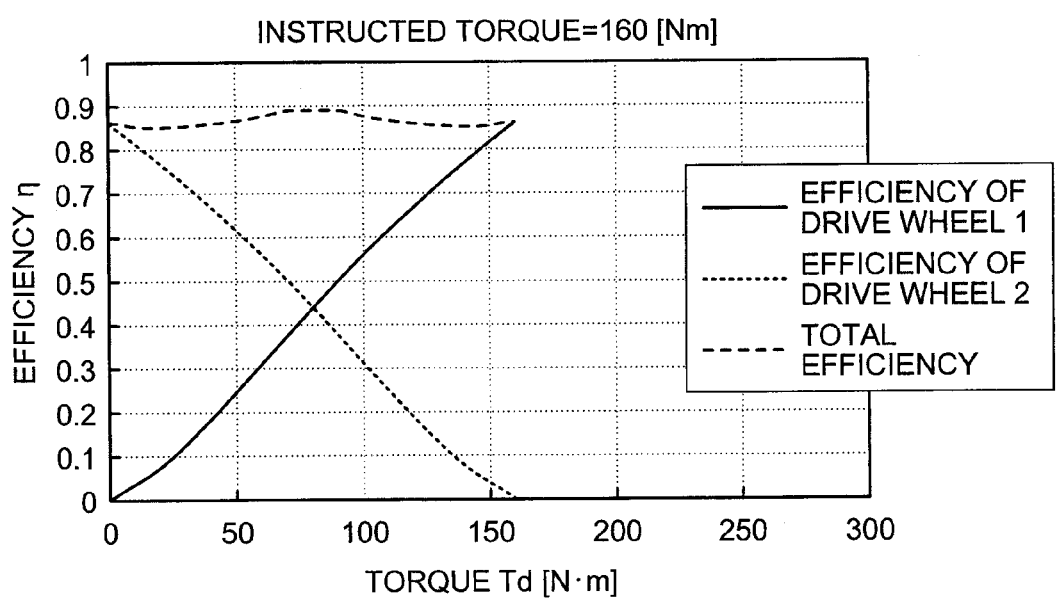
FIG. 12D is a diagram depicting characteristics of a wheel, among torque-efficiency characteristics of the inversed U-type (part 4)
Figure 12E:
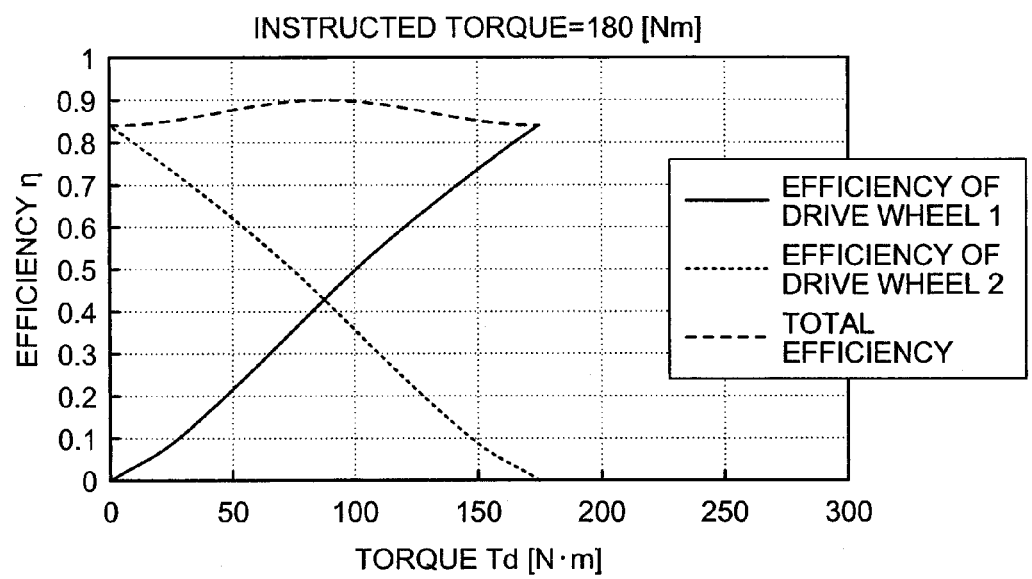
FIG. 12E is a diagram depicting characteristics of a wheel, among torque-efficiency characteristics of the inversed U-type (part 5)
Figure 12F:
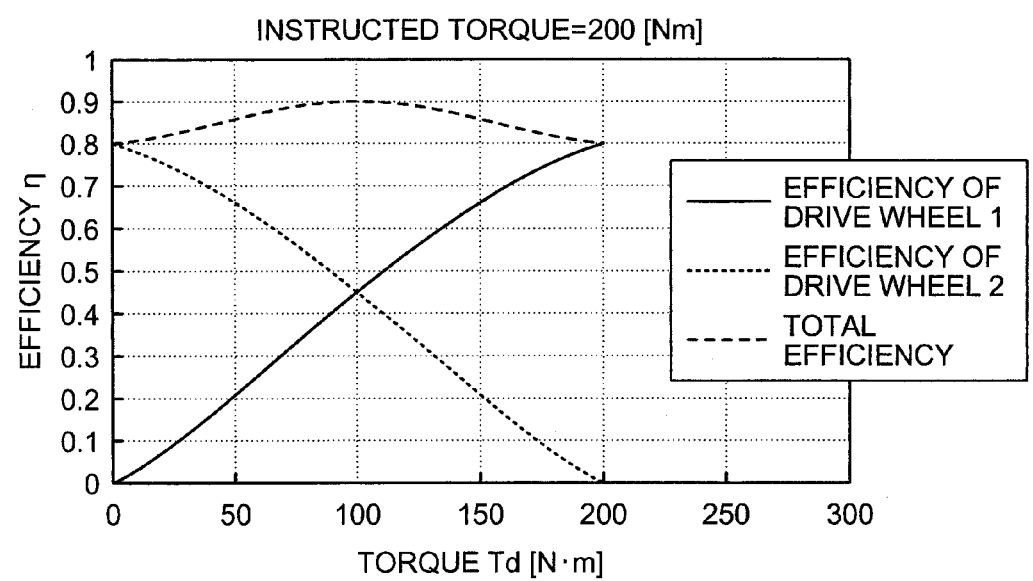
FIG. 12F is a diagram depicting characteristics of a wheel, among torque-efficiency characteristics of the inversed U-type (part 6)

FIGS. 12A to 12F are diagrams depicting characteristics of each wheel, among the torque-efficiency characteristics of the inversed U-type. In FIG. 12A, the instructed torque T is 100 [Nm] and the efficiency η is greatest when (T1,T2)=(0, 100), (100,0). The total efficiency is the characteristic obtained by substitution into expression (13). In FIG. 12B, the instructed torque T is 120 [Nm], and the efficiency η is greatest when (T1,T2)=(0,120), (120,0). In FIG. 12C, the instructed torque T is 140 [Nm], and the efficiency η is greatest when (T1,T2)=(0,140), (140,0). In FIG. 12D, the instructed torque T is 160 [Nm], and the efficiency η is greatest when (T1,T2)=(80,80). In FIG. 12E, the instructed torque T is 180 [Nm], the efficiency η is greatest when (T1, T2)=(90,90). In FIG. 12F, the instructed torque T is 200 [Nm], and the efficiency η is greatest when (T1,T2)=(100,100).

Figure 13A:
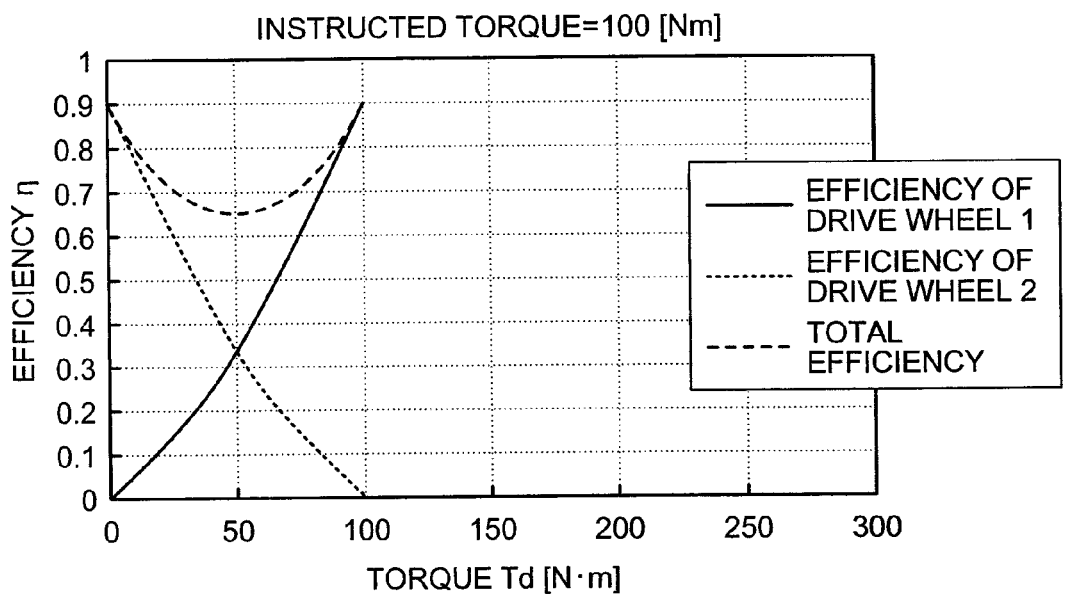
FIG. 13A is a diagram depicting characteristics of a wheel, among torque-efficiency characteristics of a Δ-type (part 1)
Figure 13B:
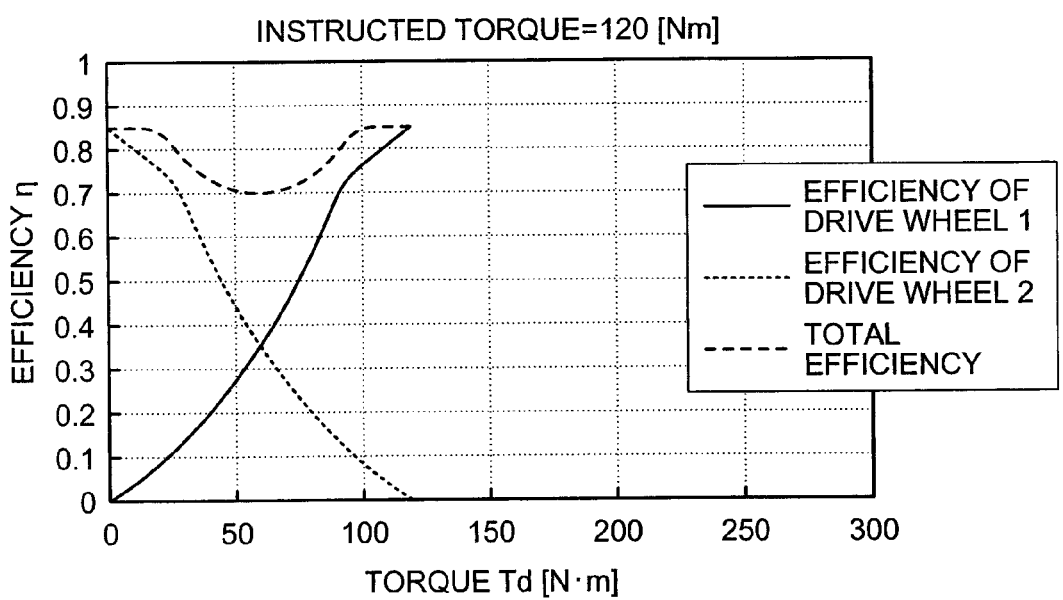
FIG. 13B is a diagram depicting characteristics of a wheel, among the torque-efficiency characteristics of the Δ-type (part 2)
Figure 13E:
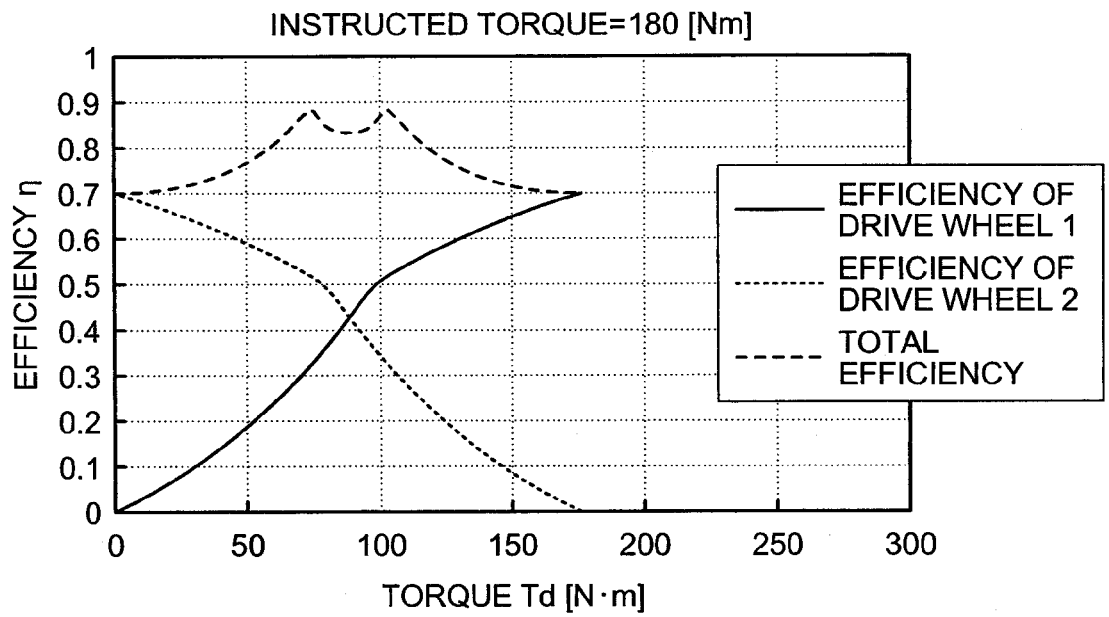
FIG. 13E is a diagram depicting characteristics of a wheel, among the torque-efficiency characteristics of the Δ-type (part 5)
Figure 13F:
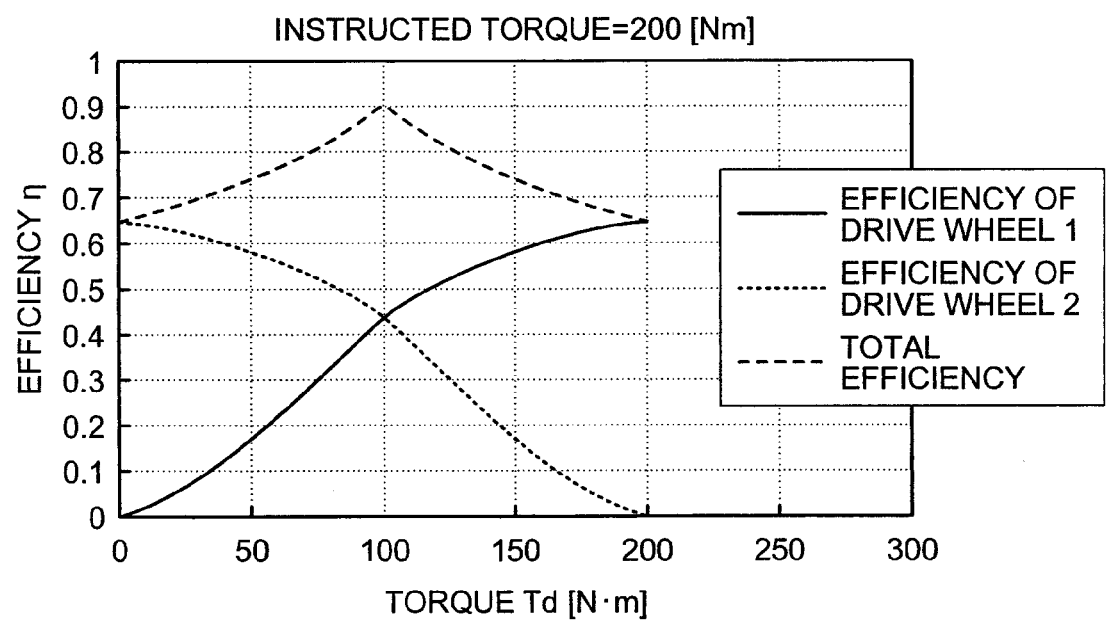
FIG. 13F is a diagram depicting characteristics of a wheel, among the torque-efficiency characteristics of the Δ-type (part 6)

FIGS. 13A to 13F are diagrams depicting characteristics of each wheel, among the torque-efficiency characteristics of the Δ-type. In FIG. 13A, the instructed torque T is 100 [Nm], and the efficiency η is greatest when (T1,T2)=(0,100), (100, 0). In FIG. 13B, the instructed torque T is 120 [Nm], and the efficiency η is greatest when (T1,T2)=(0,120), (120,0). In FIG. 13C, the instructed torque T is 140 [Nm], and the efficiency η is greatest when (T1,T2)=(40,100), (100,40). In FIG. 13D, the instructed torque T is 160 [Nm], and the efficiency η is greatest when (T1,T2)=(60,100), (100,60). In FIG. 13E, the instructed torque T is 180 [Nm], and the efficiency η is greatest when (T1,T2)=(80,100), (100,80). In FIG. 13F, the instructed torque T is 200 [Nm], and the efficiency η is greatest when (T1,T2)=(100,100).

Figure 14A:
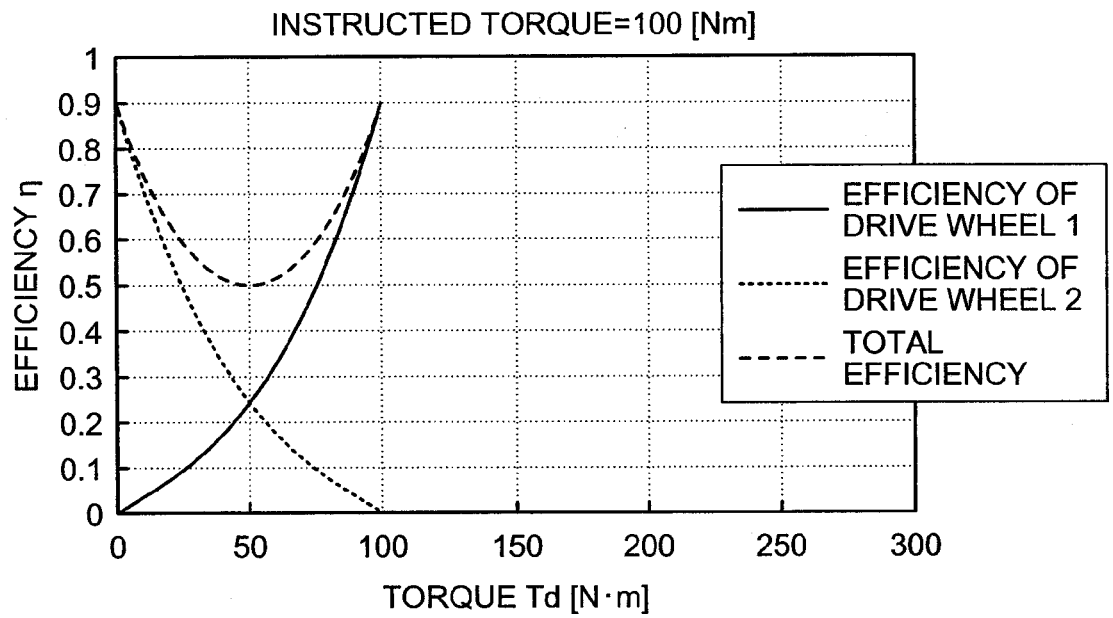
FIG. 14A is a diagram of characteristics of a wheel, among torque-efficiency characteristics of a peak-type (part 1)
Figure 14B:
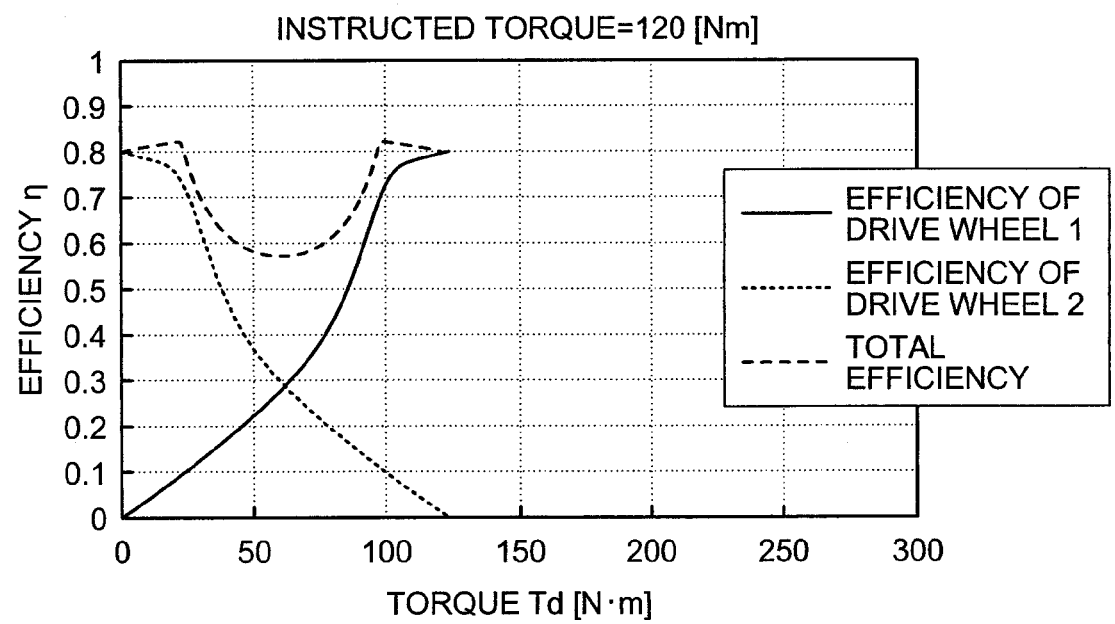
FIG. 14B is a diagram of the characteristics of a wheel, among the torque-efficiency characteristics of the peak-type (part 2)
Figure 14C:
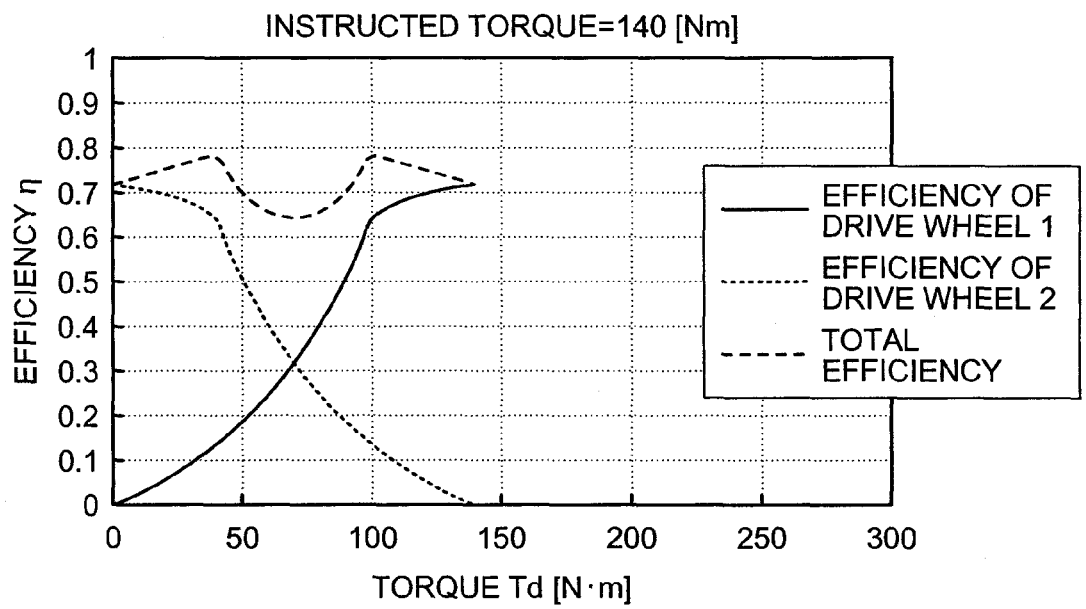
FIG. 14C is a diagram of the characteristics of a wheel, among the torque-efficiency characteristics of the peak-type (part 3)
Figure 14D:
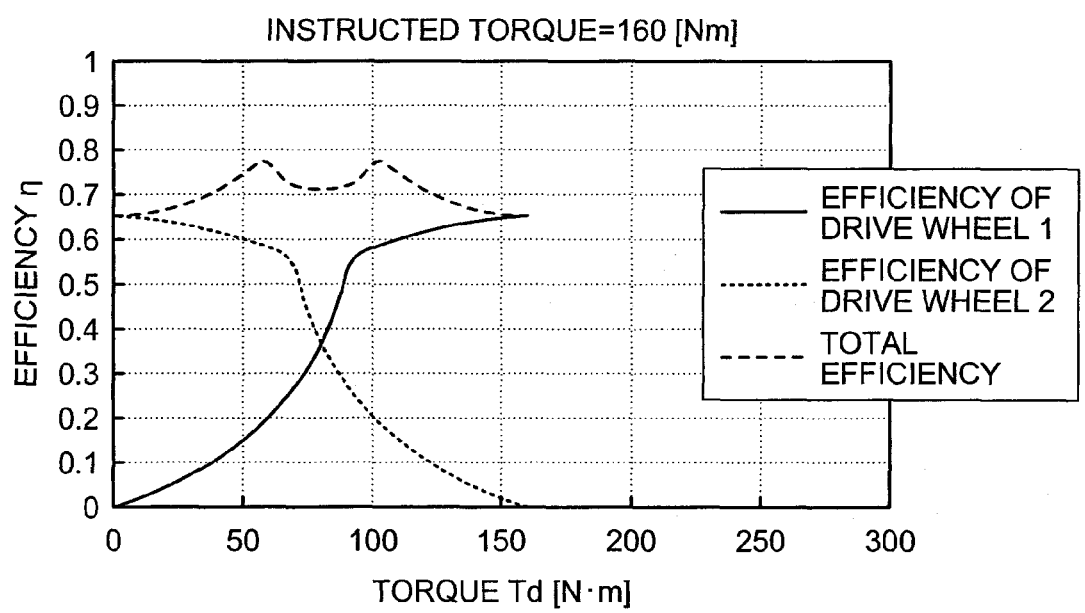
FIG. 14D is a diagram of the characteristics of a wheel, among the torque-efficiency characteristics of the peak-type (part 4)
Figure 14E:
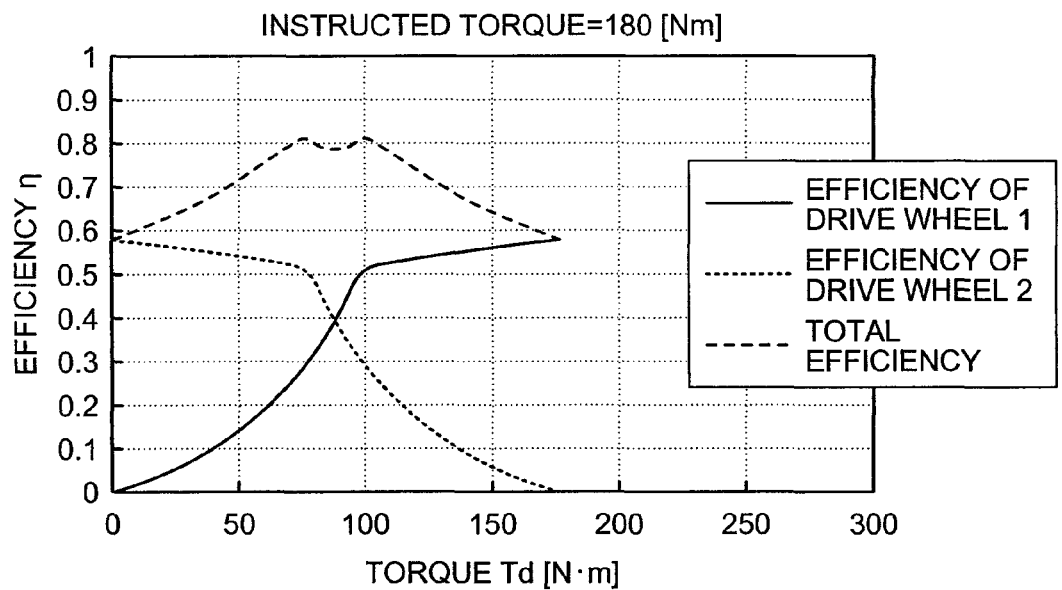
FIG. 14E is a diagram of the characteristics of a wheel, among the torque-efficiency characteristics of the peak-type (part 5)
Figure 14F:
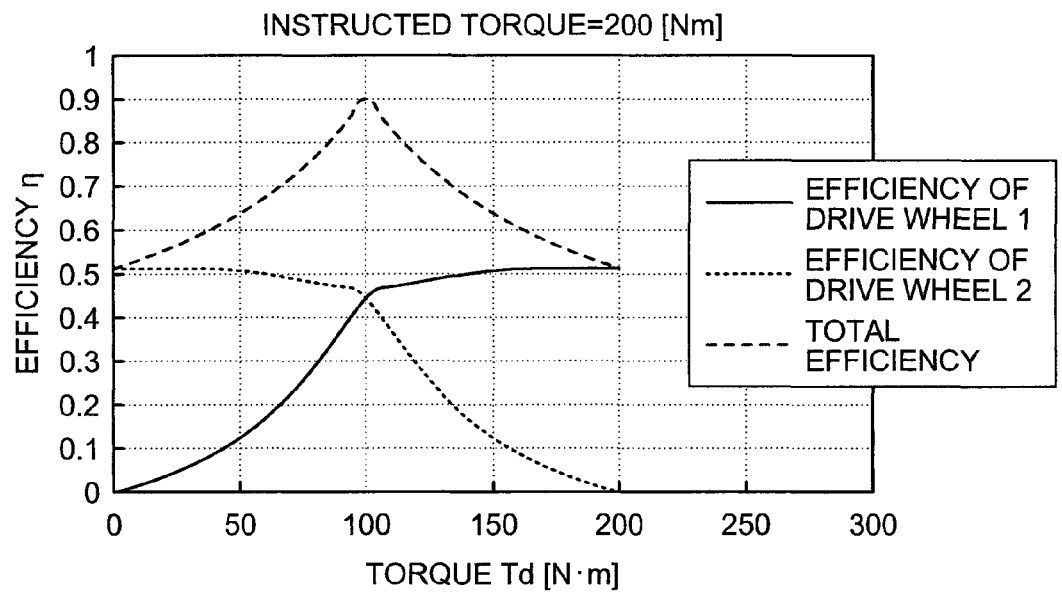
FIG. 14F is a diagram of the characteristics of a wheel, among the torque-efficiency characteristics of the peak-type (part 6)

FIGS. 14A to 14F are diagrams of the characteristics of each wheel, among the torque-efficiency characteristics of the peak-type. In FIG. 14A, the instructed torque T is 100 [Nm], and the efficiency η is greatest when (T1,T2)=(0,100), (100,0). In FIG. 14B, the instructed torque T is 120 [Nm], and the efficiency η is greatest when (T1,T2)=(20,100), (100,20). In FIG. 14C, the instructed torque T is 140 [Nm], and the efficiency η is greatest when (T1,T2)=(40,100), (100,40). In FIG. 14D, the instructed torque T is 160 [Nm], and the efficiency η is greatest when (T1,T2)=(60,100), (100,60). In FIG. 14E, the instructed torque T is 180 [Nm], and the efficiency η is greatest when (T1,T2)=(80,100), (100,80). In FIG. 14F, the instructed torque T is 200 [Nm], and the efficiency η is greatest when (T1,T2)=(100,100).

Thus, the combination that maximizes the efficiency η is any of the following:

$$(T1,T2)=(0,T),(T,0),To,T-To),(T-To,To),(T/2,T/2) \quad (14)$$

(To: torque optimizing efficiency)
Thus, even if the shape of the curve of the torque-efficiency characteristics is any one of the types in FIGS. 11A to 11C, among the combinations of expression (14), the presence of the combination that maximizes the efficiency η is focused on.

In other words, even when the shape of the curve of the torque-efficiency characteristics is unclear, the combination that maximizes the result of calculating the combinations depicted in expression (14) is the combination of torque distribution that maximizes the efficiency η. When the shape of the curve of the torque-efficiency characteristics is complicated, although the combination maximizing efficiency may be a combination other than those among expression (14), for complicated characteristics excluding those having many points of reverse curvature, the combination that maximizes efficiency among the combinations indicated by expression (14) is present. In other words, although the combinations of torque distribution are countless, by merely calculating the combinations indicated by expression (14), an optimal torque distribution value can be obtained. In the example above, although description is given for torque distribution for 2 wheels, torque distribution for multiple wheels such as 4, etc. is the same.

Thus, in the distributions depicted in FIGS. 15A to 15E described hereinafter, a combination that maximizes the efficiency η is present. Further, since the motor efficiency maps indicating the torque-efficiency characteristics of the inversed U-type are numerous, simplification of the torque distribution described hereinafter with reference to FIGS. 16A and 16B is possible.

Assuming that the number of motors M is n (n=natural number), the distributing unit 107:
(1) Distributes all of the instructed torque T to one of the motors M as the torque distribution value thereof, when the instructed torque T is less than the torque that optimizes efficiency To.
(2) Performs torque distribution by any one among (a) to (c) below, when the instructed torque T is greater than or equal to the torque that optimizes efficiency To and is less than n times the torque that optimizes efficiency To. In this case, among (a) to (c), that which has the optimum drive system efficiency is selected.
(a) Distributes the torque that optimizes efficiency To to a portion of the motors M as the respective torque distribution values thereof and further distributes the remainder obtained by dividing the instructed torque T by the torque that optimizes efficiency To to one of the motors, or equally distributes the remainder to the n motors M.
(b) Distributes the torque that optimizes efficiency To to a portion of the motors M as the respective torque distribution values thereof and equally distributes to other motors M as the respective torque distribution values thereof, the torque that remains after distribution to the portion of the motors M.
(c) Distributes the instructed torque T equally to each of the motors M.
(3) When the instructed torque T is greater than or equal to n times the torque that optimizes efficiency To, distributes the torque that optimizes efficiency To to the n motors M as the respective torque distribution values thereof, and further selects the combination having the optimum drive system efficiency, among the one or the n motors M to which the remainder obtained by dividing the instructed torque T by the torque that optimizes efficiency To, is equally distributed.

Figure 15A:
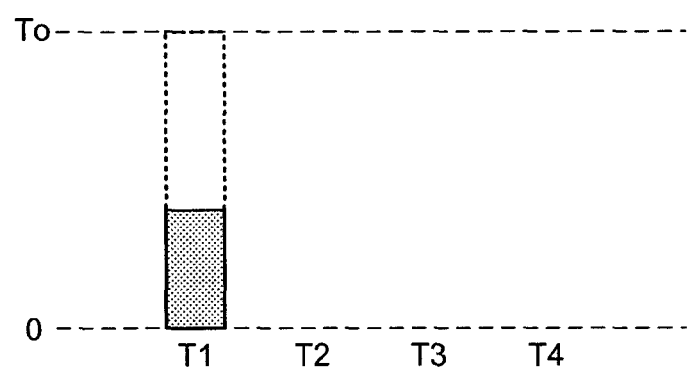
FIG. 15A is a diagram for describing torque distribution in a case of 4 drive wheels (part 1)
Figure 15B:
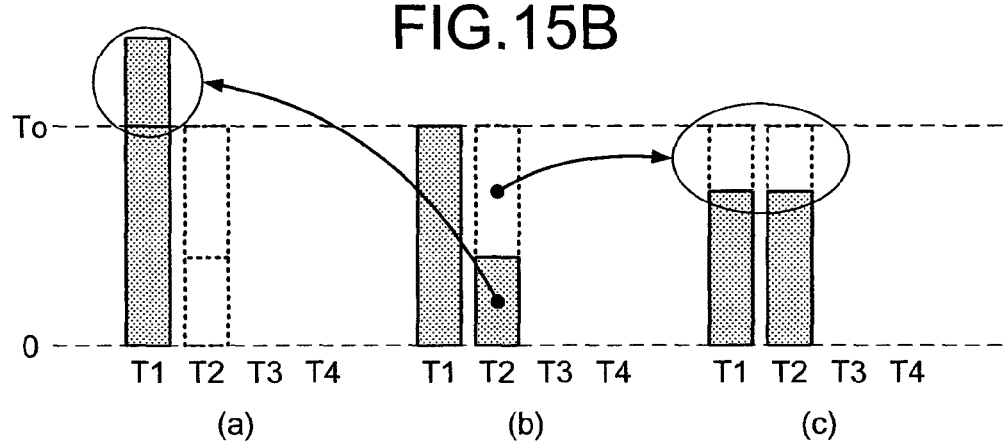
FIG. 15B is a diagram for describing torque distribution in the case of 4 drive wheels (part 2)

FIGS. 15A to 15E are diagrams for describing torque distribution in the case of 4 drive wheels. Distribution examples in which the distributing unit 107 distributes torque to each of the n motors M, where n=4, will be described.
(When T<To)
As depicted in FIG. 15A, when the instructed torque T is less than the torque that optimizes efficiency To, the instructed torque T is distributed to one motor as the torque distribution value thereof.
(When To≤T≤2To)
As depicted in FIG. 15B, when the instructed torque T is greater than or equal to the torque that optimizes efficiency To and less than twice the torque that optimizes efficiency To, from among (a) to (c), the combination having the optimum drive system efficiency is selected.
(a) Distribute the instructed torque T to one motor as the torque distribution value thereof.
(b) Distribute the torque that optimizes efficiency To to one motor as the torque distribution value thereof and distribute the remaining torque to another (one) motor as the torque distribution value thereof.
(c) Distribute ½ of the instructed torque T to two motors, respectively, as the torque distribution values thereof.
(When 2To≤T<3To)
As depicted in FIG. 15C, when the instructed torque T is greater than or equal to twice the torque that optimizes efficiency To and less than 3 times the torque that optimizes efficiency To, from among (a) to (e), the combination having the optimum drive system efficiency is selected.
(a) Distribute the torque that optimizes efficiency To to one motor as the torque distribution value thereof and distribute the remaining torque to another (one) motor as the torque distribution value thereof.

(b) Distribute ½ of the instructed torque T to two motors, respectively, as the torque distribution values thereof.

(c) Distribute the torque that optimizes efficiency To to two motors, respectively, as the torque distribution values thereof and distribute the remaining torque to another (one) motor as the torque distribution value thereof.

(d) Distribute the torque that optimizes efficiency To to one motor as the torque distribution value thereof and distribute ½ of the remaining torque to two motors, respectively, as the torque distribution values thereof.

(e) Distribute ⅓ of the instructed torque T to three motors, respectively, as the torque distribution values thereof.

(When 3To≤T<4To)

Figure 15D:
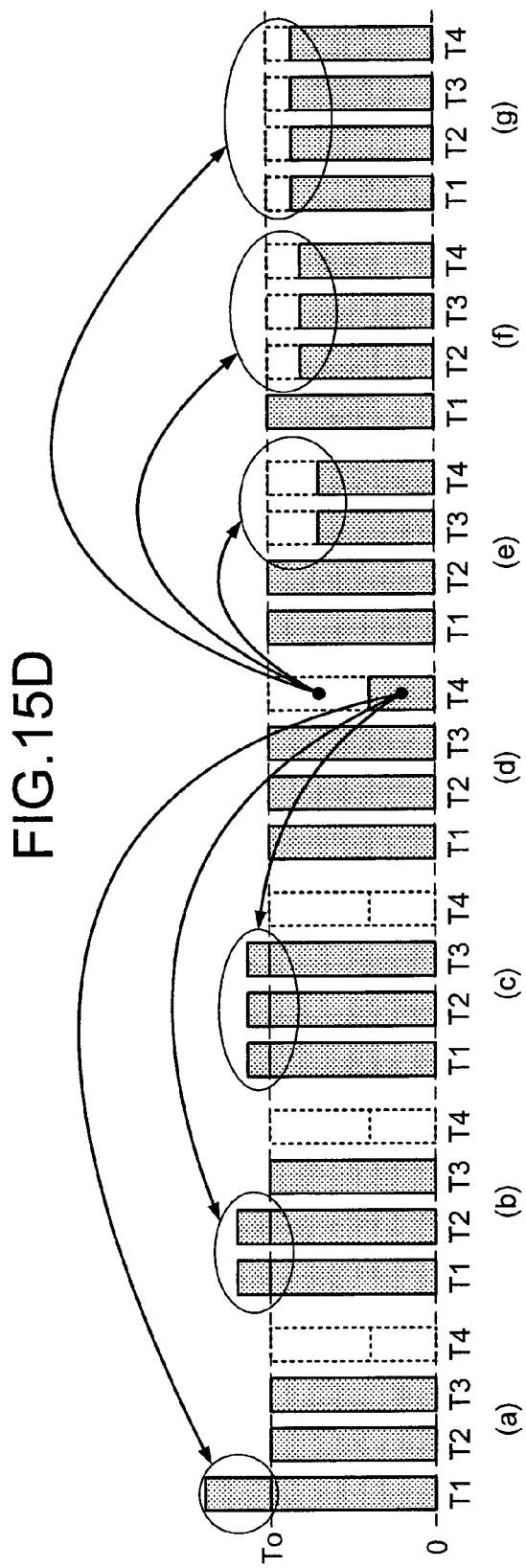
FIG. 15D is a diagram for describing torque distribution in the case of 4 drive wheels (part 4)
Figure 16A:
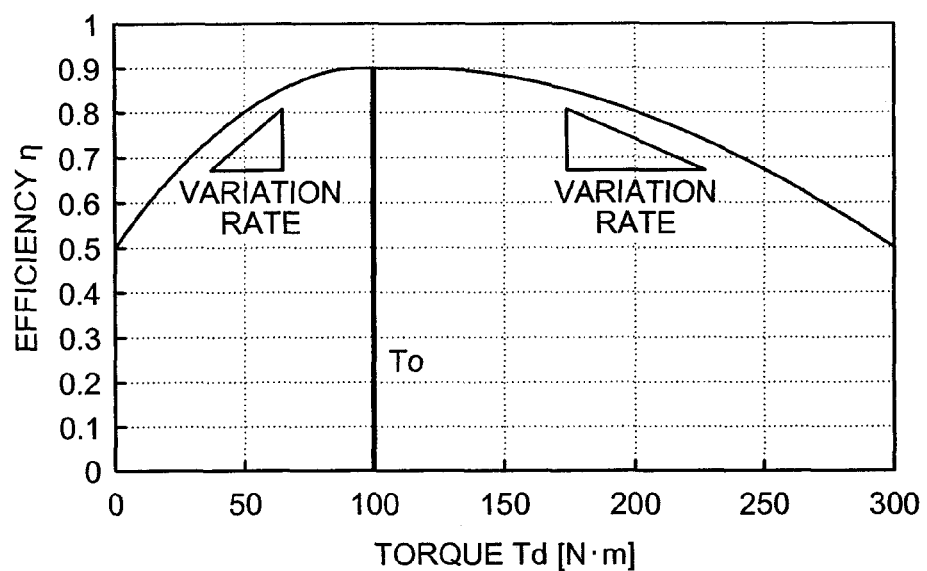
FIG. 16A is a diagram for explaining variation differences among torque-efficiency characteristics.
Figure 16B:
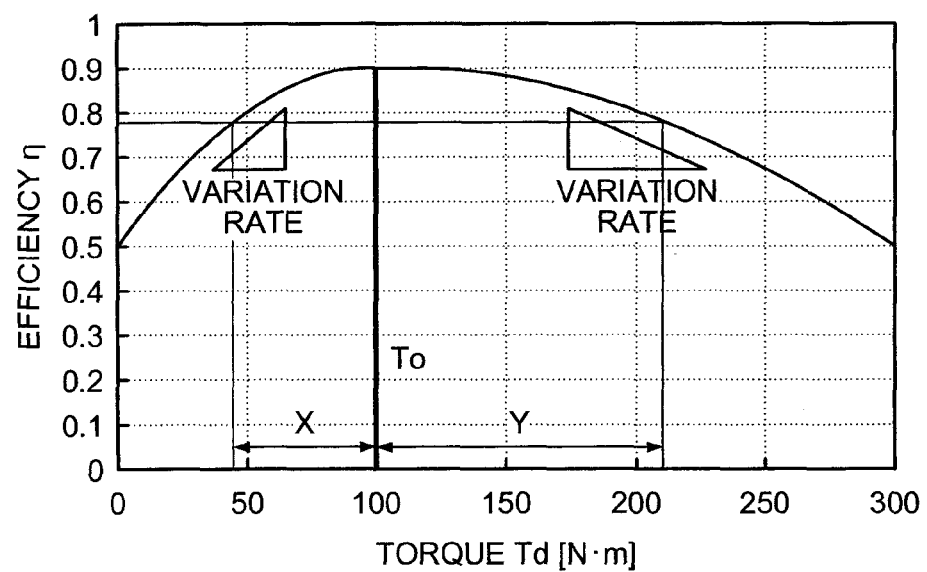
FIG. 16B is a diagram for explaining deviation from the torque that optimizes efficiency in torque-efficiency characteristics.

As depicted in FIG. 15D, when the instructed torque T is greater than or equal to 3 times the torque that optimizes efficiency To and less than 4 times the torque that optimizes efficiency To, from among (a) to (g), the combination having the optimum drive system efficiency is selected.

(a) Distribute the torque that optimizes efficiency To to two motors, respectively, as the torque distribution values thereof and distribute the remaining torque to one of the remaining motors as the torque distribution value thereof.

(b) Distribute the torque that optimizes efficiency To to one motor as the torque distribution value thereof, and distribute ½ of the remaining torque to two motors, respectively, as the torque distribution values thereof.

(c) Distribute ⅓ of the instructed torque T to three motors, respectively, as the torque distribution values thereof.

(d) Distribute the torque that optimizes efficiency To to three motors, respective, as the torque distribution values thereof and distribute the remaining torque to the remaining motor as the torque distribution value thereof.

(e) Distribute the torque that optimizes efficiency To to two motors, respectively, as the torque distribution values thereof and distribute ½ of the remaining torque to the remaining two motors, respectively, as the torque distribution values thereof.

(f) Distribute the torque that optimizes efficiency To to one motor as the torque distribution value thereof, and distribute ⅓ of the remaining torque to the remaining three motors, respectively, as the torque distribution values thereof.

(g) Distribute ¼ of the instructed torque T to 4 motors, respectively, as the torque distribution values thereof.

(When 4To≤T)

Figure 15E:
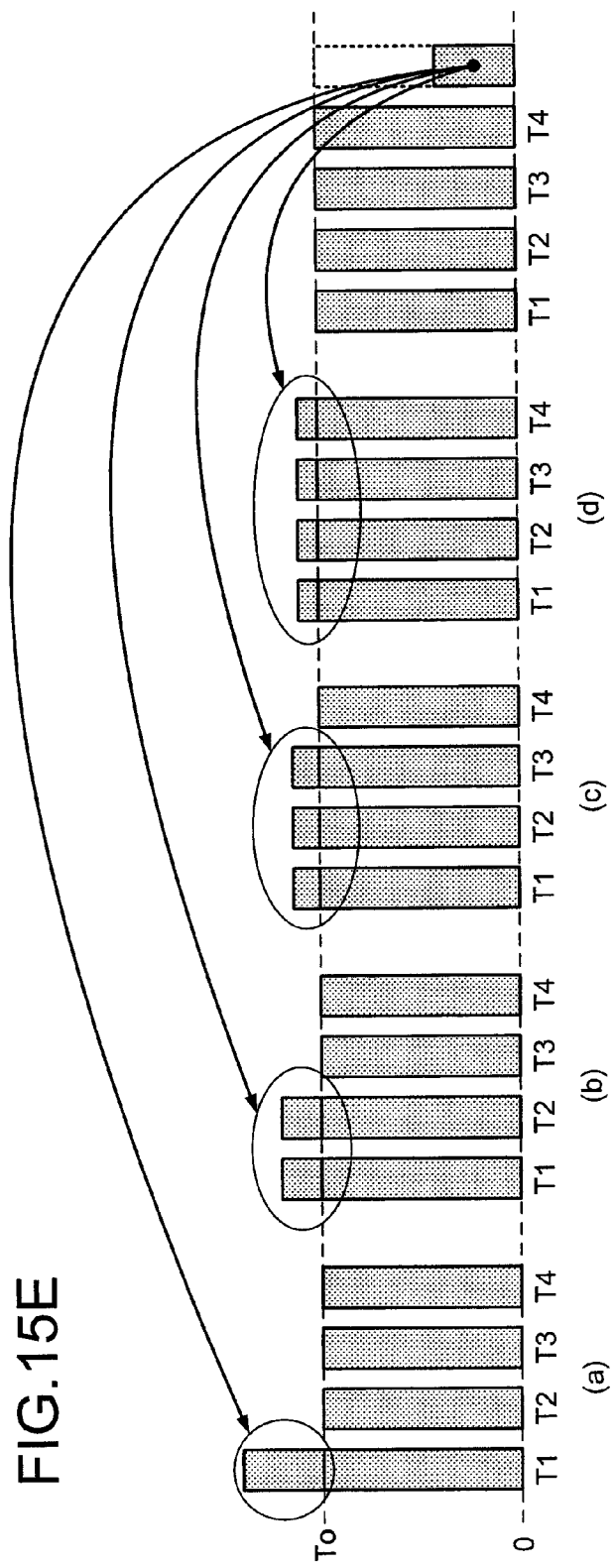
FIG. 15E is a diagram for describing torque distribution in the case of 4 drive wheels (part 5)

As depicted in FIG. 15E, when the instructed torque T is greater than or equal to 4 times the torque that optimizes efficiency To, from among (a) to (d), the combination having the optimum drive system efficiency is selected.

(a) Distribute the torque that optimizes efficiency To to three motors, respectively, as the torque distribution values thereof and distribute the remaining torque to the remaining one motor as the torque distribution value thereof.

(b) Distribute the torque that optimizes efficiency To to two motors, respectively, as the torque distribution values thereof, and distribute ½ of the remaining torque to the remaining two motors, respectively, as the torque distribution values thereof.

(c) Distribute the torque that optimizes efficiency To to one motor as the torque distribution value thereof and distribute ⅓ of the remaining torque to the remaining three motors, respectively, as the torque distribution values thereof.

(d) Distribute ¼ of the instructed torque T to four motors, respectively, as the torque distribution values thereof.

Expression of the distribution examples as expressions is as follows.

(When T<To)

$$T1=T, T2=T3=T4=0$$

(When To≤T<2To)

Efficiency is calculated by the following three methods (a) to (c), and the combination that maximizes efficiency is selected.

(a) T1=To+(T−To), T2=T3=T4=0
(b) T1=To, T2=To−(2To−T), T3=T4=0
(c) T1=T2=To−(2To−T)/2, T3=T4=0

(When 2To≤T<3To)

Efficiency is calculated by the following five methods (a) to (e), and the combination that maximizes efficiency is selected.

(a) T1=To+(T−2To), T2=To, T3=T4=0
(b) T1=T2=To+(T−2To)/2, T3=T4=0
(c) T1=T2=To, T3=To−(3To−T), T4=0
(d) T1=To, T2=T3=To−(3To−T)/2, T4=0
(e) T1=T2=T3=To−(3To−T)/3, T4=0

(When 3To≤T<4To)

Efficiency is calculated by the following seven methods (a) to (g), and the combination that maximizes efficiency is selected.

(a) T1=To+(T−3To), T2=T3=To, T4=0
(b) T1=T2=To+(T−3To)/2, T3=To, T4=0
(c) T1=T2=T3=To+(T−3To)/3, T4=0
(d) T1=T2=T3=To, T4=To−(4To−T)
(e) T1=T2=To, T3=T4=To−(4To−T)/2
(f) T1=To, T2=T3=T4=To−(4To−T)/3
(g) T1=T2=T3=T4=To−(4To−T)/4

(When 4To≤T)

Efficiency is calculated by the following four methods (a) to (d), and the combination that maximizes efficiency is selected.

(a) T1=To+(T−4To), T2=T3=T4=To
(b) T1=T2=To+(T−4To)/2, T3=T4=To
(c) T1=T2=T3=To+(T−4To)/3, T4=To
(d) T1=T2=T3=T4=To+(T−4To)/4

Next, general expressions for torque distribution when n motors M are given.

(When T<k·To, (k=1))

T1=T, T2=T3= . . . =$T_n$=0

(When (k−1)·To≤T<k·To, efficiency is calculate by the following (2k−1) methods, and the combination that maximizes efficiency is selected (k=2 to n))

$$T1 = To + (T - (k-1) \cdot To)/1,$$

$$T2 = T3 = \ldots = T_{k-1} = To,$$

$$T_k = T_{k+1} = \ldots = T_n = 0$$

$$T1 = T2 = To + (T - (k-1) \cdot To)/2,$$

$$T3 = T4 = \ldots = T_{k-1} = To,$$

$$T_k = T_{k+1} = \ldots = T_n = 0$$

$$\ldots$$

$$T1 = T2 = \ldots = T_{k-2} = To + (T - (k-1) \cdot To)/(k-2),$$

$$T_{k-1} = To,$$

-continued $$T_k = T_{k+1} = \ldots = T_n = 0$$

$$T1 = T2 = \ldots = T_{k-1} = To + (T - (k-1) \cdot To)/(k-1),$$

$$T_k = T_{k+1} = \ldots = T_n = 0$$

k−1 methods from the above.

$$T1 = T2 = \ldots = T_{k-1} = To,$$

$$T_k = To - (k \cdot To - T)/1,$$

$$T_{k+1} = \ldots = T_n = 0$$

$$T1 = T2 = \ldots = T_{k-2} = To,$$

$$T_{k-1} = T_k = To - (k \cdot To - T)/2,$$

$$T_{k+1} = \ldots = T_n = 0$$

$$\ldots$$

$$T1 = To,$$

$$T2 = \ldots = T_{k-1} = T_k = To - (k \cdot To - T)/(k-1),$$

$$T_{k+1} = \ldots = T_n = 0$$

$$T1 = T2 = \ldots = T_{k-1} = T_k = To - (k \cdot To - T)/k,$$

$$T_{k+1} = \ldots = T_n = 0$$

k methods from the above.
Together with the k−1 methods above, being the 2k−1 methods.
(When n·To≤T, efficiency is calculated by the following n methods, and the combination that maximizes efficiency is selected)

$$T1 = To + (T - n \cdot To)/1,$$

$$T2 = T3 = \ldots = T_{n-1} = T_n = To$$

$$T1 = T2 = To + (T - n \cdot To)/2,$$

$$T3 = T4 = \ldots = T_{n-1} = T_n = To$$

$$\ldots$$

$$T1 = T2 = \ldots = T_{n-1} = To + (T - n \cdot To)/(n-1),$$

$$T_n = To$$

$$T1 = T2 = \ldots = T_{n-1} = T_n = To + (T - n \cdot To)/n$$

n methods from the above.

Thus, the torque distribution is not limited to 4-wheel drives and can be applied to 6-wheel and 8-wheel drive vehicles, etc.

(Simplification of Torque Distribution for 4-Wheel Drives)

In general, since motor efficiency maps depicting torque-efficiency characteristics of the inversed U-type like that in FIG. 11A are numerous, simplification of the torque distribution is possible. Concerning relation of efficiency with respect to torque at a given speed, the greater the deviation from the torque To yielding optimal efficiency is, the more efficiency drops. Therefore, the torque of each drive wheel is equally distributed such that the torque approaches the torque that optimizes efficiency To. The efficiency curve in a torque-efficiency characteristics graph may be asymmetrical with respect to the torque that optimizes efficiency To as the center and therefore, there is difference between a variation of efficiency when the torque is less than the torque that optimizes efficiency To and a variation when the torque is greater than the torque that optimizes efficiency To. Therefore, simplified torque distribution can be performed by using the ratio of the efficiency variation when the torque is less than the torque that optimizes efficiency To to the efficiency variation when the torque is greater than the torque that optimizes efficiency To, and the relation between the instructed torque T and the torque that optimizes efficiency To.

FIG. 16A is a diagram for explaining variation differences among torque-efficiency characteristics. Taking the depicted torque that optimizes efficiency To as the center, variation when the torque is low is twice the variation when the torque is high. In such a case, if the drive wheel count is 4, simplified torque distribution is performed as described in (1) to (4) below. In FIG. 16-1, 150 [Nm] and 75 [Nm] have the same efficiency; 128.6 [Nm] and 85.7 [Nm] have the same efficiency; and 120 [Nm] and 90 [Nm] have the same efficiency.
(1) When T<To+2To/4 (In the example depicted in FIG. 16A, when T<150 [Nm])
T1=T, T2=T3=T4=0
(2) When 2(To−To/4)≤T<2(To+2To/7) (In the example depicted in FIG. 16-1, when 75 [Nm]·2≤T<128.6 [Nm]·2)
T1=T2=T/2, T3=T4=0
(3) When 3(To−To/7)≤T<3(To+2To/10) (In the example depicted in FIG. 16A, when 85.7 [Nm]·3≤T<120 [Nm]·3)
T1=T2=T3=T/3, T4=0
(4) When 4(To−To/10)≤(In the example depicted in FIG. 16A, when 90 [Nm]·4≤T)
T1=T2=T3=T4=T/4

The torque-efficiency characteristics in FIG. 16A use the same characteristics in FIG. 11A with respect to which torque distribution in the case of torque-efficiency characteristics of the inversed U-type was described. In substituting a value of 100 to 200 [Nm] for T in the above case-determined expressions, when T<150 [Nm], (T1,T2)=(T,0) is the optimal efficiency distribution; and when 150 [Nm]≤T<257.2 [Nm], (T1, T2)=(T/2,T/2) is the optimal efficiency distribution. Therefore, the torque distribution for torque-efficiency characteristics of the inversed U-type can be confirmed to coincide with the results depicted in FIGS. 12A to 12F.

Thus, if it is known that the torque-efficiency characteristics are of the inversed U-type, optimal torque distribution becomes possible by a simple method of torque distribution as that described.

(Simplification of Torque Distribution for n-Wheel Drive Seen in Typical System)

FIG. 16B is a diagram for explaining deviation from the torque that optimizes efficiency in torque-efficiency characteristics. Here, k: drive wheel count; X: deviation from the torque that optimizes efficiency To, for low torque side; Y: deviation from the torque that optimizes efficiency To, for high torque side; a: (variation for high torque side)/(variation for low torque side); and case-determined expressions for torque distribution are (1) to (3) below.
(1) When T<k·(To+(a·To)/(a·k+k+1)), (k=1)
T1=T,T2= ... =$T_n$=0
(2) When k·(To−(To)/(a·(k−1)+(k−1)+1))≤T<k·(To+(a·To)/(a·k+k+1)), (k=2 to n−1)
T1=T2= ... =$T_k$=T/k,$T_{k+1}$= ... =$T_n$=0
(3) When n·(To−(To)/(a·(n−1)+(n−1)+1))≤T, (k=n)
T1=T2= ... =$T_{n-1}$=$T_n$=T/n In the case of driving by k+1 wheels, the torque value for which the same efficiency yielded as in a case of driving by k wheels is the boundary value of the case-determined expressions (1) to (3) above.

$$(k+1)\cdot(To-X)=k\cdot(To+Y) \quad (15)$$

$$Y=a\cdot X \quad (16)$$

In solving expressions (15) and (16) to obtain X and Y, the following is obtained.

$$X=To/(a\cdot k+k+1) \quad (17)$$

$$Y=(a\cdot To)/(a\cdot k+k+1) \quad (18)$$

Case-determined expressions in the case of n-wheel drive become possible using expressions (17) and (18).

(Dynamic Torque Distribution)

Next, an example of performing dynamic torque distribution according to variations in speed will be described since the torque that optimizes efficiency To differs according to the speed of the vehicle (drive wheel).

Figure 17:
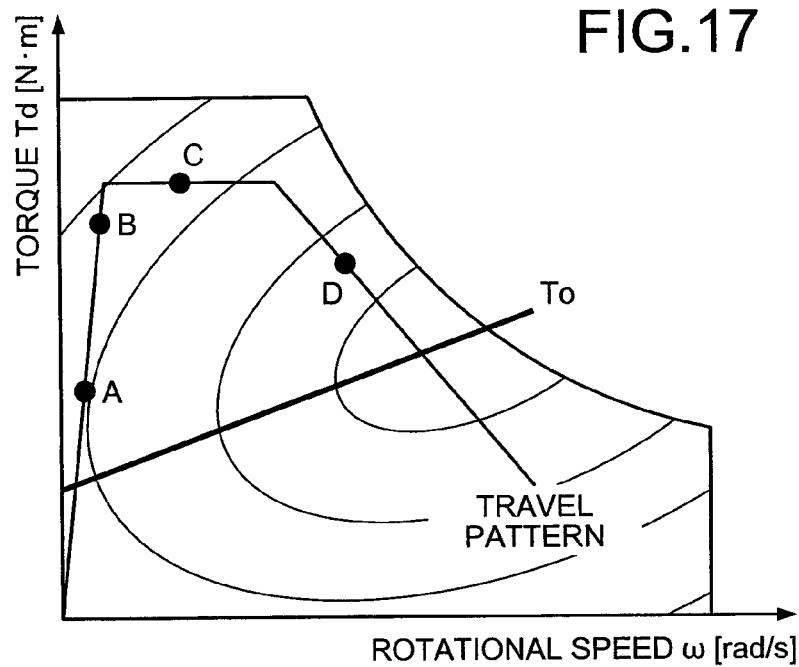
FIG. 17 is a diagram for explaining dynamic torque distribution according to travel pattern.

FIG. 17 is a diagram for explaining dynamic torque distribution according to travel pattern. The horizontal axis represents rotational speed and the vertical axis represents torque, and on a motor efficiency map, a travel pattern of the vehicle is depicted.

In the case of the travel pattern depicted in FIG. 17, torque distribution where T1=T, T2=T3=T4=0 is assumed until point A is reached during acceleration. Torque distribution where T1=T2=T/2, T3=T4=0 is assumed from point A to point B. Torque distribution where T1=T2=T3=T/3, T4=0 is assumed from point B to point C. Torque distribution where T1=T2=T/2, T3=T4=0 is assumed from point C to point D. Beyond point D, torque distribution where T1=T, T2=T3=T4=0 is assumed. In this manner, since torque distribution that is optimal with respect to temporally changing speed and load torque is continually performed, dynamic torque distribution can be performed by control over a broad spectrum.

Figure 18:
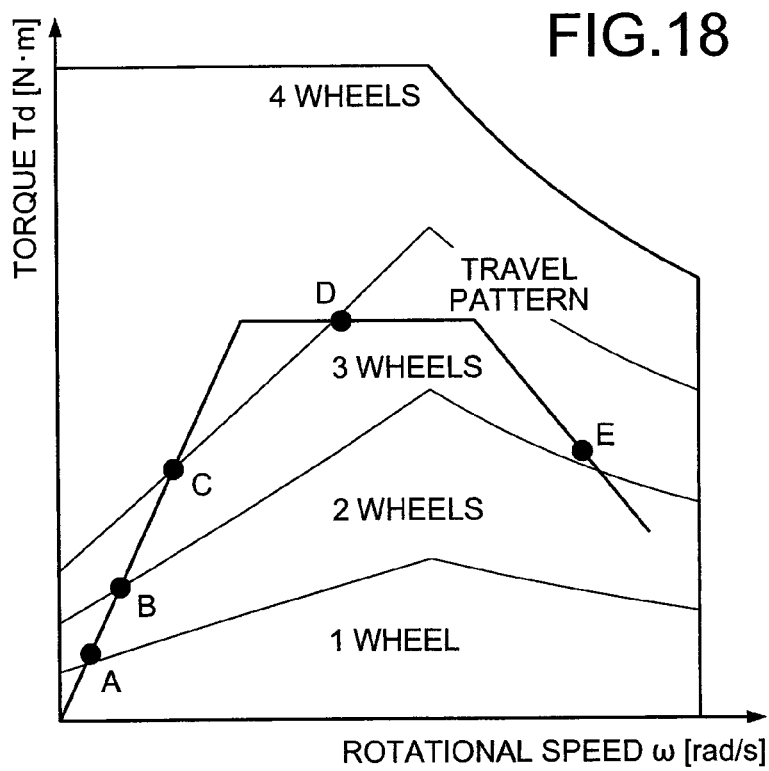
FIG. 18 is a graph depicting optimal drive wheel count data set based on the rotational speed-instructed torque.

FIG. 18 is a graph depicting optimal drive wheel count data set based on the rotational speed-instructed torque. Optimal torque distribution can be performed in real-time during travel by creating a chart or calculation formula for obtaining the drive wheel count that maximizes overall efficiency, according to the speed of the vehicle (drive wheel) and the instructed torque T.

For example, dynamic torque distribution in the case of the travel pattern depicted in FIG. 18 will be described. Until point A is reached, the torque distribution is T1=T, T2=T3=T4=0, i.e., 1-wheel drive. From point A to point B, the torque distribution is T1=T2=T/2, T3=T4=0, i.e., 2-wheel drive. From point B to point C, the torque distribution is T1=T2=T3=T/3, T4=0, i.e., 3-wheel drive. From point C to point D, the torque distribution is T1=T2=T3=T4=T/4, i.e., 4-wheel drive. From point D to point E, the torque distribution is T1=T2=T3=T/3, T4=0, i.e., 3-wheel drive. After point E, the torque distribution is T1=T2=T/2, T3=T4=0, i.e., 2-wheel drive.

The result of the algorithm of the described torque distribution, i.e., motor efficiency map, need not be retained in memory as it suffices to retain in the memory as the graph depicted in FIG. 18 or a calculation formula, the drive wheel count and torque values of the drive wheels output for the input speed and torque.

According to the first example, by drawing on the motor efficiency map, a performance curve that is sloped and takes into consideration slip rate, the operating point of the rotational speed and torque can be accurately detected. Therefore, the calculation of efficiency by torque distribution can be performed more accurately. Further, optimal torque distribution can be performed with respect to each drive wheel. During travel where the total torque for the left drive wheels and the total torque for the right drive wheels differ, the angle of the steering wheel 302 and the angle of the vehicle are detected by the yaw rate sensor 310 and if the difference is judged to be large, the torque distribution is adjusted such that the left/right torque difference decreases to secure stability while the vehicle is in motion.

Second Example

Configuration to Improve Overall Efficiency: During Power Running

Figure 19:
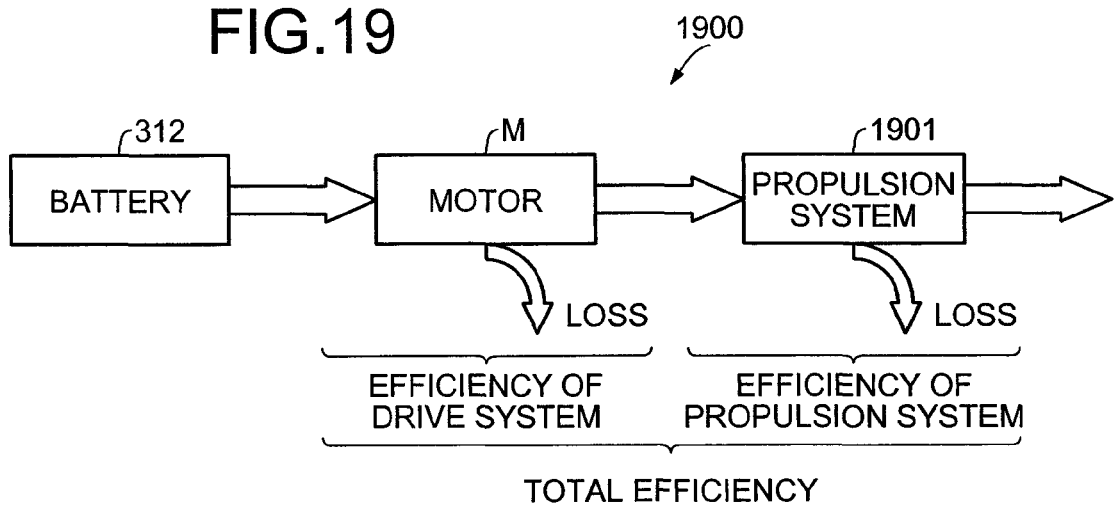
FIG. 19 is a diagram for explaining overall efficiency.

In the second example, a configuration to improve overall efficiency during power running will be described. FIG. 19 is a diagram for explaining overall efficiency during power running. The vehicle travels by driving motors M by power supplied from the battery 312. The motor M sustains loss such as copper loss by coil resistance or iron loss by eddy current or magnetic hysteresis. Efficiency from the supply of power until the motor M output is the efficiency of the drive system. A vehicle that travels by the driving force of the motor M, in actuality, has a propulsion system 1901 that propels the vehicle 1900 by receiving the output from the motor M and the driving rotation of the tires. The propulsion system 1901 also sustains loss consequent to slippage between the tires and the road surface. The efficiency from the output of the motor M until output as propulsion power is the efficiency of the propulsion system. The overall efficiency of the vehicle is indicated by the efficiency of drive system×the efficiency of the propulsion system.

The driving efficiency is expressed as the driving efficiency ηd=motor M output/power supplied from the battery 312=(T×ω)/(V×I).

The torque distribution described in the first example concerns driving efficiency. In the second example, configuration is described that by improving the efficiency of the propulsion system, maximizes the overall efficiency.

A driving force Fd per drive wheel is expressed by the following expression.

$$Fd=\mu\cdot N \quad (19)$$

(μ: friction coefficient; N: normal force)
Therefore, $$Td=Fd\cdot r=\mu\cdot N\cdot r \quad (20)$$

(r: tire radius)
The efficiency ηλ of the propulsion system is:

$$\eta\lambda=\text{propulsion power/motor output}=(Fd\cdot v)/(Td\cdot\omega)= (Fd\cdot v)/(Fd\cdot r\cdot\omega)=v/(r\cdot\omega)=v/v_w \quad (21)$$

(v: vehicular speed[m/s]; $v_w$: wheel speed[m/s])
Further, the slip rate λ is expression by expression (11). Therefore, the efficiency ηλ of the propulsion system can be expressed using the slip rate λ.

$$\therefore \eta\lambda=1-\lambda \quad (22)$$

From the characteristics of the slip rate and friction coefficient in FIG. 6, the slip rate λ can be regarded as a function of the friction coefficient μ and when expressed with λ=f(μ), the efficiency ηλ of the propulsion system can be expressed as follows.

$$\eta\lambda=1-\lambda=1-f(\mu)=1-f(Td/(N\cdot r)) \quad (23)$$

$$\because \mu=Td/(N\cdot r) \quad (24)$$

From expression (20), when N is constant and Td increases, μ increases. From the relation depicted in FIG. 6, within a range where λ is 0.2 or less and μ increases, λ increases. Thus, 1−λ decreases.

Figure 20:
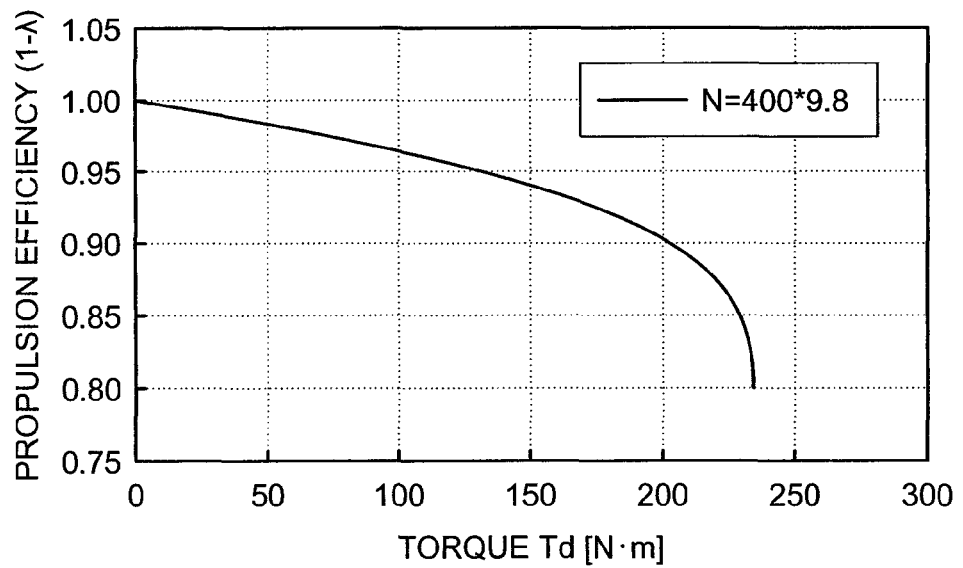
FIG. 20 is a diagram depicting a torque-propulsion efficiency relation when the normal force is constant.

FIG. 20 is a diagram depicting a torque-propulsion efficiency relation when the normal force is constant. In this case, as depicted, if the torque Td increases, the propulsion efficiency ηλ decreases and the degree of the decrease increases at the torque Td increases. In other words, if the torque Td of the drive wheel increases, the propulsion efficiency ηλ decreases; and if the torque Td of the drive wheel decreases, the propulsion efficiency ηλ increases. In this manner, when the torque distribution described in the first example is performed, to improve the overall efficiency, not only the driving efficiency, but also the propulsion efficiency has to be considered. The propulsion efficiency ηλ, as described, is not limited to a configuration that uses preliminarily created chrematistics maps of the slip rate λ—the friction coefficient μ retained in memory. As another configuration, for example, as the vehicle travels, the vehicular speed at that time can be detected by a sensor (or estimated by calculation) and further, the speed of the drive wheel can be detected by a sensor and the slip rate λ can be approximated by calculation to be used as parameters of the propulsion efficiency ηλ.

(Variation of Propulsion Efficiency Consequent to Load Variation)

By transforming expression (20), which represents torque, the following expression is obtained.

$$\mu = Td/(N \cdot r) \quad (25)$$

Figure 21:
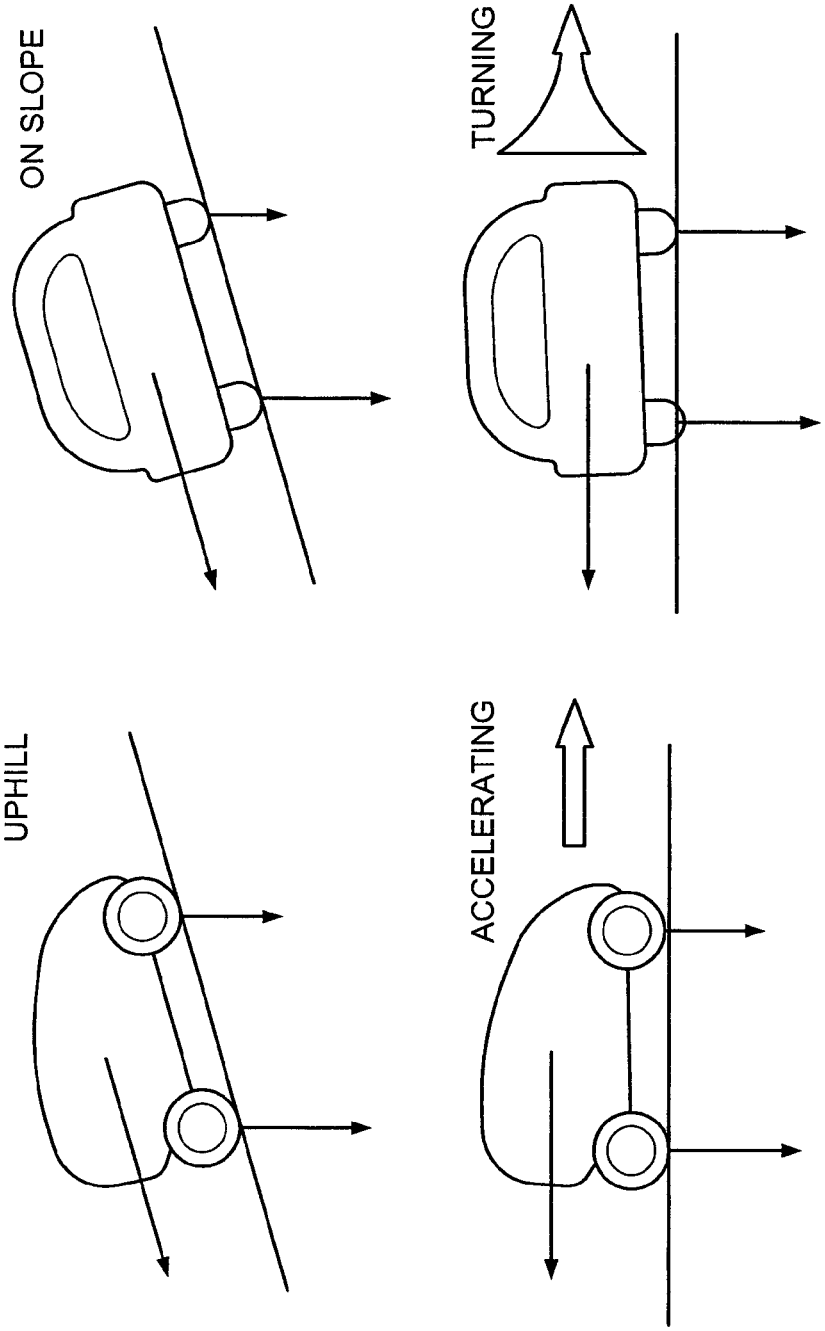
FIG. 21 is a diagram depicting states in which the normal force differs according to drive wheel.

FIG. 21 is a diagram depicting states in which the normal force differs according to drive wheel. From expression (25), if a given drive wheel is provided a given instructed torque, the friction coefficient μ varies according to the variation of the normal force N from the road surface to the tire. As depicted in FIG. 21, when the vehicle is traveling uphill, on a slope, accelerating, turning, etc., the load balance of the vehicle changes and if the normal force N of a given drive wheel decreases, the friction coefficient μ increases, and the slip rate λ also increases. As a result, 1−λ in expression (22) decreases and the efficiency ηλ of the propulsion system decreases.

Figure 22:
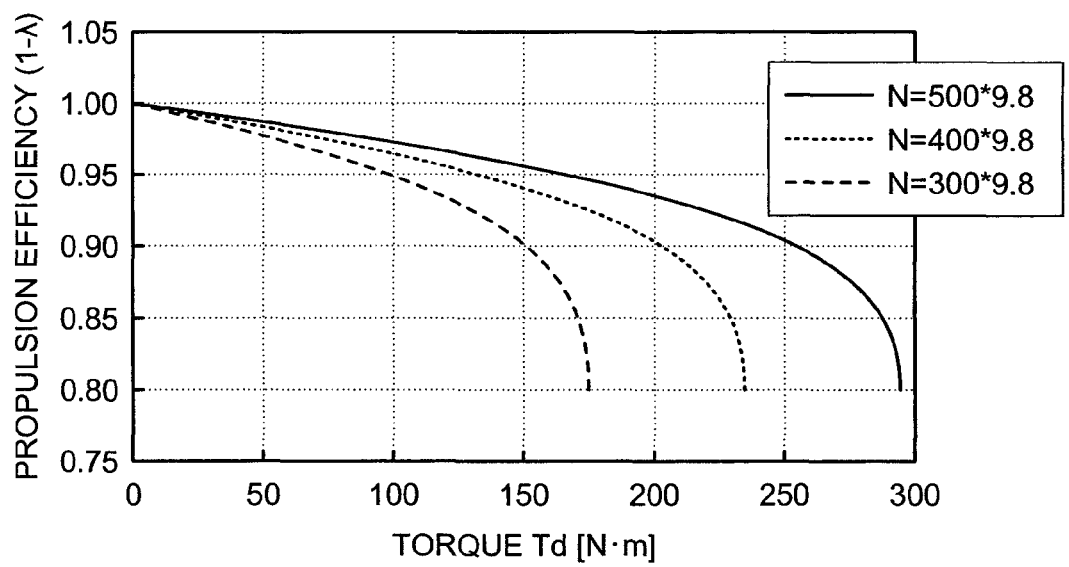
FIG. 22 is a graph depicting torque-propulsion efficiency according to normal force.

FIG. 22 is a graph depicting torque-propulsion efficiency according to normal force. From expression (23), if the normal force N increases, the efficiency ηλ of the propulsion system increases, and the degree by which the efficiency ηλ of the propulsion system decreases accompanying an increase in the torque Td becomes gradual. Therefore, if the normal force N of the drive wheels varies, for a drive wheel for which the normal force N increases, the efficiency ηλ of the propulsion system increases; and for a drive wheel for which the normal force N decreases, the efficiency ηλ of the propulsion system decreases. Consequently, by increasing the torque of a drive wheel subjected to a large load and decreasing the torque of a drive wheel subjected to a small load, the propulsion efficiency can be improved.

(Overall Efficiency)

Figure 23:
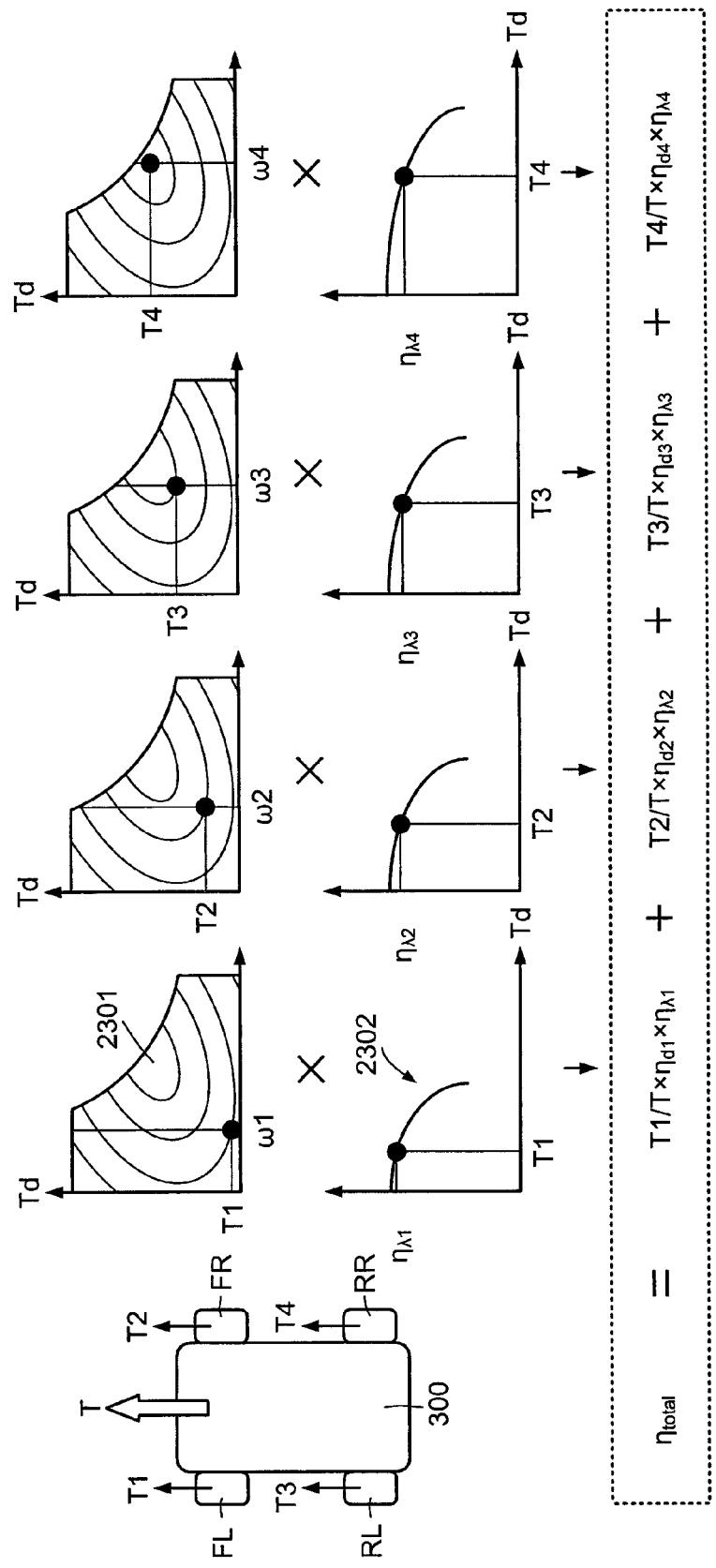
FIG. 23 is a diagram for explaining overall efficiency of the entire vehicle.

FIG. 23 is a diagram for explaining overall efficiency of the entire vehicle. The instructed torque T is distributed as T1, T2, T3, and T4 to the drive wheels FL, FR, RL, RR of the vehicle 300. The overall efficiency of the vehicle 300 can be obtained by a summation of torque distribution ratios of the drive wheels FL, FR, RL, RR×the driving efficiency $\eta_d$×the propulsion efficiency ηλ.

Taking the drive wheel FL in FIG. 23 as an example, using a motor efficiency map 2301 and the torque T1 distributed to the drive wheel FL, the driving efficiency $\eta_d 1$ can be obtained based on the rotational speed ω1. Further, based on a torque-propulsion efficiency characteristic curve 2302, the propulsion efficiency ηλ1 can be obtained from the torque T1 distributed to the drive wheel FL. Similarly, concerning the other drive wheels FR, RL, RR, the respective driving efficiencies $\eta_d 2$, $\eta_d 3$, $\eta_d 4$, and the propulsion efficiencies ηλ2, ηλ3, ηλ4 can be obtained.

The efficiency η total can be obtained by the following expression.

$$\eta total = (T1/T) \cdot \eta_d 1 \cdot \eta \lambda 1 + (T2/T) \cdot \eta_d 2 \cdot \eta \lambda 2 + (T3/T) \cdot \eta_d 3 \cdot \eta \lambda 3 + (T4/T) \cdot \eta_d 4 \cdot \eta \lambda 4 \quad (26)$$

By detecting or estimating the normal force of the drive wheels FL, FR, RL, RR and performing torque distribution according to the normal force such that the value of expression (26) is maximized, the propulsion efficiency can be improved.

(Calculation Example of Overall Efficiency: During Power Running)

FIGS. 24A and 24B are diagrams depicting calculation examples of overall efficiency. In each, the weight of the vehicle 300 is 1600 [kg]; the instructed torque T is 800 [Nm]; the load balance moves towards the rear consequent to the climbing of a hill or acceleration; the load of each front wheel is 300 [kg]; and the load of each rear wheel is 500 [kg].

In the example depicted in FIG. 24A, the torque distribution of the drive wheels is 200 [Nm] and 4-wheel drive is assumed. Using a motor efficiency map 2501, based on the torque Td=200 [Nm] distributed to the front wheels FL, FR and the rotational speed ω=80 [rad/s], the driving efficiency $\eta_d$=0.82 is obtained. Further, based on torque-propulsion efficiency characteristics 2502, the propulsion efficiency ηλ=0.976 is obtained from the torque Td=200 [Nm] of the drive wheel FL. Similarly concerning the rear wheels RL, RR, the driving efficiency $\eta_d$=0.82 and the propulsion efficiency ηλ=0.986 are obtained. This result, the total efficiency ηtotal, is ηtotal=((200/800)·0.82·0.976)·2+((200/800)·0.82·0.986)·2=0.80442, based on expression (26).

In the example depicted in FIG. 24B, torque distribution of the rear wheels is 400 [Nm] and 2-wheel drive is assumed. Using the motor efficiency map 2501, the driving efficiency $\eta_d$=0.69 is obtained based on the torque Td=0 [Nm] distributed to the front wheels FL, FR and the rotational speed ω=80 [rad/s]. Further, based on the torque-propulsion efficiency characteristics 2502, the propulsion efficiency ηλ=1 is obtained from the torque Td=400 [Nm] distributed to the drive wheel FL. Similarly, concerning the rear wheels RL, RR, the driving efficiency $\eta_d$=0.93 and the propulsion efficiency ηλ=0.971 are obtained. This result, the total efficiency ηtotal, is ηtotal=((0/800)·0.69·1)·2+((400/800)·0.93·0.971)·2=0.90303, based on expression (26).

Without limitation to the calculation examples above, if the normal force against the drive wheels differs, the driving efficiency and the propulsion efficiency can be calculated for each drive wheel and therefore, based on the driving efficiencies and propulsion efficiencies, the overall efficiency can be calculated. Compared to selecting a combination for which the torque distribution algorithm of the first example has the optimum drive system efficiency, a combination for which the torque distribution algorithm of the second example has the optimum overall efficiency is selected.

According to the second example described above, similar to the first example, by drawing on motor efficiency map, a sloped performance curve that considers slip rate, the operating point of the rotational speed and the torque can be accurately detected. Thus, the calculation of efficiency by torque distribution can be performed more accurately. Further, optimal torque distribution with respect to the drive wheels can be performed. In addition, in the second example, since the normal force (load) at the drive wheels is considered, the efficiency of the propulsion system can be detected accurately, and the overall efficiency can be improved. Further, optimal torque distribution that improves overall efficiency with respect to the drive wheels can be performed. Similar to the first example, when the vehicle travels with torque values that differ for the total torque of the left-side drive wheels and the total torque of the right-side drive wheels, the angle of the steering wheel 30 and the angle of the vehicle from the yaw rate sensor 310 are detected and if it is judged that the difference thereof is great, it suffices to adjust the torque distribution amount such that the left-right torque difference decreases to establish propulsion stability.

Third Example

Configuration to Improve Overall Efficiency: During Regenerative Braking

Figure 25:
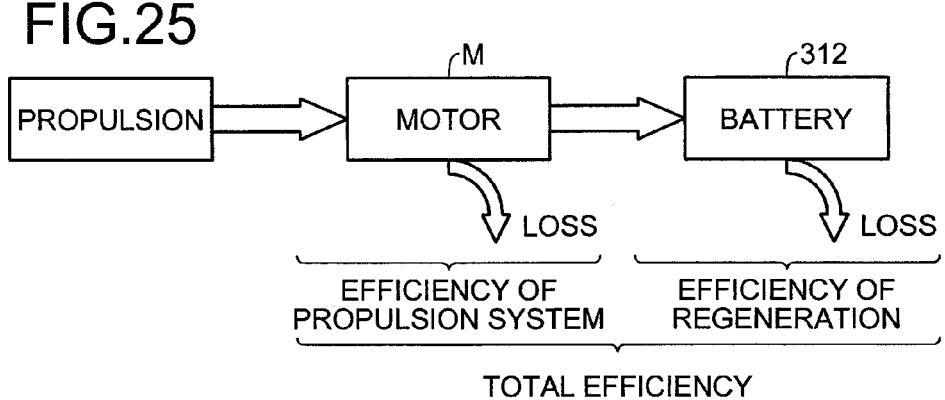
FIG. 25 is a diagram for describing overall efficiency during regenerative braking.

In a third example, a configuration to improve overall efficiency during regeneration will be described. FIG. 25 is a diagram for describing overall efficiency during regenerative braking. Overall efficiency during regenerative braking=the efficiency of the propulsion system×the efficiency of regeneration. The efficiency of the propulsion system is the energy efficiency of rotating the motor M, as a load, from the propulsion power and the efficiency of regeneration is the energy efficiency from the rotation of the motor, generation of regenerative electrical power, to the charging of the battery 312.

In comparing the efficiency when the motor M is driven and when braked,
during driving efficiency is expressed as:

efficiency of drive system=motor $M$ output/power consumption efficiency of propulsion system=propulsion power/ motor $M$ output during braking efficiency is expressed as:

efficiency of regeneration=regenerative electrical power/motor $M$ output efficiency of propulsion system=motor $M$ output/propulsion power.

(Slip Rate λ-Friction Coefficient μ Characteristics During Power Running and During Braking)

Figure 26:
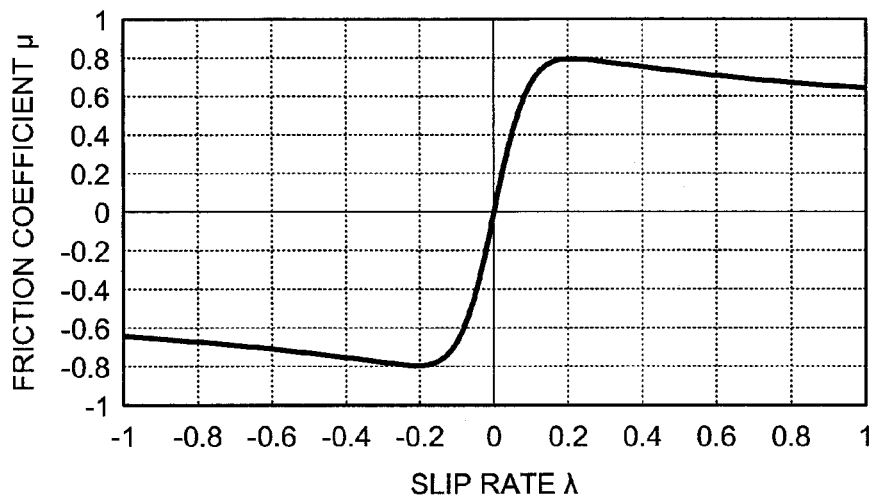
FIG. 26 is a diagram depicting relations between the slip rate and the friction coefficient during power running and during braking.

FIG. 26 is a diagram depicting relations between the slip rate and the friction coefficient during power running and during braking. Relations between the drive wheels (tires) and the road surface will be described.
When, vehicular speed v=wheel speed $v_w$=0, the slip rate λ=0, the following is true.
During driving, when $v \le v_w$, $\lambda=(v_w-v)/v_w$
During braking, when $v_w \le v$, $\lambda=(v_w-v)/v$ During braking, since the vehicular speed v is greater than the wheel speed $v_w$, the slip rate λ is negative. The friction coefficient μ is also negative. As a result, λ-μ characteristics during braking are located in the negative region of the coordinate system as depicted in FIG. 26. The characteristics are symmetrical to the characteristics during power running depicted in FIG. 6 about the origin (0).
(Relations Between Torque and Rotational Speed During Regenerative Braking)
A motion expression of the drive wheels and the driving force of a drive wheel are represented as expressions (2) and (3) above.

If abrupt acceleration or abrupt deceleration is not performed, variation of the rotational speed is low and therefore, is expressed by expression (5) above.

$$d\omega/dt \approx 0 \qquad (5)$$

That is, an instructed torque Tm for the motor and the driving torque Td of the drive wheel are approximately equal, $$\therefore Tm \approx Td = Fd \cdot r = \mu \cdot N \cdot r \qquad \text{(same as expression (20))}$$

Hereinafter, description will be continued assuming that variation of the vehicular speed is gradual, and the instructed torque Tm of the motor and the driving torque Td of the drive wheel are approximately equal.

Figure 27:
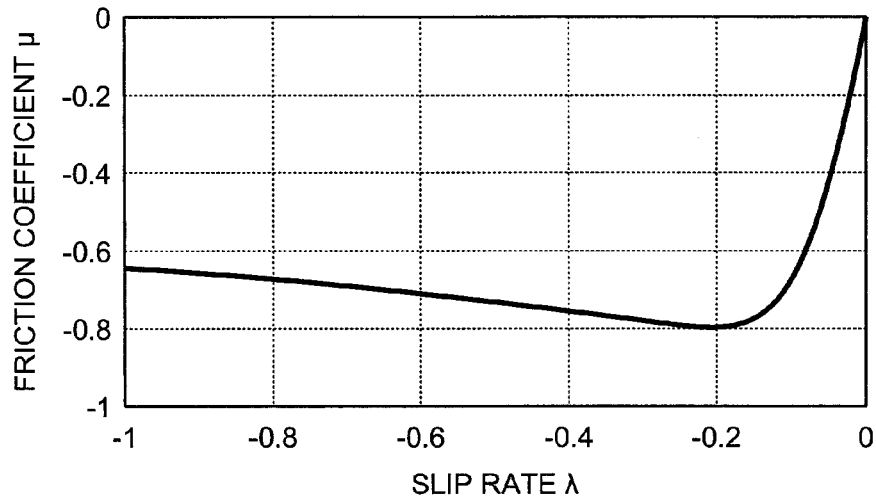
FIG. 27 is a diagram depicting relations between slip rate and friction coefficients during braking.

FIG. 27 is a diagram depicting relations between slip rate and friction coefficients during braking. The horizontal axis represents the slip rate λ. The vertical axis represents the friction coefficient μ. The slip rate λ and the friction coefficient μ have the relation depicted in FIG. 27 and can be approximated by expression (6) above. In the characteristics diagram depicted in FIG. 27, the friction coefficient μ becomes the most negative when the slip rate λ is −0.2. A slip rate λ of −1 corresponds to a locking of the drive wheel. By performing control to suppress the slip rate λ within a range of 0 to −0.2, propulsion is enabled without locking of the drive wheel. Concerning the characteristics depicted in FIG. 27, the most negative value of μ and the value of λ that makes μ the most negative vary according to the state of the tire and/or the road surface. Even in this case, by changing the values of the parameters B, C, D, E in expression (6) approximation can be performed. However, in general, since sudden changes in the surface of the tires and asphalt roads are rare, changes in the μ-λ characteristics during travel are gradual.

Further, during braking $$\lambda=(r \cdot \omega-v)/v=(r \cdot \omega)/v-1 \qquad (27)$$

is true and therefore, Td is expressed by expression (28) below.

$$\begin{aligned} T_d &= \mu \times N \times r \qquad (28) \\ &= D \times \sin\!\left(C \times \tan^{-1}(B \times (1-E) \times \lambda) + \frac{E}{B} \times \tan^{-1}(B \times \lambda)\right) \times N \times r \\ &= D \times \sin(C \times \tan^{-1}(B \times (1-E) \times \\ &\quad \left(\frac{r \times \omega}{v}-1\right)) + \frac{E}{B} \times \tan^{-1}\!\left(B \times \left(\frac{r \times \omega}{v}-1\right)\right)) \times N \end{aligned}$$

If abrupt acceleration or abrupt deceleration is not performed, speed v is substantially constant and therefore, vehicular speed v may be assumed to be substantially constant, whereby relations between Td and ω can be yielded by expression (28).

Figure 28:
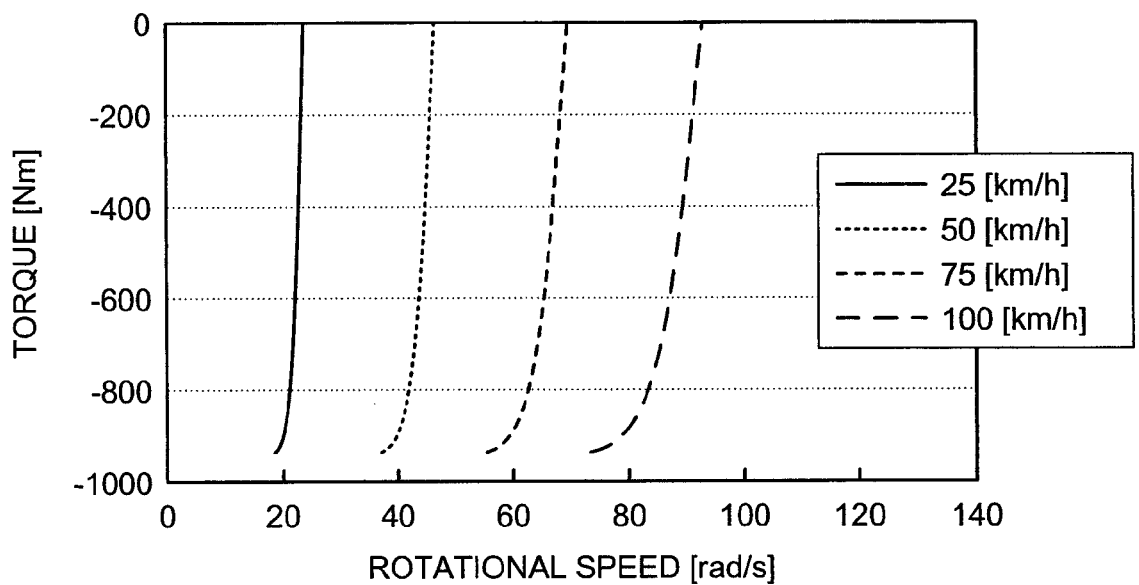
FIG. 28 is a diagram depicting relations between rotational speed and torque during braking and taking slip rate into consideration.

FIG. 28 is a diagram depicting relations between rotational speed and torque during braking and taking slip rate into consideration. The torque and rotational speed calculated based on the expression above are depicted. In this example, the normal force N: 400[kg]×9.8 [m/s$^2$], tire radius r:0.3[m], vehicular speed v=25, 50, 75, 100 [km/h] is assumed.

Therefore, when the drive wheel torque varies consequent to changing the torque distribution, the rotational speed correspondingly varies. The curves according to vehicular speed depicted in FIG. 28 are not straight lines but rather gradually slope as the regenerative torque increases and are change curves that become saturated at the maximum regenerative torque.

Figure 29:
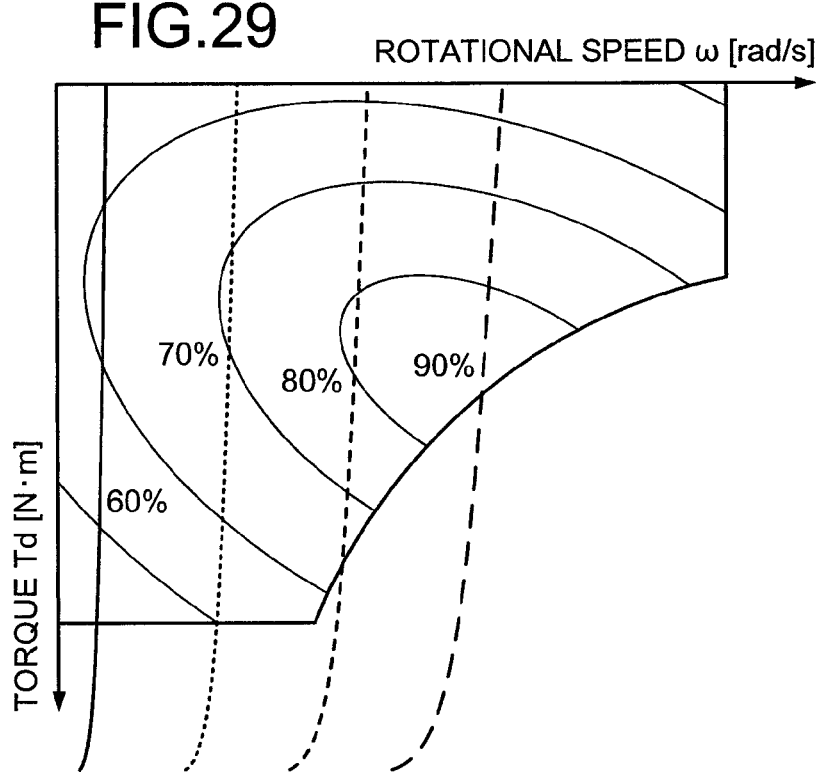
FIG. 29 is a diagram depicting the change curves depicted in FIG. 28 superimposed on a motor efficiency map.

FIG. 29 is a diagram depicting the change curves depicted in FIG. 28 superimposed on a motor efficiency map. The horizontal axis represents the rotational speed ω and the vertical axis represents the torque Td. On the motor efficiency map, performance curves according to vehicular speed are drawn, whereby torque-efficiency relations are obtained, enabling accurate calculation of the efficiency even if the torque distribution is changed.

The efficiency of regeneration $\eta_r$ is expressed by expression (29).

$$\eta_r = (V-I)/(T\cdot\omega) \qquad (29)$$

(T: torque, ω: rotational speed, V: voltage, I: current)

Figure 30A:
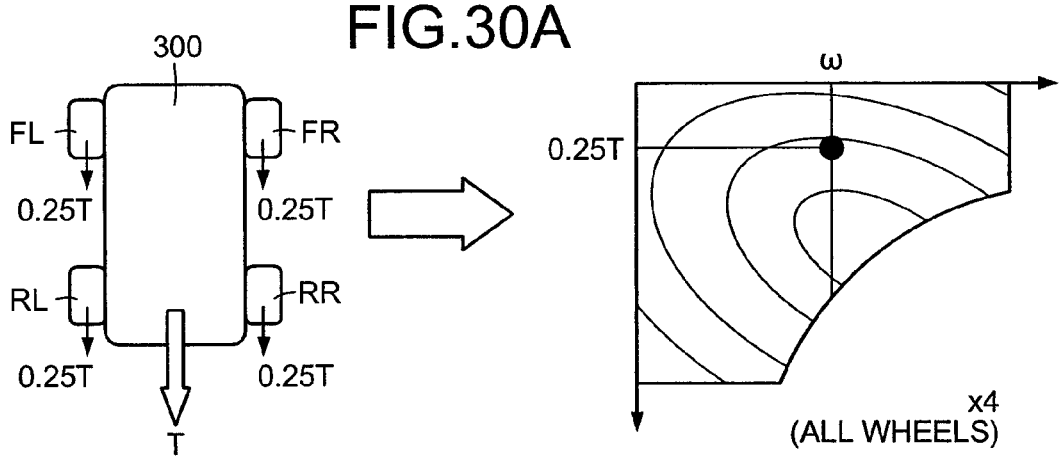
FIG. 30A is a diagram depicting torque distribution of each drive wheel (part 1)
Figure 30B:
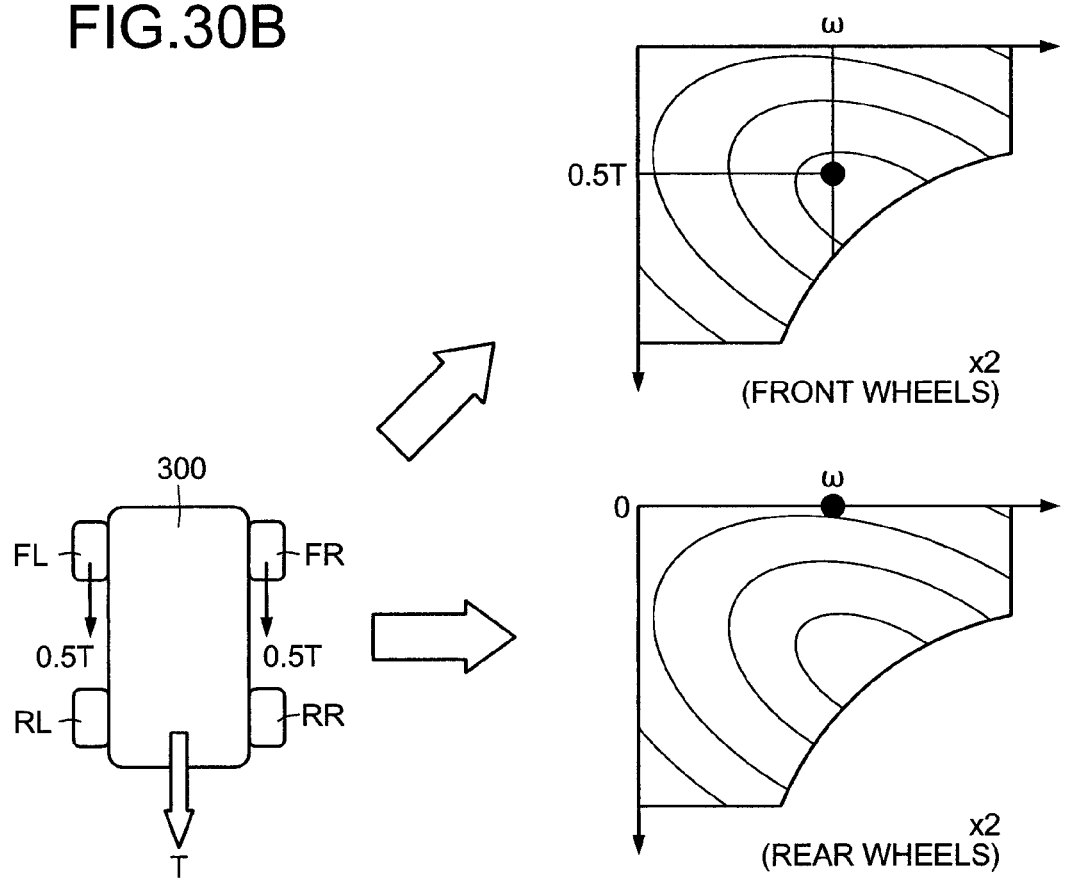
FIG. 30B is a diagram depicting torque distribution of each drive wheel (part 2)

FIGS. 30A and 30B are diagrams depicting torque distribution of each drive wheel. In the example depicted in FIG. 30A, torque distribution (0.25T) among the drive wheels is equivalent. In this case, regenerative efficiency $\eta_r$ of each of the drive wheel is obtained based on the torque of 0.25T and the rotational speed ω. In the example depicted in FIG. 30B, torque distribution (0.5T) is equivalent for only the front wheels. In this case, regenerative efficiency $\eta_r$ of each of the front drive wheels is obtained based on the torque of 0.5T and the rotational speed ω.

(Propulsion Efficiency During Braking)

A configuration that maximizes overall efficiency during regenerative braking in the third example will be described. driving force Fd per drive wheel is expressed by expression (19).

$$Fd = \mu \cdot N \qquad (19)$$

(μ: friction coefficient, N: normal force)
Therefore, $$Td = Fd\cdot r = \mu\cdot N\cdot r \qquad \text{(the same as expression (20))}$$

(r: tire radius)
The slip rate λ during braking is expressed by expression (30). The denominator is the vehicular speed v.

$$\lambda = (v_w - v)/v \qquad (30)$$

(v: vehicular speed [m/s], $v_w$: wheel speed [m/s])

Therefore, propulsion efficiency $\mu_b$ during braking can be expressed by expression (31) using the slip rate λ.

$$\eta_b = \text{motor output/propulsion power} = (Td\cdot\omega)/(Fd\cdot v) = (Fd\cdot r\cdot\omega)/(Fd\cdot v) = (r\cdot\omega)/v = v_w/v \qquad (31)$$

$$\therefore \eta_b = 1+\lambda \qquad (32)$$

From the characteristics of the slip rate λ and the friction coefficient μ during braking depicted in FIG. 27, the slip rate λ can be assumed to be a function of the friction coefficient μ and by expressing λ=f(μ), the efficiency of the propulsion system $\eta_b$ is expressed as follows.

$$\eta_b = 1+\lambda = 1+f(\mu) = 1+f(Td/(N\cdot r)) \qquad (33)$$

$$\because \mu = Td/(N\cdot r) \qquad (34)$$

Figure 31:
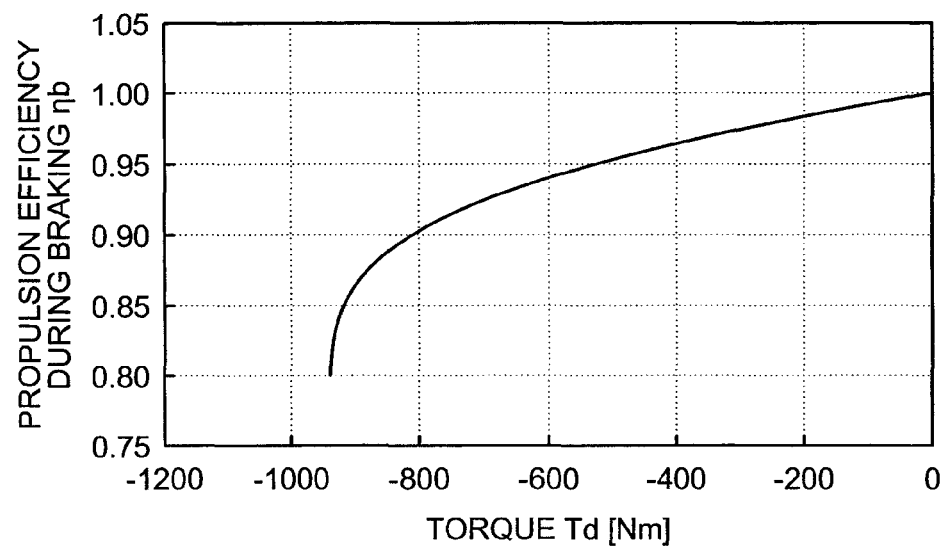
FIG. 31 is a diagram depicting torque-propulsion efficiency relations when the normal force is constant.

FIG. 31 is a diagram depicting torque-propulsion efficiency relations when the normal force is constant. In this case, as depicted, the torque Td becomes more negative, the propulsion efficiency $\eta_b$ decreases, the degree of which increases as the negativity of the torque Td increases. In other words, when the torque Td of the drive wheel becomes more negative, propulsion efficiency $\eta_b$ decreases; and when the torque Td of the drive wheel becomes less negative, the propulsion efficiency $\eta_b$ increases. Thus, when the torque distribution described in the third example is performed, to improve the overall efficiency, in addition to the regenerative efficiency, the propulsion efficiency must also be considered.

(Variation of Propulsion Efficiency Consequent to Load Variations)

Conversion of expression (20), which expresses torque, yields the following expression.

$$\mu = Td/(N\cdot r) \qquad (25)$$

Figure 32:
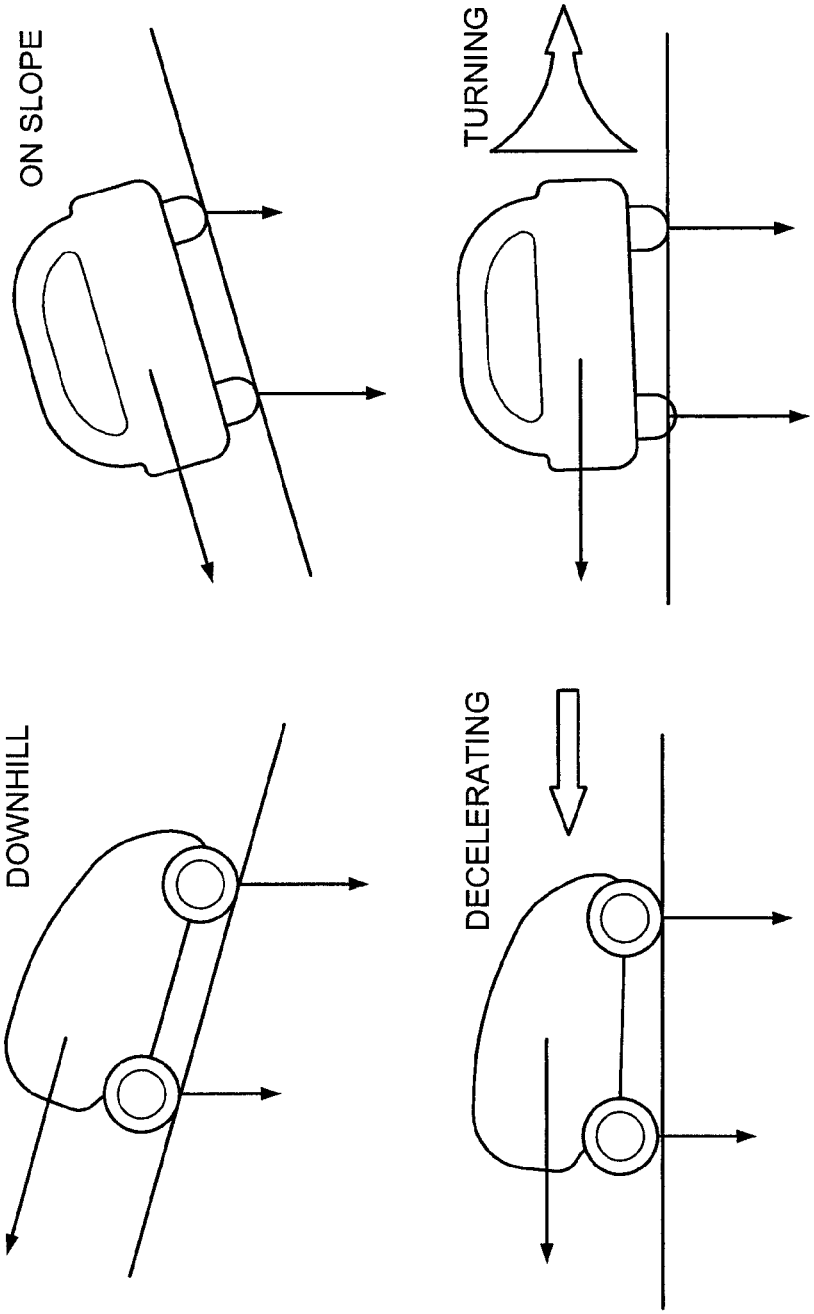
FIG. 32 is a diagram for describing a state when the normal force differs according drive wheel.

FIG. 32 is a diagram for describing a state when the normal force differs according drive wheel. From expression (25), when a specific instructed torque is given to a given drive wheel, the friction coefficient μ varies according to variation of the normal force N from the road surface to the tire. As depicted in FIG. 32, when the vehicle is traveling downhill, on a slope, decelerating, turning, etc., the balance of the load on the vehicle changes and if the normal force N of a given drive wheel decreases, the friction coefficient μ increases, and the slip rate λ also increases. As a result, 1+λ in expression (32) decreases and the efficiency of the propulsion system $\eta_b$ drops.

Figure 33:
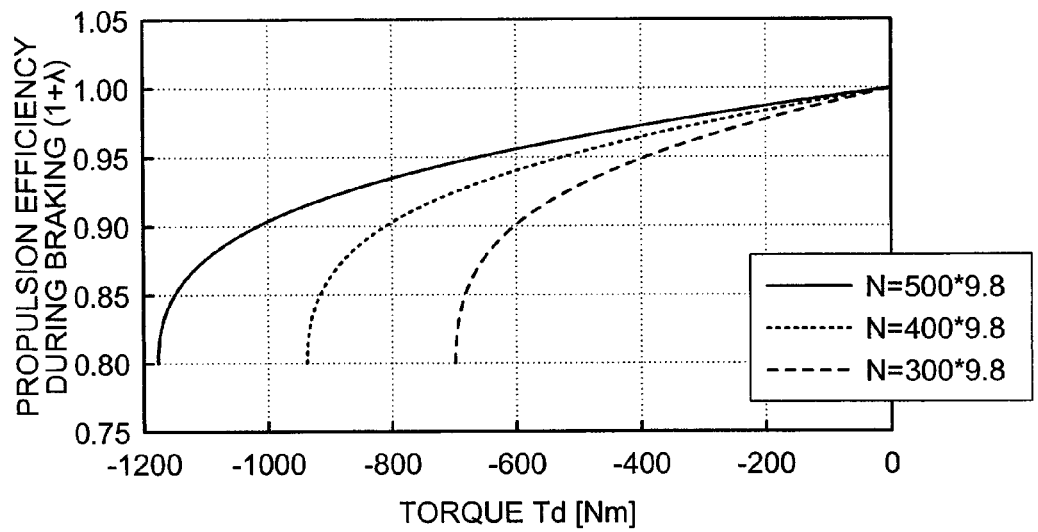
FIG. 33 is a diagram depicting torque-propulsion efficiency according to normal force.

FIG. 33 is a diagram depicting torque-propulsion efficiency according to normal force. From expression (33), the normal force N increases, the efficiency of the propulsion system $\eta_b$ increases and accompanying the increase in the negativity of the torque Td, the degree at which the efficiency of the propulsion system $\eta_b$ decreases becomes gradual. Thus, when the normal force N of the drive wheels changes, for a drive wheel subject to a large normal force N, the efficiency of the propulsion system $\eta_b$ increases; and for a drive wheel subject to a small normal force N, the efficiency of the propulsion system $\eta_b$ decreases. Consequently, by increasing the negative torque of a drive wheel subject to a large load and decreasing the negative torque of a drive wheel subject to a small load, the propulsion efficiency during braking can be improved.

FIGS. 34A to 34E are diagrams for describing torque distribution in the case of four drive wheels. An example will be described where the distributing unit 107 distributes torque to each of the motors M, where n=4.

(Characteristics of Performance Curve on Motor Efficiency Map)

Torque distribution for unique torque-efficiency characteristics according to motor will be described. As described above, the motors each have unique torque-efficiency characteristics (refer to FIGS. 11A to 11C), and wheel characteristics among the unique torque-efficiency characteristics (FIGS. 12A to 14F). Even during regenerative braking in the third example, the combination maximizing the efficiency η is any one of the following.

$$(T1,T2) = (0,T),(T,0),(To,T-To), \\ (T-To,To),(T/2,T/2) \qquad \text{(the same as expression (14))}$$

(To: Torque Optimizing Efficiency)
In other words, irrespective of the type of the shape of the curve of the torque-efficiency characteristics, the combination that maximizes the efficiency η is among the combinations of expression (14).

That is, even if the shape of the curve of torque-efficiency characteristics is unclear, the result of calculating the combinations expressed in expression (14) is that the largest combination is the combination of torque distribution that maximizes the efficiency η. If the shape of the curve of the torque-efficiency characteristics is complicated, although a combination other than those of expression (14) may maximize the efficiency, for curves other than complicated characteristic curves having numerous inflection points, among the combinations indicated by expression (14), a combination that maximizes efficiency is present. In other words, although countless combinations of torque distribution exist, by merely calculating the combinations indicated by expression (14), an optimal torque distribution value can be yielded. In the example above, although torque distribution for 2 wheels has been described, torque distribution for multiple wheels, such as 4 is the same.

Thus, among the distributions depicted in FIGS. 34A to 34E described hereinafter, a combination that maximizes the efficiency η is present.

Assuming the number of motors M is n (n is a natural number), the distributing unit 107
(1) When the instructed torque T is less than the torque that optimizes efficiency To, distributes the instructed torque T to one motor as the torque distribution value thereof.
(2) When the instructed torque T is the torque that optimizes efficiency To or more, and less than n times the torque that optimizes efficiency To, selects any one among (a) to (c) below as the torque distribution. Here, among (a) to (c), that which has optimal regenerative efficiency is selected.
(a) Distributes the torque that optimizes efficiency To to each of the torque distribution values of a portion of the motors M and further distributes the remainder obtained by dividing the instructed torque T by the torque that optimizes efficiency To to one of the motors, or equally distributes the remainder to the n motors M.
(b) Distributes the torque that optimizes efficiency To to a portion of the motors M, respectively, as the torque distribution values thereof and further equally distributes to other motors M as the torque distribution values thereof, the torque that remain after distribution to the portion of the motors M.
(c) Distributes the instructed torque T equally to the motors M, respectively.
(3) When the instructed torque T is greater than or equal to n times the torque that optimizes efficiency To, the torque that optimizes efficiency To is distributed to the n motors M, respectively, as the torque distribution values thereof and the remainder obtained by dividing the instructed torque T by the torque that optimizes efficiency To is distributed to one of the motors or is distributed equally to the n motors M, from among which a combination having optimal regenerative efficiency is selected.

FIGS. 34A to 34E are diagrams for describing torque distribution when there are 4 drive wheels. An example where the distributing unit 107 distributes torque to the motors M when n=4 will be described.
(When T<To)

Figure 34A:
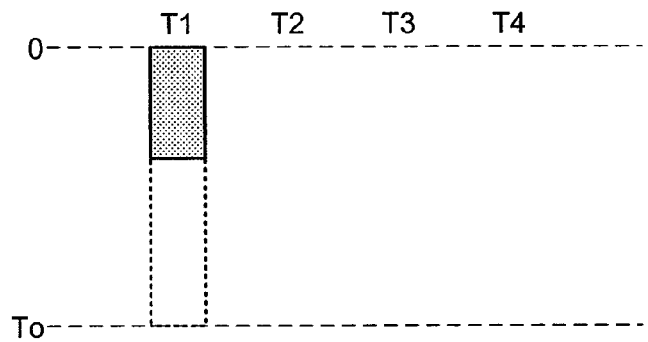
FIG. 34A is a diagram for describing torque distribution when there are 4 drive wheels (part 1)

As depicted in FIG. 34A, when the instructed torque T is less than the torque that optimizes efficiency To, the instructed torque T is distributed to one motor as the torque distribution value thereof.
(When To≤T<2To)

Figure 34B:
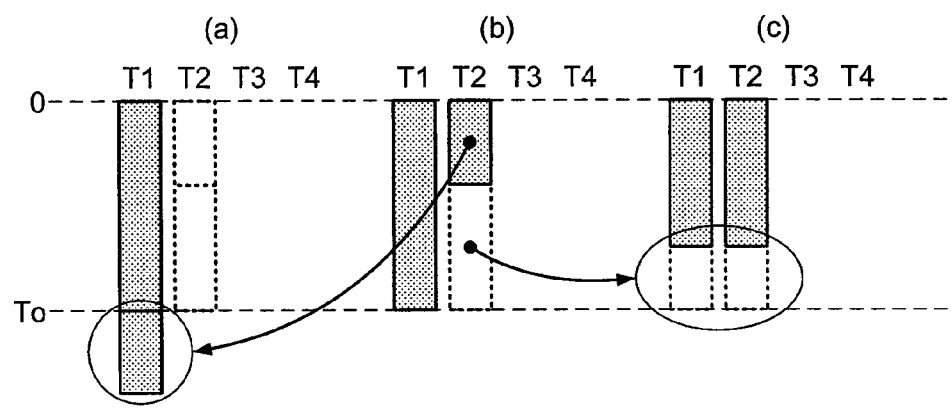
FIG. 34B is a diagram for describing torque distribution when there are 4 drive wheels (part 2)

As depicted in FIG. 34B, when the instructed torque T is greater than or equal to the torque that optimizes efficiency To and less than 2 times the torque that optimizes efficiency To, from among (a) to (c), the combination having the optimum regenerative efficiency is selected.
(a) Distribute the instructed torque T to any one of the motors as the torque distribution value thereof.
(b) Distribute the torque that optimizes efficiency To to any one of the motors as the torque distribution value thereof and distribute the remaining torque to another one motor as the torque distribution value thereof.
(c) Distribute ½ of the instructed torque T to any two motors, respectively, as the torque distribution values thereof.
(When 2To≤T<3To)

As depicted in FIG. 34C, the instructed torque T is greater than or equal to 2 times the torque that optimizes efficiency To and less than 3 times the torque that optimizes efficiency To, from among (a) to (e), the combination having the optimal regenerative efficiency is selected.
(a) Distribute the torque that optimizes efficiency To to any one of the motors as the torque distribution value thereof and distribute the remaining torque to another any one motor as the torque distribution value thereof.
(b) Distribute ½ of the instructed torque T to any two motors, respectively, as the torque distribution values thereof.
(c) Distribute the torque that optimizes efficiency To to any two motors, respectively, as the torque distribution values thereof and distribute the remaining torque to another one motor as the torque distribution value thereof.
(d) Distribute the torque that optimizes efficiency To to any one motor as the torque distribution value thereof and distribute ½ of the remaining torque to the remaining two motors, respectively, as the torque distribution values thereof.
(e) Distribute ⅓ of the instructed torque T to any three of the motors, respectively, as the torque distribution values thereof.
(When 3To≤T<4To)

Figure 34D:
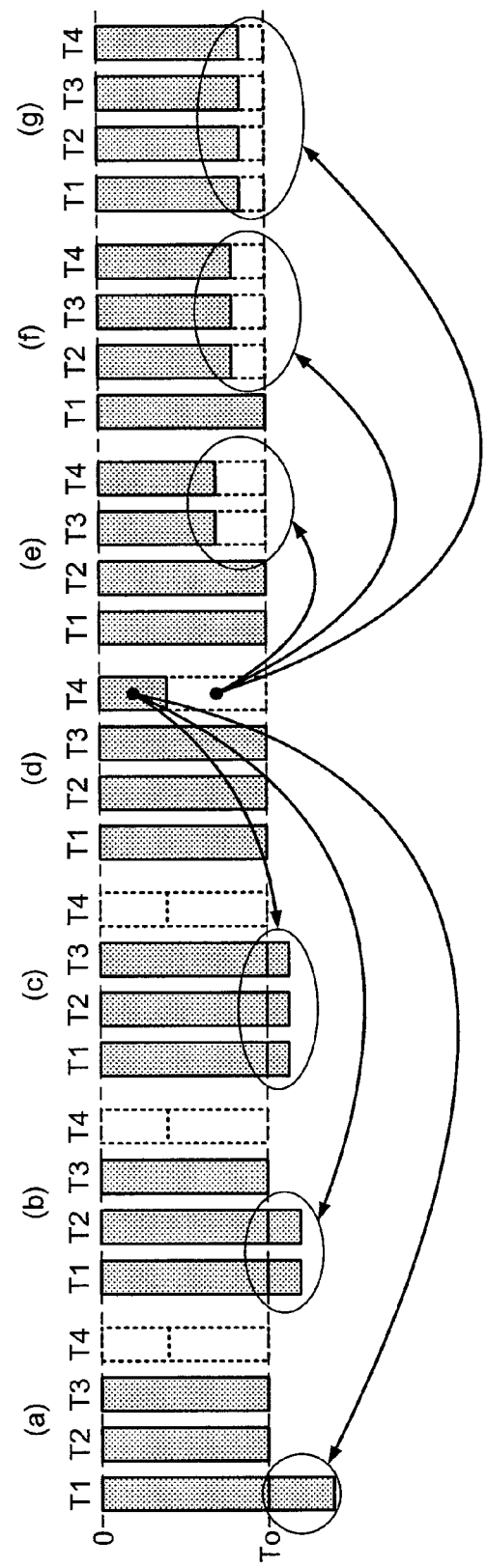
FIG. 34D is a diagram for describing torque distribution when there are 4 drive wheels (part 4)

As depicted in FIG. 34D, when the instructed torque T is greater than or equal to 3 times the torque that optimizes efficiency To and less than 4 times the torque that optimizes efficiency To, from among (a) to (g), the combination having the optimal regenerative efficiency is selected.
(a) Distribute the torque that optimizes efficiency To to any two of the motors, respectively, as the torque distribution values thereof and distribute the remaining torque to any one of the remaining motors, as the torque distribution value thereof.
(b) Distribute the torque that optimizes efficiency To to any one of the motors as the torque distribution value thereof and distribute ½ of the remaining torque to the remaining two motors, respectively, as the torque distribution values thereof.
(c) Distribute ⅓ of the instructed torque T to any three of the motors, respectively, as the torque distribution values thereof.
(d) Distribute the torque that optimizes efficiency To any three of the motors, respectively, as the torque distribution values thereof and distribute the remaining torque to the remaining motor as the torque distribution value thereof.
(e) Distribute the torque that optimizes efficiency To to any two of the motors, respectively, as the torque distribution values thereof and distribute ½ of the remaining torque to the remaining two motors, respectively, as the torque distribution values thereof.
(f) Distribute the torque that optimizes efficiency To to any one of the motors as the torque distribution value thereof and distribute ⅓ of the remaining torque to the remaining three motors, respectively, as the torque distribution values thereof.
(g) Distribute ¼ of the instructed torque T to the four motors, respectively, as the torque distribution values thereof.
(When 4To≤T)

Figure 34E:
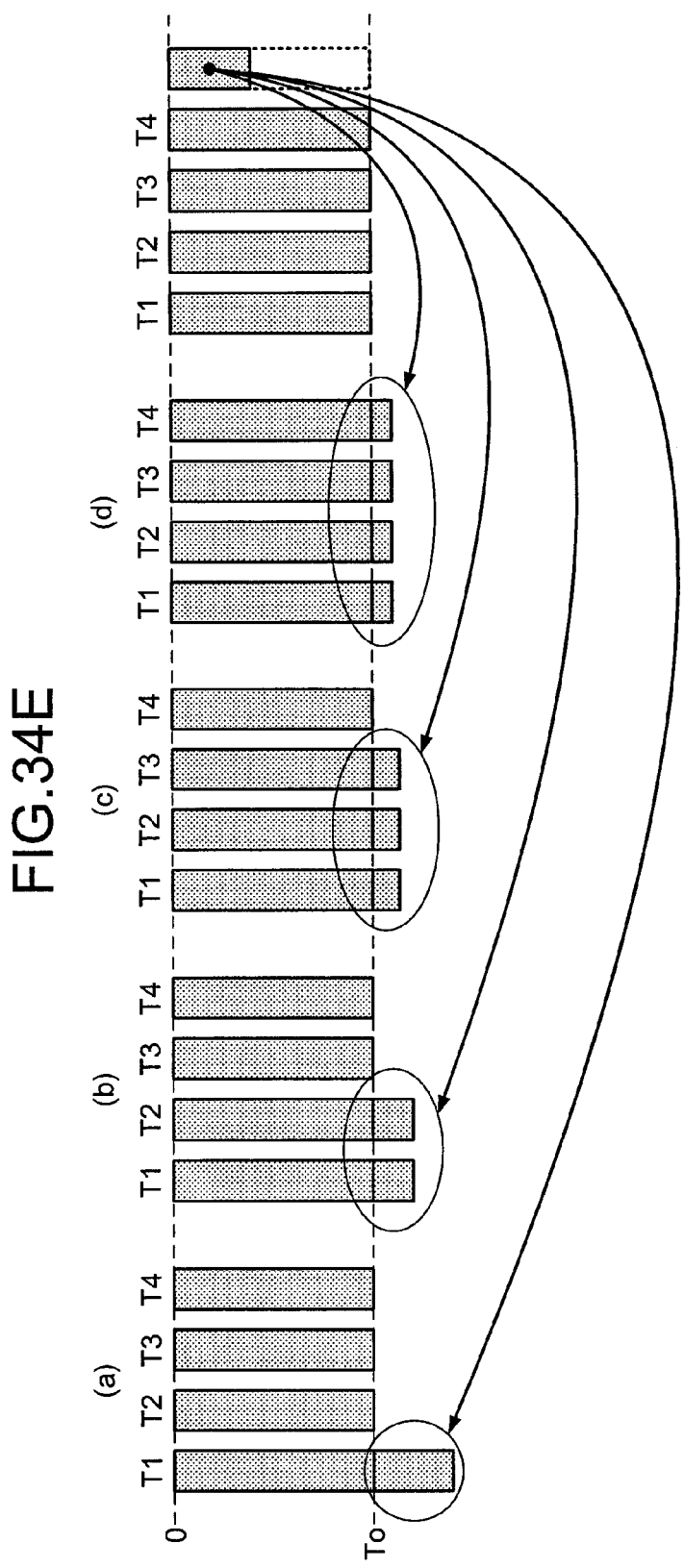
FIG. 34E is a diagram for describing torque distribution when there are 4 drive wheels (part 5)

As depicted in FIG. 34E, when the instructed torque T is greater than or equal to 4 times the torque that optimizes efficiency To, from among (a) to (d), the combination having the optimal regenerative efficiency is selected.
(a) Distribute the torque that optimizes efficiency To to any three of the motors, respectively, as the torque distribution values thereof and distribute the remaining torque to the remaining one motor as the torque distribution value thereof.
(b) Distribute the torque that optimizes efficiency To to two of the motors, respectively, as the torque distribution values thereof and distribute ½ of the remaining torque to the remaining two motors, respectively, as the torque distribution values thereof.
(c) Distribute the torque that optimizes efficiency To to any one of the motors as the torque distribution value thereof and distribute ⅓ of the remaining torque to the remaining three motors, respectively, as the torque distribution values thereof.
(d) Distribute ¼ of the instructed torque T to the four motors, respectively, as the torque distribution values thereof.

When the distribution examples above are expressed by formulae, and for a general expression of the torque distribution when n motors M are used during regenerative braking, the expressions are the same as those in the first example. Further, the simplification of torque distribution and dynamic torque distribution can be performed in the same manner as the first example.

(Regenerative Braking Control Method)

When the motor M rotates, back electromotive force is generated according to the rotational speed. The back electromotive force acts to reduce the voltage provided to the motor M and thus, the required torque cannot be generated in this state. Consequently, when the motor M is controlled, consideration is given the amount of voltage drop that occurs consequent to the back electromotive force. Meanwhile, while the motor M is rotating, if power for driving the motor is not supplied, the motor M enters a generator mode and the generated back electromotive force can be recovered by the battery.

In this case, since the current in the coils of the motor M is reversed during driving, negative torque is generated. In other words, the torque is opposite to the direction of rotation and braking force is generated. By inverting the PWM signal generated by the inverter INV, regenerative braking can be performed. In other words, the required regenerative braking torque, like driving torque, can be generated by a PWM signal. In a typical electric vehicle, when the brake pedal is pressed and when the accelerator pedal is released during travel at a moderate speed or faster, regenerative braking can be performed.

(Blended Brake)

A blended brake used for regenerative braking in the third example will be described. The blended brake is a combination of a regenerative brake under motor control and a mechanical brake under hydraulic control, and generates the required braking force. In combining these regenerative and mechanical brakes, a variety of braking methods are achieved and each combination is a configuration in which the mechanical brake supplements the insufficient braking force of the regenerative brake.

FIGS. 35A to 35D are diagrams depicting various braking methods of blended brakes. The horizontal axis represents the instructed braking torque and the vertical axis represents the braking torque. During regenerative braking, both values are negative. According to the braking method depicted in FIG. 34A, the regenerative brakes and the mechanical brakes are operated at a constant ratio and according to the instructed braking torque, i.e., the extent that the brake pedal is pressed. According to the braking method depicted in FIG. 35B, in a region where the instructed braking torque is low, the regenerative brakes are primarily used and hydraulic control is performed such that the ratio at which the mechanical brakes are used increases as the instructed braking torque increases. The blended brakes depicted in FIGS. 35A and 35B regularly use the regenerative brakes and the mechanical brakes synergetically, thereby enabling stable braking.

Figure 35A:
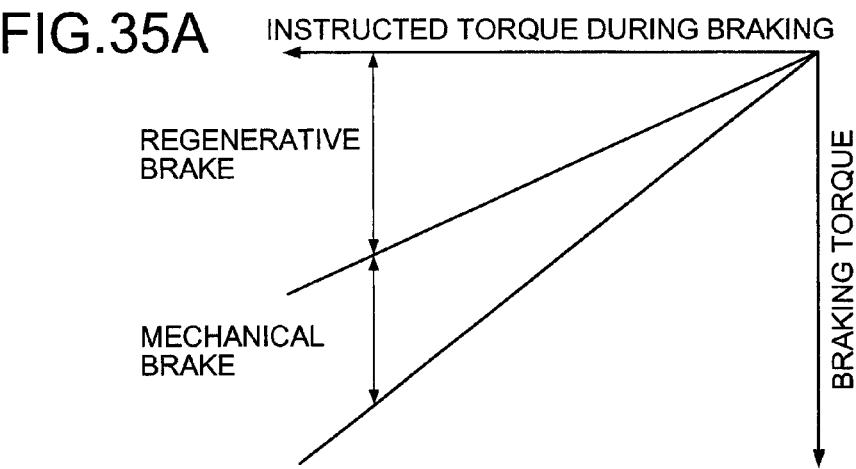
FIG. 35A is a diagram depicting various braking methods of blended brakes (part 1)
Figure 35B:
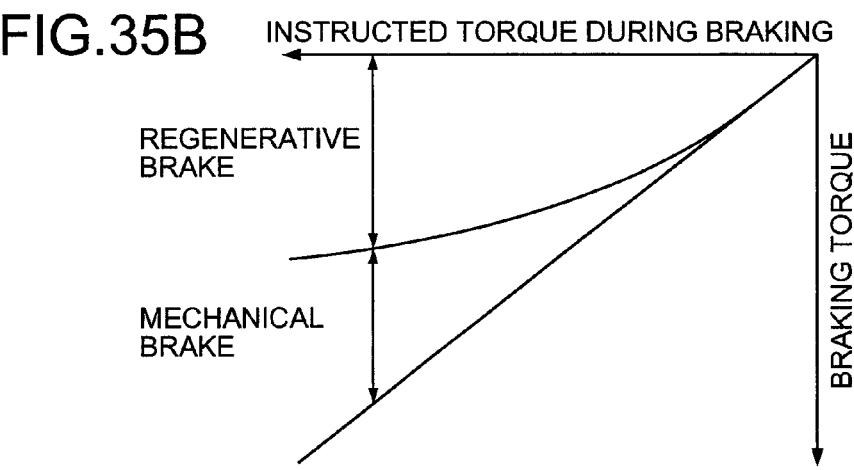
FIG. 35B is a diagram depicting various braking methods of blended brakes (part 2)
Figure 35C:
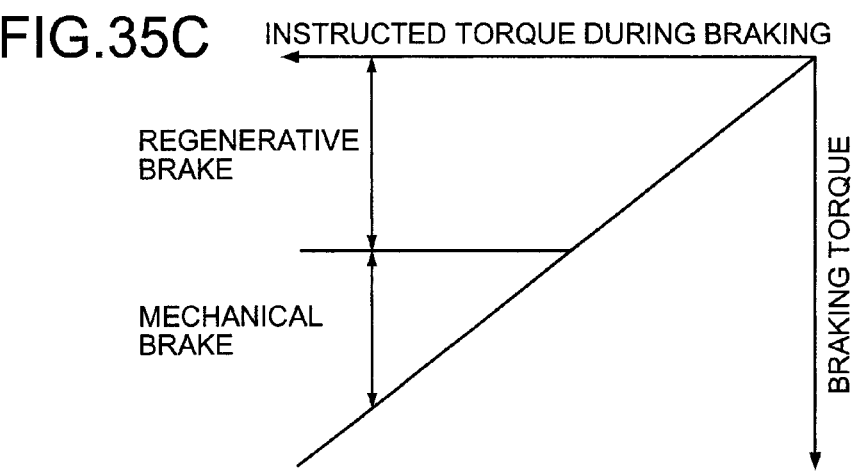
FIG. 35C is a diagram depicting various braking methods of blended brakes (part 3)

According to the braking method depicted in FIG. 35C, in a region where the instructed braking torque is low, the regenerative brakes alone are used and when the instructed braking torque is a given value or more, the mechanical brakes are used. Braking by all of the regenerative brakes is performed up to the amount of braking torque obtainable by the regenerative brakes. According to the braking method depicted in FIG. 35D, contrary to FIG. 35C, in a region where the instructed braking torque is low, the mechanical brakes alone are used and when the instructed braking torque is a given value or more, the regenerative brakes are used. The regenerative brakes are used to supplement the mechanical brakes.

When these blended brakes are used, the torque distributing unit 107 controls the torque of the regenerative braking after calculating the amount of torque of the regenerative brakes for the instructed braking torque. In other words, the instructed braking torque is received, and after subtracting the braking torque by the mechanical brakes, the braking torque of the regenerative brakes is distributed to the drive wheels.

(Pseudo Engine Braking)

In gasoline powered vehicles, when the accelerator pedal is released, engine braking occurs. However, in electric vehicles, by performing weak regenerative braking, pseudo engine braking can be brought about. The amount of regenerative braking torque corresponding to pseudo engine braking is a constant value or variable according to the mode, or variable according to speed. The torque distributing unit 107 controls the regenerative torque of the drive wheel according to the torque of the pseudo engine braking and the load of the drive wheels during travel.

FIGS. 36A to 36C are diagrams depicting schemes of pseudo engine braking. The horizontal axis represents vehicular speed and the vertical axis represents instructed torque. The pseudo engine braking depicted in FIG. 36A generates constant pseudo engine braking (negative driving torque) 3601 when the speed is given specific speed or greater. Further, since the phenomenon of pseudo creep occurs with automatic transmission vehicles when the speed is low, positive driving torque 3602 corresponding to pseudo creep is generated. The pseudo engine braking depicted in FIG. 36B, up to a region 3606 of the given specific speed, is continuously changed such that the engine braking (negative driving torque) increases and in a region 3604 of specific speed or greater, the pseudo engine braking is changed gradually. Further, pseudo engine braking depicted in FIG. 36C enables switching between a normal mode 3605 having substantially the same characteristics depicted in FIG. 36B and an eco mode 3606 in which the engine mode is easily engaged.

The methods related to torque distribution described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

EXPLANATIONS OF LETTERS OR NUMERALS

100, 400 torque distribution apparatus
101 instructed torque acquiring unit
102a vehicular speed detecting unit
102b drive wheel speed detecting unit
103 slip rate calculating unit
104 motor efficiency map
105 efficiency map acquiring unit
106 calculating unit
107 distributing unit
108 control unit
300 vehicle
301 controller
307a to 307d (rotational speed) sensor 308a to 308d (normal force) sensor
309 acceleration sensor
310 yaw rate sensor
312 battery
FL, FR, RL, RR drive wheel
M (M1 to M4) motor
INV inverter

The invention claimed is:

1. A torque distribution apparatus that distributes input instructed torque to motors connected to drive wheels, the torque distribution apparatus comprising:
   a determining unit that determines whether to perform any one among power running control and regenerative braking with respect to the drive wheels;
   an instructed torque acquiring unit that acquires the instructed torque input;
   an efficiency map acquiring unit that based on a determination result of the determining unit, acquires a motor efficiency map that corresponds to the motors;
   a vehicular speed detecting unit that detects vehicular speed of a vehicle on which the motors are equipped;
   a drive wheel rotational speed detecting unit that detects drive wheel rotational speed of the drive wheels;
   a slip rate calculating unit that based on the vehicular speed and the drive wheel rotational speed, calculates slip rate at the drive wheels;
   a calculating unit that based on the slip rate, creates an efficiency variation expression that indicates efficiency values on a performance curve that indicates relations between the drive wheel rotational speed and torque, and calculates from the efficiency variation expression on the performance curve, a torque that optimizes efficiency;
   a distributing unit that among combinations of torque distribution for the motors and when a determination result by the determining unit is for the power running control, calculates torque distribution values for the motors, respectively, such that overall efficiency $\eta$ total$=\Sigma((Tn/T)\times\eta_d n\times\eta\lambda n)$ (where, T: the instructed torque, Tn: torque distribution value of each motor, $\eta_d n$: drive system efficiency of each of the motors, $\eta\lambda n$: propulsion system efficiency of the drive wheels) is maximized, and when the determination result by the determining unit is for the regenerative braking, calculates the torque distribution values for the motors, respectively such that the overall efficiency $\eta$ total$=\Sigma((Tn/T)\times\eta_b n\times\eta_r n)$ (where, T: the instructed torque, Tn: the torque distribution values of the motors, $\eta_r n$: regeneration efficiency of the motors, and $\eta_b n$: the propulsion system efficiency of the motors) is maximized, the torque distribution values being calculated based on the slip rate, the instructed torque and the torque that optimizes efficiency; and
   a control unit that controls torque distribution to the motors, based on the calculated the torque distribution values.

2. The torque distribution apparatus according to claim 1, wherein
   the propulsion system efficiency $\eta\lambda$ for the power running control is obtained by $\eta\lambda=1-\lambda$, where the slip rate is $\lambda$, and
   the propulsion system efficiency $\eta_b$ for the regenerative braking is obtained by $\eta_b=1+\lambda$.

3. The torque distribution apparatus according to claim 1, wherein
   the motor efficiency map is an efficiency map that includes inverters that are connected to the motors.

4. A torque distribution method of distributing, by a torque distribution apparatus, input instructed torque to motors connected to drive wheels, the torque distribution method comprising:
   determining whether to perform any one among power running control and regenerative braking with respect to the drive wheels;
   acquiring the input instructed torque;
   acquiring based on a determination result at the determining, a motor efficiency map corresponding to the motors;
   detecting vehicular speed of a vehicle on which the motors are equipped;
   detecting drive wheel rotational speed at the drive wheels;
   calculating slip rate based on the vehicular speed and the drive wheel rotational speed;
   creating based on the slip rate, an efficiency variation expression that indicates efficiency values on a performance curve that indicates relations between the drive wheel rotational speed and torque, and calculating from the efficiency variation expression on the performance curve, a torque that optimizes efficiency;
   calculating among combinations of torque distribution for the motors and when a determination result at the determining is for the power running control, torque distribution values for the motors, respectively, such that overall efficiency $\eta$ total$=\Sigma((Tn/T)\times\eta_d n\times\eta\lambda n)$ (where, T: the instructed torque, Tn: torque distribution value of each motor, $\eta_d n$: drive system efficiency of each of the motors, $\eta\lambda n$: propulsion system efficiency of the drive wheels) is maximized, and when the determination result at the determining is for the regenerative braking, calculating the torque distribution values for the motors, respectively such that the overall efficiency $\eta$ total$=\Sigma((Tn/T)\times\eta_b n\times\eta_r n)$ (where, T: the instructed torque, Tn: the torque distribution values of the motors, $\eta_r n$: regeneration efficiency of the motors, and $\eta_b n$: the propulsion system efficiency of the motors) is maximized, the torque distribution values being calculated based on the slip rate, the instructed torque and the torque that optimizes efficiency; and
   controlling based on the calculated torque distribution values, torque distribution to the motors.

5. A torque distribution value generation method of generating for each motor connected to a drive wheel and by a torque distribution value generating apparatus, a torque distribution value for distributing an input instructed torque, the torque distribution value generation method comprising:
   determining whether to perform any one among power running control and regenerative braking with respect to the drive wheels;
   acquiring the input instructed torque;
   acquiring based on a determination result at the determining, a motor efficiency map that corresponds to the motors;
   detecting vehicular speed of a vehicle equipped with the motors;
   detecting drive wheel rotational speed at the drive wheels;
   calculating based on the vehicular speed and the drive wheel rotational speed, slip rate at the drive wheels;
   creating based on the slip rate, an efficiency variation expression that indicates efficiency values on a performance curve that indicates relations between the drive wheel rotational speed and torque on the motor efficiency map, and calculating from the efficiency variation expression on the performance curve, a torque that optimizes efficiency; and calculating among combinations of torque distribution for the motors and when a determination result at the determining is for the power running control, torque distribution values for the motors, respectively, such that overall efficiency $\eta$ total$=\Sigma((Tn/T) \times \eta_d n \times \eta \lambda n)$ (where, T: the instructed torque, Tn: torque distribution value of each motor, $\eta_d n$: drive system efficiency of each of the motors, $\eta \lambda n$: propulsion system efficiency of the drive wheels) is maximized, and when the determination result at the determining is for the regenerative braking, calculating the torque distribution values for the motors, respectively such that the overall efficiency $\eta$ total$=\Sigma((Tn/T) \times \eta_b n \times \eta_r n)$ (where, T: the instructed torque, Tn: the torque distribution values of the motors, $\eta_r n$: regeneration efficiency of the motors, and $\eta_b n$: the propulsion system efficiency of the motors) is maximized, the torque distribution values being calculated based on the slip rate, the instructed torque and the torque that optimizes efficiency.

6. A computer-readable recording medium storing a program that causes a computer to execute the torque distribution method according to claim 4.

7. A computer-readable recording medium storing a program that causes a computer to execute the torque distribution value generation method according to claim 5.

\* \* \* \* \*